United States Patent
Coulter

(10) Patent No.: US 11,514,517 B2
(45) Date of Patent: *Nov. 29, 2022

(54) SCENARIO GAMIFICATION TO PROVIDE IMPROVED MORTGAGE AND SECURITIZATION

(71) Applicant: Consumer Direct, Inc., Irvine, CA (US)

(72) Inventor: David B. Coulter, Tustin, CA (US)

(73) Assignee: Consumer Direct, Inc., Tustin, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/678,952

(22) Filed: Nov. 8, 2019

(65) Prior Publication Data
US 2020/0074546 A1    Mar. 5, 2020

Related U.S. Application Data

(63) Continuation-in-part of application No. 15/961,809, filed on Apr. 24, 2018, now Pat. No. 11,232,489.
(Continued)

(51) Int. Cl.
*G06Q 30/00* (2012.01)
*G06Q 40/02* (2012.01)
(Continued)

(52) U.S. Cl.
CPC ......... *G06Q 40/025* (2013.01); *G06Q 20/102* (2013.01); *G06Q 20/24* (2013.01); *G06Q 30/0271* (2013.01)

(58) Field of Classification Search
None
See application file for complete search history.

(56) References Cited

U.S. PATENT DOCUMENTS

| 6,279,036 B1 | 8/2001 | Himmel et al. |
| 6,338,050 B1 | 1/2002 | Conklin et al. |

(Continued)

OTHER PUBLICATIONS

U.S. Appl. No. 15/961,809, filed Apr. 24, 2018 Final Office Action dated Jul. 10, 2020.
(Continued)

*Primary Examiner* — Michael W Schmucker
(74) *Attorney, Agent, or Firm* — Rutan & Tucker LLP

(57) ABSTRACT

Systems and processes for the gamification of data, including providing scenarios and actionable elements to execute a preferred scenario. Embodiments can include a credit modification software tool that is configured to automate the transmission of one or more messages to effectuate modification of a credit score associated with a user. The system can determine accounts eligible for improvements, application amounts, time to apply, and determine the effect on user's credit score. Embodiments can include scenarios for increasing a user's credit score where funds are not available by applying for a loan to reduce rolling debts, thereby providing a net increase credit score. Loans can be negotiated based on the resulting credit score and autonomously implement. A universal payment system is disclosed to retrieve data and determine a transaction model, which determines the accounts to be used, in which order, and how much to be applied, in order to benefit a credit score.

15 Claims, 28 Drawing Sheets

Related U.S. Application Data

(60) Provisional application No. 62/903,587, filed on Sep. 20, 2019, provisional application No. 62/815,968, filed on Mar. 8, 2019, provisional application No. 62/758,335, filed on Nov. 9, 2018, provisional application No. 62/489,351, filed on Apr. 24, 2017.

(51) Int. Cl.
*G06Q 30/02* (2012.01)
*G06Q 20/24* (2012.01)
*G06Q 20/10* (2012.01)

(56) References Cited

U.S. PATENT DOCUMENTS

| | | |
|---|---|---|
| 6,925,440 B1 | 8/2005 | Shkedi |
| 6,954,741 B1 | 10/2005 | Burchetta et al. |
| 7,003,488 B2 | 2/2006 | Dunne et al. |
| 7,028,052 B2 | 4/2006 | Chapman et al. |
| 7,136,448 B1 | 11/2006 | Venkataperumal et al. |
| 7,139,734 B2 | 11/2006 | Nathans et al. |
| 7,206,768 B1 | 4/2007 | deGroeve et al. |
| 7,249,076 B1 | 7/2007 | Pendleton et al. |
| 7,249,089 B2 | 7/2007 | Mendizabal et al. |
| 7,280,980 B1 | 10/2007 | Hoadley et al. |
| 7,305,364 B2 | 12/2007 | Nabe et al. |
| 7,318,049 B2 | 1/2008 | Iannacci |
| 7,324,970 B2 | 1/2008 | Magruder et al. |
| 7,349,881 B1 | 3/2008 | Lockwood |
| 7,379,913 B2 | 5/2008 | Steele et al. |
| 7,401,050 B2 | 7/2008 | O'Neill |
| 7,593,891 B2 | 9/2009 | Kornegay et al. |
| 7,610,229 B1 | 10/2009 | Kornegay et al. |
| 7,814,005 B2 | 10/2010 | Imrey et al. |
| 7,818,228 B1 | 10/2010 | Coulter |
| 7,853,493 B2 | 12/2010 | DeBie et al. |
| 7,877,304 B1 | 1/2011 | Coulter |
| 7,970,679 B2 | 6/2011 | Kasower |
| 8,060,424 B2 | 11/2011 | Kasower |
| 8,078,524 B2 | 12/2011 | Crawford et al. |
| 8,195,549 B2 | 6/2012 | Kasower |
| 8,285,613 B1 | 10/2012 | Coulter |
| 8,417,627 B2 | 4/2013 | Cerise et al. |
| 8,515,844 B2 | 8/2013 | Kasower |
| 8,732,073 B2 | 5/2014 | Thomas |
| 8,930,263 B1 | 1/2015 | Mahacek et al. |
| 9,443,268 B1 | 9/2016 | Kapczynski et al. |
| 9,569,797 B1 | 2/2017 | Rohn et al. |
| 2001/0053967 A1 | 12/2001 | Gordon et al. |
| 2002/0072975 A1 | 6/2002 | Steele et al. |
| 2002/0077964 A1 | 6/2002 | Brody et al. |
| 2002/0087460 A1 | 7/2002 | Hornung |
| 2002/0091625 A1 | 7/2002 | Blauvelt et al. |
| 2002/0099649 A1 | 7/2002 | Lee et al. |
| 2002/0173994 A1 | 11/2002 | Ferguson |
| 2002/0194096 A1 | 12/2002 | Falcone et al. |
| 2002/0194122 A1 | 12/2002 | Knox et al. |
| 2003/0014265 A1 | 1/2003 | Landry et al. |
| 2003/0028406 A1 | 2/2003 | Herz et al. |
| 2003/0036995 A1 | 2/2003 | Lazerson |
| 2003/0036996 A1 | 2/2003 | Lazerson |
| 2003/0046223 A1* | 3/2003 | Crawford ............... G06Q 40/00 705/38 |
| 2003/0065805 A1 | 4/2003 | Barnes |
| 2003/0093289 A1 | 5/2003 | Thornley et al. |
| 2003/0135451 A1 | 7/2003 | O'Brien et al. |
| 2003/0149659 A1 | 8/2003 | Danaher et al. |
| 2003/0154406 A1 | 8/2003 | Honarvar et al. |
| 2003/0229580 A1 | 12/2003 | Gass et al. |
| 2004/0024703 A1 | 2/2004 | Roskind |
| 2004/0039690 A1 | 2/2004 | Brown et al. |
| 2004/0054619 A1 | 3/2004 | Watson et al. |
| 2004/0111359 A1 | 6/2004 | Hudock |
| 2004/0111370 A1 | 6/2004 | Saylors et al. |
| 2004/0153663 A1 | 8/2004 | Clark et al. |
| 2004/0158521 A1 | 8/2004 | Newton et al. |
| 2004/0177030 A1 | 9/2004 | Shoham |
| 2004/0199456 A1 | 10/2004 | Flint et al. |
| 2004/0243508 A1 | 12/2004 | Samson et al. |
| 2005/0015304 A1 | 1/2005 | Evroni et al. |
| 2005/0021462 A1 | 1/2005 | Teague et al. |
| 2005/0080718 A1 | 4/2005 | Desai |
| 2005/0125686 A1 | 6/2005 | Brandt |
| 2005/0154664 A1 | 7/2005 | Guy et al. |
| 2005/0182713 A1 | 8/2005 | Marches |
| 2006/0031158 A1 | 2/2006 | Orman |
| 2006/0059073 A1 | 3/2006 | Walzak |
| 2006/0080230 A1 | 4/2006 | Freiberg |
| 2006/0089905 A1 | 4/2006 | Song et al. |
| 2006/0190394 A1 | 8/2006 | Fraser et al. |
| 2006/0200396 A1 | 9/2006 | Satterfield et al. |
| 2006/0218067 A1 | 9/2006 | Steele |
| 2007/0067297 A1 | 3/2007 | Kublickis |
| 2007/0078786 A1 | 4/2007 | Bous et al. |
| 2007/0088851 A1 | 4/2007 | Levkovitz et al. |
| 2007/0112668 A1* | 5/2007 | Celano ............... G06Q 40/025 705/38 |
| 2007/0150411 A1 | 6/2007 | Addepalli et al. |
| 2008/0021802 A1 | 1/2008 | Pendleton |
| 2009/0216639 A1 | 8/2009 | Kapczynski et al. |
| 2010/0169209 A1 | 7/2010 | Kornegay et al. |
| 2011/0166988 A1 | 7/2011 | Coulter |
| 2012/0022990 A1 | 1/2012 | Kasower |
| 2012/0197781 A1* | 8/2012 | Valetutti ............ G06Q 20/4016 705/38 |
| 2012/0265681 A1 | 10/2012 | Ross |
| 2012/0271709 A1 | 10/2012 | Ogawa |
| 2013/0103571 A1 | 4/2013 | Chung et al. |
| 2013/0262291 A1 | 10/2013 | Ricci |
| 2013/0332341 A1 | 12/2013 | Papadimitriou |
| 2014/0089167 A1 | 3/2014 | Kasower |
| 2014/0156501 A1 | 6/2014 | Howe |
| 2014/0379554 A1* | 12/2014 | Grossman ............ G06Q 40/025 705/38 |
| 2017/0228820 A1 | 8/2017 | Rohn et al. |
| 2018/0308317 A1 | 10/2018 | Coulter |

OTHER PUBLICATIONS

U.S. Appl. No. 15/961,809, filed Apr. 24, 2018 Non-Final Office Action dated Jan. 2, 2020.
U.S. Appl. No. 15/961,809, filed Apr. 24, 2018 Advisory Action dated Sep. 24, 2020.
U.S. Appl. No. 15/961,809, filed Apr. 24, 2018 Non-Final Office Action dated Dec. 30, 2020.
U.S. Appl. No. 15/961,809, filed Apr. 24, 2018 Final Office Action dated Jun. 15, 2021.
U.S. Appl. No. 15/961,809, filed Apr. 24, 2018 Notice of Allowance dated Nov. 3, 2021.

* cited by examiner

| 1252 Rank Order | 1254 Account Name | 1256 Credit Limit | 1258 Current Usage | 1260 Credit usage Amount (limit) | 1262 Transaction amount to apply |
|---|---|---|---|---|---|
| 1 | A | $1,000.00 | $75.17 | 20% | $ 124.83 |
| 2 | B | $9,500.00 | $150.34 | 56% | $ 5,169.66 |
| 3 | C | $3,000.00 | $45.65 | 19% | $ 524.35 |
| 4 | D | $5,500.00 | $301.00 | 65% | $ 3,274.00 |
| 5 | E | $500.00 | $14.00 | 34% | $ 156.00 |
| n | n | n | n | n | n |

SCENARIO GAMIFICATION TO PROVIDE IMPROVED MORTGAGE AND SECURITIZATION

PRIORITY

This application is a continuation-in-part of U.S. patent application Ser. No. 15/961,809, filed Apr. 24, 2018, now U.S. Pat. No. 11,232,489, which claims the benefit of priority to U.S. Provisional Application No. 62/489,351, filed Apr. 24, 2017. This application also claims the benefit of priority to the following: 1) U.S. Provisional Application No. 62/758,335, filed Nov. 9, 2018; 2) U.S. Provisional Application No. 62/815,968, filed Mar. 8, 2019; and 3) U.S. Provisional Application No. 62/903,587, filed Sep. 20, 2019. Each of aforementioned applications are incorporated by reference in its entirety into this application.

BACKGROUND

In an increasingly data driven world, individuals and businesses rely on data to make informed decisions about real-world events. However, large volumes of information can often lead to a paralysis of choice where the optimum outcome is obscured. In some situations, the results from a set of actions prove less than successful, leaving an individual wondering if the actions taken were ineffective or there were some other variables affecting the outcome that were unaccounted for. Further, the synergistic effects of certain variables or actions may either boost the end result, or equally may have detrimental effects.

Often similar scenarios facing an individual have been previously encountered by others. Accordingly, valuable advice and collective experience that would greatly help in cutting away unnecessary data and identifying optimum outcomes is left untapped. Often the user is unaware of the scenarios previously experienced. Alternatively, due to privacy issues, the user is unable to access this wealth of collective experience in order to learn and implement a better decision process in a real-world setting.

This overwhelming amount of information is particularly prevalent in marketing and advertising. In an increasingly crowded consumer marketplace, the volume of choice for products and services, together with the channels by which these are advertised, frequently leads to consumer fatigue. This leads third parties to fight for attention and aggressively push their products and services, thus exacerbating the problem. Often, various third parties attempt to monitor an individual's actions in order to anticipate which goods and services would be most relevant to a user and therefore direct appropriate advertising to the user. However, this provides inherently obsolete information since they show what has just occurred, rather than what a user is expected to do. For example, if an individual has searched for and bought an item online, any advertisements to similar items are now obsolete, leaving the third party guessing as to what the user is looking for next. This wastes the individual's attention resources, compounds consumer fatigue and leads to an inefficient use of advertising resources.

Further, it is estimated that the average American citizen has 3.7 credit cards each, with 16% of Americans owning 5 or more credit cards. In addition, these credit card users often have further lines of revolving credit such as personal lines of credit, equity lines of credit (ELOC), and the like. Despite these various lines of credit, users rarely spread payments between these different accounts and instead prefer to use a single account or credit card for the majority of day to day expenses while leaving the remaining lines of credit unused. This is often out of habit, convenience, or simplicity for tracking expenses. However, this method of credit usage can be detrimental to a user's credit score and fails to take advantage of all of the benefits available to the user through the various accounts. Further, if a user is intending to make a large transaction that exceeds the available credit for a single account, the user is unable to make the purchase, or may be forced to open an additional line of credit through the merchant that offers less than favorable terms, or be detrimental to the users credit score.

There remains a need for a system and a process that is able to present the 'gamification' of variables pertinent to a given scenario in an easily understood form, whereby a user may adjust, modify, manipulate, or 'play around' with certain outcomes in a scenario. Once the user has achieved a desired outcome, the system then facilitates the implementation of the outcome in a real-world setting.

SUMMARY

Embodiments herein generally relate to systems and processes for facilitating the gamification of data, for example, to generate a credit modification software tool that is configured to automate the transmission of one or more messages to effectuate modification of a credit score associated with a user.

Embodiments herein also relate to a system and process directed to the generation of various gamified user interfaces that prompt for selection of a desired credit score outcome and communicate instructions to one or more destinations (e.g., third parties, etc.) to effectuate the desired credit score outcome. A number of technical advantages may be realized from deployment of the system described herein along with the generation of the gamified user interfaces, for example, to: (i) improve the credit health of a particular user utilizing the system, while at the same time, (ii) reducing the likelihood of prolonged fraudulent activities against a user or a financial institutions. Additionally, the system can be configured to provide lenders with a more holistic view of a user's financial situation, (e.g. accounts used, payment history, spending behavior, etc.) and provide a more accurate risk assessment, which leads to better management of loan portfolios.

In an aspect of the invention, a method for presenting gamified scenarios is provided, including generating a first gamified user interface for: i) depicting a first credit score and information associated with a user, and ii) selecting a second credit score, wherein the first gamified user interface includes a digitally rendered modifiable image, conducting analytics on the information associated with the user in accordance with one or more predetermined rule sets to generate a credit modification model, wherein the information associated with the user includes personally identifiable information or financial data, and one of primary, secondary, or tertiary variables, generating a second gamified user interface depicting the second credit score, and displaying a proposed change to the information associated with the user, responsive to detecting a selection of an actionable display element rendered as part of the second gamified user interface, transmitting the one or more messages to a destination, the transmission of the message resulting in an initiation of a loan that prompts payment to an account of the user, wherein conducting analytics includes: i) correlation of user information by profiling and mapping to determine a utilization rate, and ii) determination of operations of the credit modification model to modify a credit score associated with the user from the first credit score to the second credit score based on the utilization rate, and wherein the credit modification model includes operations to be performed to modify the credit score associated with the user from the first credit score to the second credit score.

In some embodiments, the credit modification model further includes the order of operations to be performed, or the timing of operations to be performed, to modify the credit score associated with the user from the first credit score to the second credit score. The first credit score is a current credit score for the user. The second credit score is higher than the first credit score. The second credit score is lower than the first credit score. The transmission of the message resulting in the initiation of the loan that prompts payment to the account of the user includes using the second credit score to determine a risk level of the user. Conducting analytics in accordance with one or more predetermined rule sets further includes machine learning techniques that use trends identified from secondary variables. The secondary variables includes anonymized data. The secondary variables includes data from other users that is stripped of any personally identifiable information. Transmitting the one or more messages to a destination further includes providing consent, instructions, or forms that are required to initiate the loan.

In an aspect of the invention, a system includes one or more first logic modules stored within a first non-transitory storage medium, the one or more first logic modules, when executed by one or more first processors, perform operations including generating a first gamified user interface configured to depict a first credit score and information associated with a user and select a second credit score, communicating one of the first credit score, the information associated with the user, or the second credit score as packets of data over a network, and one or more second logic modules stored within a second non-transitory storage medium, the one or more second logic modules when executed by one or more second processors, perform operations including extracting content from the packets, wherein content includes one of the first credit score, the information associated with the user, or the second credit score, conducting analytics on the information associated with the user in accordance with one or more predetermined rule sets to generate a credit modification model, wherein the credit modification model includes operations to be performed to modify the credit score associated with the user from the first credit score to the second credit score, and wherein the first logic modules performs further operations including generating a second gamified user interface depicting the second credit score, and displaying a proposed change to the information associated with the user, and responsive to detecting a selection of an actionable display element rendered as part of the second gamified user interface, transmitting the one or more messages to a destination, the transmission of the message resulting in an initiation of a change in credit limit.

In some embodiments, the first gamified user interface includes a digitally rendered modifiable image. The information associated with the user includes personally identifiable information or financial data, and one of primary, secondary, or tertiary variables. Conducting analytics includes i) correlation of user information by profiling and mapping to determine a utilization rate, and ii) determination of operations of the credit modification model to modify a credit score associated with the user from the first credit score to the second credit score based on the utilization rate. Transmitting the one or more messages to a destination, further includes sending a first message to a first destination and a second message to a second destination, and responsive to an input from one of the first destination or the second destination, transferring a user's account. Transmitting the one or more messages to a destination, further includes establishing an online auction platform for one or more destinations and responsive to an input from one of the destinations of the one or more destinations, transferring a user's account.

In an aspect of the invention, a method for boosting a user's credit score, including generating a first gamified user interface for i) depicting a first credit score and information associated with a user, and ii) selecting a second credit score, wherein the first gamified user interface includes a digitally rendered modifiable image, conducting analytics on the information associated with the user in accordance with one or more predetermined rule sets to generate a credit modification model, wherein the information associated with the user includes personally identifiable information or financial data, and one of primary, secondary, or tertiary variables, generating a second gamified user interface depicting the second credit score, and displaying a proposed change to the information associated with the user, responsive to detecting a selection of an actionable display element rendered as part of the second gamified user interface, transmitting the one or more messages to one or more destinations, the transmission of the message resulting in an increase in credit limit for the user, wherein conducting analytics includes i) correlation of user information by profiling and mapping to determine a utilization rate, and ii) determination of operations of the credit modification model to modify a credit score associated with the user from the first credit score to the second credit score based on the utilization rate, wherein the credit modification model includes operations to be performed to modify the credit score associated with the user from the first credit score to the second credit score.

In some embodiments, the operations to be performed further include one of i) selecting one or more accounts of the user that are eligible for a credit limit increase, ii) selecting an amount of credit limit to apply for, and iii) selecting a time to apply for the credit limit increase.

According to one aspect of the invention, the system reviews anonymized data from other users of the system to improve analysis and to provide more accurate scenarios. The system also uses the implemented scenarios to provide temporally appropriate advertising or similar marketing communication. The system also provides temporally appropriate alerts or notifications.

Aspects of the invention also include causing rendering of a gamified user interface displaying a scenario according to one or more variables, wherein the one or more variables include personally identifiable information and financial information of a user. Analyzing the one or more variables according to one or more predetermined rule sets to provide a first outcome to the scenario in the gamified user interface, wherein the first outcome is a current credit score of the user. Receiving a first input, via the gamified user interface, indicating a desired modification of the first outcome to provide a preferred outcome, wherein the preferred outcome is a preferred credit score of a user. Analyzing the preferred outcome according to the one or more predetermined rule sets. Causing rendering of a second gamified user interface displaying a second scenario which include proposed changes to the one or more variables that are required to achieve the preferred outcome, and in response to receiving a second input via an actionable element of the second gamified user interface, providing instructions for modifying the one or more variables according to the proposed changes in order to implement the preferred outcome in a real-world setting. Wherein providing instructions for modifying the one or more variables according to the proposed changes includes: i) sending and receiving instructions to apply for a loan from a first third-party, and ii) sending and receiving instructions to the first third-party to provide funds to a second third-party.

Aspects of the invention also include sending and receiving instructions to apply for a loan from a targeted destination (e.g., first third-party) includes using the preferred credit score for the user to determine a risk level of the user. The proposed changes to the variables that are required to achieve the preferred outcome are determined from trends identified from secondary data. The secondary data includes anonymized data. The secondary data includes data from other users of the system that is stripped of any personally identifiable information.

Aspects of the invention also include a non-transitory storage medium including software, when processed by a hardware processor, provides a scenario via a gamified user interface, the non-transitory storage medium including, an implementation engine to retrieve variables, wherein the variables include financial account information of a user, the implementation engine configured to (i) analyze the variables according to a set of predetermined rules and weightings, and to (ii) determine if an account is eligible for an increase in credit limit, and a predictive scenario engine configured to analyze anonymized secondary data to determine an amount of credit limit to apply for and an advantageous time to apply for a change in credit limit to achieve an increase in credit score of the user, the predictive scenario engine sending and receiving instructions to and from a third-party account holder to apply for the change in credit limit.

Aspects of the invention also include the predictive scenario engine sends and receives instructions to and from a non-account holder third-party requesting an increase in credit limit and determines which of the credit limit increases from the account holder third-party or from the non-account holder third-party provides a greater increase in the credit score of the user and transferring the account to the third-party that provides a user with a the greater increase in credit score. The predictive scenario engine establishes an online auction platform where a non-account holder third-party provides a bid that includes an increased credit limit for the user, the predictive scenario engine analyzing the bids to determine a winning bid that provides an increase in credit score for the user, and sending and receiving instructions to transfer the account to the non-account holder third-party of the winning bid.

Aspects of the invention also include a system for optimizing altering the credit limit for an account, the system including, one or more processors, and a storage device having stored thereon instructions, the instructions, when executed by the one or more processors, cause the one or more processors to retrieve one or more variables for an account of a user, analyze the one or more variables according to one or more predetermined rule sets derived from anonymized secondary data to determine if the account is eligible for an increase in credit limit, an amount of credit limit the account is eligible for, and an advantageous time to apply for the increase in credit limit, generate a request for an increase in credit limit, send the request to an account holder third-party of the account, send details of the request to a non-account holder third-party, receive from the account holder third-party or the non-account holder third party an offer for an increase in credit limit for the account, responsive to the offer for an increase in credit limit for the account determining a winning offer that provides a greatest improvement to a credit score for the user, send and receive instructions to and from the account holder third-party for moving the account to the winning offer.

Aspects of the invention also include sending details of the request to a non-account holder third-party further includes providing an online auction platform that allows the non-account holder third-party to submit and modify offers for an increase in credit limit for the account.

Aspects of the invention also include a method for boosting a user's credit score, including causing rendering of a gamified user interface displaying a scenario according to one or more variables, wherein the one or more variables include account information and credit score information for the user, receiving a first input, via the gamified user interface, indicating a desired increase in credit score, analyzing the one or more variables of the user according to the one or more predetermined rule sets to determine i) which of the user's accounts are eligible for a credit limit increase, ii) how much credit limit increase to apply for, and iii) when to apply for the credit limit increase, sending a request to an Account Holder third-party of the account at an advantageous time, requesting an increase in credit limit that provides an increase in credit score for the user.

Aspects of the invention also include sending details of the request to a Non-Account Holder third party, the Non-Account Holder providing a bid including details of an account with an increase in credit limit. Determining whether the bid provides a greater increase in credit score for the user, and transferring the account from the Account Holder third-party to the Non-Account Holder third-party.

Aspects of the invention also include a method for presenting gamified scenarios, including causing rendering of a gamified user interface displaying a scenario according to one or more variables, wherein the one or more variables include personally identifiable information and financial information of a user, analyzing the one or more variables according to one or more predetermined rule sets to provide a first outcome to the scenario in the gamified user interface, wherein the first outcome is a current credit score of the user, receiving a first input, via the gamified user interface, indicating a desired modification of the first outcome to provide a preferred outcome, wherein the preferred outcome is a preferred credit score of a user, analyzing the preferred outcome according to the one or more predetermined rule sets, causing rendering of a second gamified user interface displaying a second scenario which include proposed changes to the one or more variables that are sought to achieve the preferred outcome, and in response to receiving a second input via an actionable element of the second gamified user interface, providing instructions for modifying the one or more variables according to the proposed changes in order to implement the preferred outcome in a real-world setting, wherein the actionable element includes providing a "Pre-Apply" actionable element which requests the second input from the user, wherein the second input from the user includes consent, instructions, or forms that are to be submitted to a third-party when the preferred outcome is achieved in a real-world setting.

Aspects of the invention also include a non-transitory storage medium having stored thereon instructions, the instructions being executable by one or more processors to perform operations including responsive to a trigger, generating a transaction model based on extracted features from a first selection of data from a dataset, wherein the first selection of data includes credit score information and account information for one or more accounts for a user, the transaction model configured to improve a credit score for the user, applying a transaction amount to the transaction model, determining if there is sufficient aggregated available credit usage for the transaction amount, applying at least a first portion of the transaction amount to a first account, wherein the at least a first portion of the transaction amount applied to the first account has a net equal or positive affect on a credit score for the user.

Aspects of the invention also include a method of operation that, responsive to the transaction amount being greater than an available credit usage amount for the first account, a second portion of the transaction amount is applied to one or more subsequent accounts. The credit usage amount for each of the accounts in the model is an amount that maintains or improves the user's credit score. The credit usage amount for each of the accounts in the model is determined from trends derived from secondary data of other users of the system. The trigger includes a time-driven trigger, action-driven trigger, location-driven trigger, or a combination thereof. Responsive to the transaction amount being applied to the transaction model, a second transaction model is generated.

Aspects of the invention also include a universal payment device, the device including one or more processors, and a storage device having stored thereon instructions, the instructions, when executed by the one or more processors, cause the one or more processors to respond to a trigger to retrieve data from a database and generate a transaction model, apply a transaction amount to the transaction model, determine if the transaction amount exceeds an aggregated available credit usage amount for the accounts in the transaction model, apply for a credit usage amount increase, subsequent to an approval of the credit usage amount increase, generate a second transaction model and apply the transaction amount to the second transaction model.

Aspects of the invention also include the trigger includes a time-driven trigger, action-driven trigger, location-driven trigger, or a combination thereof. The trigger is at least one of an initiation of a transaction, the proximity of a user to a predetermined location, and a predetermined time frame. The transaction model is generated using a machine learning technique, statistical learning or artificial intelligence technique. The retrieved data from the data base includes at least one of user account information and user credit score information. The credit usage amount increase includes at least one of applying for a credit limit increase for a user's account or applying to open a new account for the user. A credit usage amount for each of the accounts is derived from secondary data of other users.

BRIEF DESCRIPTION OF THE DRAWINGS

To further clarify embodiments of the disclosure, a more particular description will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 12C is an exemplary transaction model, in accordance with the present disclosure.

Figure 1:
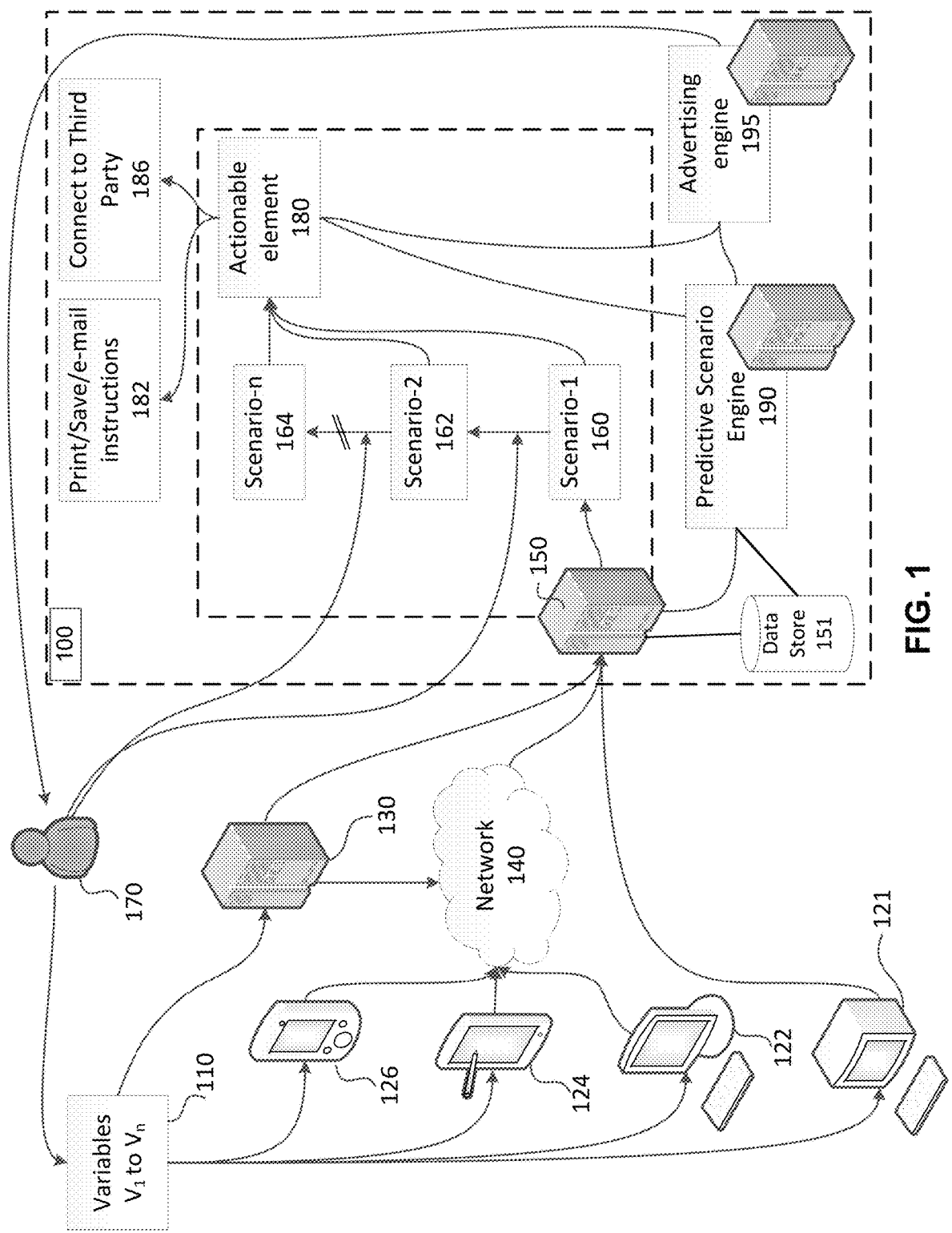
FIG. 1 illustrates an exemplary structure of the system, in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

Terminology

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "a first actionable element," may be made. However, the specific numeric reference should not be interpreted as a literal sequential order but rather interpreted that the "first actionable element" is different than a "second actionable element." Thus, the specific details set forth are merely exemplary. The specific details may be varied from and still be contemplated to be within the spirit and scope of the present disclosure. The term "coupled" is defined as meaning connected either directly to the component or indirectly to the component through another component.

As used herein, "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network. Further, as used herein, the terms "about," "approximately," or "substantially" for any numerical values or ranges indicate a suitable dimensional tolerance that allows the part or collection of components to function for its intended purpose as described herein.

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit ("ASIC"), wireless receiver, transmitter and/or transceiver circuitry, semiconductor memory, or combinatorial logic.

Alternatively, logic may be software, such as executable code in the form of an executable application, an Application Programming Interface (API), a subroutine, a function, a procedure, an applet, a servlet, a routine, source code, object code, a shared library/dynamic load library, or one or more instructions. The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the executable code may be stored in persistent storage.

The term "computing device" may be construed as electronics with the data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: a server, an endpoint device (e.g., a laptop, a smartphone, a "wearable" device, a smartwatch, a tablet, a desktop computer, a netbook, a medical device, or any general-purpose or special-purpose, user-controlled electronic device); a mainframe; a router; or the like.

A "message" generally refers to information transmitted in one or more electrical signals that collectively represent electrically stored data in a prescribed format. Each message may be in the form of one or more packets, frames, HTTP-based transmissions, or any other series of bits having the prescribed format. The term "coupled" is defined as meaning connected either directly to the component or indirectly to the component through another component.

The term "computerized" generally represents that any corresponding operations are conducted by hardware in combination with software and/or firmware.

The term, a "line of credit" or "account" may include any rolling credit account, credit card account, a personal line of credit, personal loans, commercial loans, secured or unsecured loans, cash advances, equity lines of credit ("ELOC"), or the like. The term "credit limit" of an account may be construed as the total amount of credit allowed for the account. The "credit usage" of an account may be construed as the amount of credit limit that has been borrowed. The term "credit score" may be construed as an indicator of the credit worthiness of a particular individual, which may be represented by a numerical credit score. The term "credit worthiness" is a level of risk associated with a user from the perspective of a lender. The term "credit rating" may be construed as a grouping to which a user is assigned i.e. "fair," "good," "exceptional," etc.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition may occur only when a combination of elements, functions, steps or acts are in some way inherently mutually exclusive.

Gamification System

In an exemplary embodiment, a system and a process provides a gamified user interface to a user, which includes various scenarios and outcomes based on the user's information that includes primary, secondary, tertiary variables, or combinations thereof. A user may use the gamified interface to set desired outcomes. The system then analyzes the user's information and uses machine learning, Artificial Intelligence ("A.I."), or the like, to determine a scenario, for example a credit modification model. The system may provide actionable display elements, ("actionable elements") within the gamified interface to implement the scenario in a real-world setting, including automating the transmission of messages that effectuates changes to the user's information to achieve the desired outcome, such as a desired credit score for example. Accordingly, the system facilitates the implementation of the desired scenario or outcome in a real-world setting. The system and process presents a gamification of the scenarios and a graphical user interface to engage the user in credit health, promoting awareness about the accounts associated to the user, which in turn protects against malicious or fraudulent activity.

In an exemplary embodiment, the user's information can be parsed into primary, secondary, and tertiary variables. Variables may be entered into the system either directly from the user, termed primary variables, or from one or more third parties, termed tertiary variables. The system may also provide further variables, termed secondary variables. These variables may be based on previous informational changes (e.g. scenarios) conducted by other users, previous scenarios implemented by the same user, data trends identified by the system, or other information derived by the system or from the user or other users of the system. The types of variables entered to the system may include, for example, personal, demographic, geographic, economic, historical, social, behavioral, psychographic information, or the like.

In an exemplary embodiment, the system may analyze these variables to present one or more scenarios to the user. As used herein, the term "scenario" may include a software-based model that determines the type of actions to be taken, the order in which these are actions are to be effectuated, the timing of actions in which these are actions are to be effectuated, combinations thereof, or the like. The system may also use machine learning techniques and secondary variables to further refine the scenario presented to the user.

For example, the system may aggregate scenarios, actions taken, outcomes achieved, etc. from other users of the system to improve the accuracy of the current scenario presented to the user. The system may also use primary, secondary, and/or tertiary variables to provide suggestions, ranges or advice to the user derived for example from other users or similar scenarios. In an exemplary embodiment, the gamified user interface allows a user to implement changes, modify, adjust, or manipulate the outcomes of the scenario within the interface. In response, the system provides the variables and/or actions for achieving the outcomes selected by the user. The system may use secondary variables to better predict the information or variables utilized to achieve the outcome. It is also contemplated that primary and tertiary variables may be used in this way. The system may also allow a user to further modify the input variables. In response the system may provide additional scenarios. In this way the gamification of data may allow a user to play around and achieve an optimal scenario or outcome.

In an exemplary embodiment, the system and process also provides the user with actionable display elements within the gamified interface for implementing the scenario in a real-world situation. Such actionable elements may for example, allow a user to save, print, send, or e-mail the scenario, parameters, messages, instructions, or defining features associated with the scenario. The actionable element may also automate the transmission of messages that effectuate the actions defined by the scenario in the correct order and at the correct time. The actionable elements may also connect the user directly with one or more third parties in order to allow the user to implement the scenario in a real-world situation. Technical advantages of the actionable elements are to facilitate implementation of the scenarios, to promote user execution of these actions, removing perceived barriers and streamlining the implementation process.

In an exemplary embodiment, the system may provide temporally relevant advertising to the user. The system may use previous scenarios, primary, secondary, tertiary variables, or combinations thereof to assess which goods and services may be relevant to the user and at what time the goods or services may be most relevant to the user. In an exemplary embodiment, the system may use the implemented scenario to assess which goods and services may be relevant to the user and at what time the goods or services may be most relevant to the user. Technical advantages include reducing consumer fatigue and improving the effectiveness of the advertisements.

In an exemplary embodiment, the system may provide one or more icons associated with one or more preferred, or selected, outcomes. These icons may provide advertisements or links to connect a user to goods or services. Technical advantages include motivating a user to see which goods or services become available once a preferred outcome, such as a selected credit score, is achieved.

In an embodiment, the system may provide temporally relevant alerts or notifications. These may be provided when one or more of the preferred outcomes is about to be achieved or has been achieved. The alerts or notifications may provide encouragement or rewards to the user in the form of medals, trophies. The rewards may be provided to the user within the system and may be displayed as part of the user's profile, and may motivate the user to continue to use the system. In an embodiment, the alerts and notifications alert the user to changes that occur in a real-world setting that may affect one or more of the implemented scenarios. These and other embodiments will be discussed in greater detail herein. Engaging a user with their credit health in a meaningful way promotes a lower and more stable Debt To Income ("DTI") ratio, as well as a higher and more stable credit score. Fraudulent activity, identity theft, and/or malicious activity is easily identifiable. This, in turn, mitigates economic loss to such malicious activity, as well as improving disposable income for the user, improving the local economy.

FIG. 1 illustrates an exemplary system 100 in accordance with the present disclosure. The system 100 may include one or more variables $V_1$ to $V_n$ 110. The one or more variables 110 may be entered into the system as primary, secondary, tertiary information, or combinations thereof. Primary information may be defined as information entered directly into the system 100 by a user 170. Secondary information may be defined as information stored, derived or generated by the system 100, where the secondary information may include information from or about other users of the system 100, data generated by the system from the user or other users of the system 100, scenarios generated by other users of the system 100, information generated by the predictive scenario engine 190, advertising engine 195, or the like. Tertiary information may be defined as information provided to the system 100 by way of one or more third parties 130.

A user 170 may enter variables into the system 100 either by way of a machine or terminal 121 connected to the system 100 and specifically configured for the entry of the variables 110, or by way of a general purpose computing device selectively activated or reconfigured by a computer program stored in the computer. Non-limiting examples of a general purpose computing device include, personal computer 122, tablet 124, smart phone 126, or similar device. The devices 121, 122, 124, 126 may be connected directly with a server 150 or connected to the server 150 by way of a centralized or decentralized network 140, as will be described herein. It may be appreciated that the network 140 may include a Local Area Network (LAN), Wireless Local Area Network (WLAN), Virtual Private Network (VPN), intranet, internet, a 'cloud' based network, or similar centralized or decentralized, wired or wireless network that fall within the scope of the present invention.

Secondary variables may be stored, collated, aggregated, and analyzed by a predictive scenario engine 190. The predictive scenario engine 190 may use rules based techniques, machine learning techniques, artificial intelligence (A.I.), neural networks, or combinations thereof to provide the system 100 with refined scenarios, determine key variables that are pertinent to a scenario, identify trends in users behavior, improve the accuracy of the scenarios in a real-world setting, or the like, as may be described in more detail herein. The predictive scenario engine 190 may also work in conjunction with an advertising engine 195 to analyze, advise, or predict when a user would be most interested in certain goods or services, thereby providing temporally relevant advertising to the user, as may be described in more detail herein. Similarly, the system may also provide temporally appropriate alerts or notifications.

The system 100 may obtain variables 110 by way of one or more third parties 130. It is contemplated that a third party may request, collect, or derive information pertaining to the user. In an exemplary embodiment, the user 170 may provide the variables 110 directly to a third party 130. The system 100 may then request access to these variables 110 held by the one or more third parties 130. The user may also allow the system access to these variables 110 held by the one or more third parties 130. It is also contemplated that variables 110 held by a third party 130 may be provided to one or more subsequent third parties (not shown) before being obtained by the system 100.

The variables 110 may include various types of variables including, but not limited to, personal, demographic, geographic, economic, historical, social, behavioral, psychographic information or data. Personal data may include, but not limited to, name, address, date of birth, phone numbers, e-mail addresses, occupation, social security number, or the like. Demographic data may include, but not limited to, gender, age, ethnicity, religion, education, or the like. Geographic data may include, but not limited to, home location, work location, immediate location, place of birth, or the like. Economic data may include, but not limited to, income, expenses, banking information, number of dependents, home ownership, rolling debt, loans, credit reports, credit scores, public records, liens, bankruptcy information, investments, or the like. Historical data may include, but not limited to, trends or changes in personal, demographic, geographic, economic, historical, social, behavioral, psychographic data over time. Social data may include, but not limited to, social media, criminal records, public records, place of marriage, or the like. Behavioral data may include, but not limited to, patterns of expected changes in personal, demographic, economic, historical, ethnic, social data over time. Psychographic data may include, but not limited to, psychological factors, lifestyle factors, travel destinations, hobbies, interests, values, opinions, or the like.

The system 100 may then use predetermined rules, machine learning techniques, A.I., neural networks, or combinations thereof to store, parse, and analyze the variables 110, or combinations thereof, using non-transitory storage medium housed by a server 150. An implementation engine on server 150 may be specifically designed or configured to use a set of predetermined rules with predetermined weightings, machine learning techniques, A.I., neural networks, or combinations thereof to collate, parse, analyze, and/or present the variables 110. The predetermined rules, predetermined weightings, machine learning techniques, A.I., neural networks, or combinations thereof may be stored on a data store 151 communicatively connected to the system 100. The system 100 may query the primary, secondary, and/or tertiary variables and select variables according to predetermined rules which include predetermined weightings towards certain variables. The system 100 may then present the variables by way of a specifically configured gamified user interface. As used herein, presenting may include querying, selecting, parsing, analyzing, and/or displaying the variables. The user interface may collate and present variables pertinent to the user. The user interface may be preconfigured by the system, be configurable by the user, or combinations thereof The user interface may present the gamification of the variables 110, in the form of a first scenario, such as scenario-1 160. A first scenario 160 may include the presentation of a selection of the variables 110. It is contemplated that one or more of the variables 110 may be combined, transposed, analyzed or calculated to create one or more further variables which may then be included in the scenario. Based on the variables entered, the system may present a first scenario 160 with an initial outcome or set of outcomes that the system determines to be most favorable to the user. It is contemplated that the first scenario may also present the current real-world situation as either a reference point or as a proposed outcome. As used herein, it may be appreciated that any 'outcome' may also include a set of one or more outcomes. The user 170 may then modify the outcome of the first scenario 160. Such changes may include setting a preferred outcome to the scenario. In some embodiments, the user may modify the variables used in the scenario.

In an exemplary embodiment, once a user has modified the outcome of the first scenario 160, the system may analyze the user information, modifications to the outcome, or combinations thereof, and determine, using predetermined rules, weightings, machine learning techniques, A.I., or the like, the changes to the variables 110 that are conducted to achieve the modified outcome in a real-world setting. The system 100 will then display the modifications, and changes to the variables, in a new scenario. Accordingly, as used herein, the system may 'present' a second scenario to the user, scenario-2 162, based on the modifications to the first scenario 160. The user may then further modify the second scenario 162. Each time the scenario is modified the system may present a new scenario based on these modifications. In exemplary embodiments, the system may dynamically update the scenarios with the changes and automatically present new scenarios, or the system may suggest a user to submit the changes in order to request subsequent scenarios, these and other methods of submitting the changes to the scenario are contemplated to fall within the scope of the present invention.

For example, the system may provide a scenario that includes a credit modification model. The scenario includes various user information including financial accounts, personal information, and the like. The outcome of the scenario is a current credit score for the user. The user then modifies the current credit score to a second (e.g., a preferred) credit score. The system then analyses the user's information in accordance with predetermined rule sets, machine learning, A.I., or the like, to determine the credit modification model. The credit modification model includes actions to be taken (e.g., automatic payments of credit card statements, automatic payments toward credit card debt or other debt, automatic payments of bills or account statements different than credit card statements), messages to be sent, the order in which the actions are taken, the timing with which the actions are taken, and the like (e.g. accounts to be paid, the amounts to be paid, the order in which they are paid, and the timing with which each are paid, etc.), that effectuate changes to the user's information and will result in the second credit score being achieved. Specifically, the credit modification model may comprise (i) one or more messages to be rendered on a display screen of an electronic device to be viewed by a user, and (ii) instructions that are configured to be executed in response to receipt of user input verifying initiation of the actions to be taken, wherein execution of the instructions causes an automatic initiation of the actions, such as automatically (i.e., without user intervention) establishing a link between a credit card account associated with the user with a bank account associated with the user thereby establishing an automatic payment plan in order to obtain a desired utilization rate of the credit card account, as discussed below.

In exemplary embodiments, a number of scenarios, scenario-1 160 to scenario-n 164, may be generated. The user may continue to adjust, modify or manipulate the outcomes, the variables, or combinations thereof until the user achieves a preferred scenario outcome, scenario-n 164. In this way, the system may gamify the variables received so that they are presented and displayed in a meaningful way to the user. Further, any changes implemented in the scenario may create changes in associated variables or outcomes. In this way a user may also see the consequence of these changes to the scenario. Gamifying the variables in this way provides technical advantages of encouraging a user to monitor, for example, their financial health. This, in turn, mitigates malicious behavior that may take advantage of dormant accounts.

In an exemplary embodiment, the variables 110 in the scenarios, 160, 162, 164, may be presented to a user and adjusted by way of graphical interfaces. Such graphical interfaces may include, but not limited to, sliders, wheels, temperature gauges, contour charts, area maps, radar charts, bubble charts, graphical representations of real-world situations, avatars, or the like. These interfaces facilitate the gamification of the variables so that a user may observe changes. The system may also use the graphical interfaces to highlight the impact of the different variables. For example, secondary variables provided by the predictive scenario engine 190 may anticipate that a change in a first variable may have a greater impact on the outcome than an equal or greater change in a second variable. The gamified user interface may highlight this to the user. Similarly, in a further example, the predictive scenario engine 190 may determine the synergistic effect of two or more given variables may have a greater impact on the outcome than other combinations of variables. Accordingly, the gamified user interface may highlight this impact to the user.

In an exemplary embodiment, the system may also provide actionable elements 180. The actionable elements may be in accordance with the features set forth in U.S. Pat. Nos. 7,818,228; 7,877,304; and 8,285,613; and U.S. Patent Publication No. 2011/0166988, each titled, "System And Method For Managing Consumer Information", and each of which are incorporated by reference in its entirety into this application. The actionable elements may be, by way of a non-limiting example, action buttons. Once the user has achieved the preferred scenario, scenario-n 164, a user may use the actionable elements 180 to implement the scenario-n 164 in a real-world setting. As used herein, such implementation may include, but not limited to, providing, saving, printing, or e-mailing the variables, outcomes, changes, parameters, instructions, or other defining features, or combinations thereof, for the scenario 182. The actionable elements 180 may also be linked directly with one or more third parties 186. The one or more third parties 186 may be different from the one or more third parties identified by 130 or they may be the same third parties as those identified by 130, or a combination thereof. The actionable elements 180 may provide the user access to third parties, or the actionable elements 180 may provide instructions from the user to the third parties. It is also contemplated that actionable elements 180 may send some or all of the instructions at a time best suited to the implementation. For example, once the actionable element is actuated (e.g., placed into an active state), the system 100 may send some instructions immediately, the system 100 may send some instructions on one or more specific dates, the system 100 may send some instructions depending on the occurrence of other actions or events, or combinations thereof. It is also contemplated that the actionable elements 180 may connect a user with other tools. These tools may be part of the system or may be located outside of the system. In this way, changes reflected by the scenario-n 164 may be directly implemented in a real-world setting.

Variables, outcomes, information, changes, parameters and other defining features pertaining to the scenario-n 164 may also be stored by the system. These secondary variables from multiple scenarios and from multiple users may be aggregated, stored, parsed and analyzed, using predetermined rules, machine learning techniques, A.I., or the like, by a predictive scenario engine 190. These secondary variables may be provided to the system and used to refine future scenarios, identify trends in the users behavior or trends in behavior for various groups of users, determine key variables that are pertinent to a scenario, improve the accuracy of the scenarios in a real-world setting, or the like. By way of a non-limiting example the system may aggregate the preferred scenarios, scenario-n 164, from a number of users. The system may then parse and analyze the data based on a number of predetermined conditions or rules. The system may modify these predetermined parameters or rules based on trends identified from the primary, secondary or tertiary variables. A user 170 establishing a new scenario may enter new variables. Based on the user's 170 variables 110 and on the secondary variables provided by the predictive scenario engine 190, the system may predict certain outcomes more accurately or suggest certain changes to the user's scenarios in order to expediently achieve the preferred scenario, scenario-n 164.

In an exemplary embodiment, the predictive scenario engine 190 works in conjunction with an advertising engine 195. The advertising engine 195 may use predetermined rules, machine learning techniques, A.I., or the like, to analyze previous scenarios from the user or other users of the system, identified trends, primary, secondary, tertiary variables from the user or other users of the system, or combinations thereof, to determine temporally relevant advertisements to the user 170, such that the advertisements are provided within a predetermined time frame. The advertisements may, for example, be provided from outside the system 100 from one or more third parties, from within the system 100, or combinations thereof. Advertisements from within the system 100 may be stored, or generated by, the advertising engine and may be directed to features relating to the system itself. The third parties providing the advertisements may be the same as the third parties 130, third parties 186, different third parties, or combinations thereof. The advertising engine 195 may analyze and determine which goods and services would be most relevant to the user and also when the goods and services may be most pertinent to the user, such that the advertisements for the goods and services are provided within a predetermined time frame determined to be most relevant to the user.

As previously noted, current methods for providing advertisements to a user include monitoring an individual's actions and providing advertisements based on these actions. However, the current methods are not optimal as discussed. By contrast, technical advantages of the system, as described herein determines actions that a user may make in the future based on the one or more scenarios created and/or actioned by the user. It is also contemplated that the system can accurately determine the future actions of the user by way of scenarios created prior to implementing, or based on primary, secondary, tertiary variables, or combinations thereof. The system may determine which goods or services are most pertinent to the user and provide advertisements relating to these goods and services to the user. This promotes user interest by providing relevant advertisements and prevents consumer fatigue.

In an exemplary embodiment, the advertising engine 195 determines when the goods and services would be most pertinent to the user. In an exemplary embodiment, the system provides advertisements directed to features found within the system. In an exemplary embodiment, the system provides notifications to the user, based on primary variables, secondary variables, tertiary variables, other scenarios, or combinations thereof. By way of a non-limiting example, the alerts or notifications may provide the user with additional tools or advice based on actions that may affect the outcome of previously implemented scenarios. The alerts or notifications may also offer rewards or encouragement to motivate the user into continued use of the system, to achieve a previously implemented preferred outcome of a scenario, or the like. In this way, the system may reduce consumer fatigue and increase the effectiveness for the advertisements provided by the one or more third parties.

In an exemplary embodiment, third parties may work in conjunction with the system to provide advertisements relating to their products and services to the users of the system. The system may advise the third parties of which goods and services would be most pertinent to which users and when so that the third parties may provide advertisements, either directly or indirectly, to the users. In an exemplary embodiment, the third parties may provide advertisements and associated information to the advertising engine 195 and the system may then determine which of these advertisements may be most pertinent to the users and provide these advertisements at the most appropriate time.

In an exemplary embodiment, third parties may use the system and processes to facilitate providing temporally appropriate advertisements to customers, or potential customers, of the third parties. It is contemplated that the customers, or potential customers, may not necessarily be users of the system. Third parties may provide variables to the system, these variables may, for example, include variables that relate to customers of the one or more third parties, information relating to potential customers, or the like. Third parties may also provide advertisements and associated information to the system. The system may then use the variables provided by the third party, along with primary, secondary, tertiary variables, predetermined rules, associated trends, or the like, to determined which advertisements would be most pertinent to the customers of the third parties, potential customers, users of the system, or the like. In this way, third parties may work with the system to provide temporally appropriate advertisements or notifications to their customers, or potential customers of the third parties. Accordingly, third parties may work with the system to reduce consumer fatigue and increase the effectiveness for their advertisements.

It will be appreciated that the implementation engine 150, predictive scenario engine 190, and advertising engine 195 may be located on different machines that are in different geographical locations, on the same machine, in the same geographical location, or combinations thereof without departing from the spirit of the invention.

Figure 2:
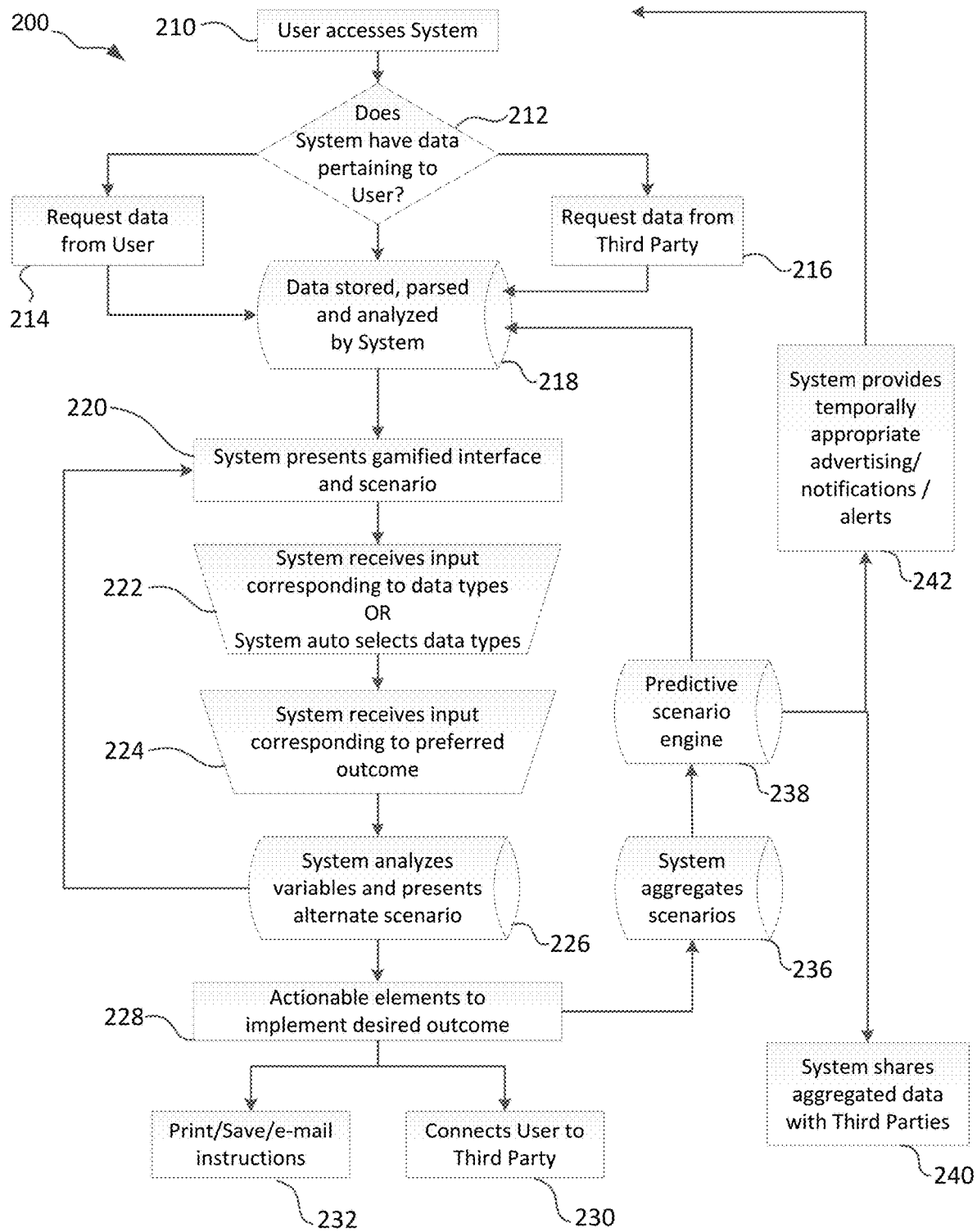
FIG. 2 illustrates an exemplary flowchart of the process, in accordance with the present disclosure.

FIG. 2 illustrates an exemplary process 200 in accordance with the present disclosure. Initially, a user 170 accesses the system 210. This may involve establishing a user account, profile, connection, or similar porthole. The account may be protected by password, PIN, fingerprint recognition, facial recognition or similar such protection that falls within the scope of the present invention. Once a user 170 has been provided access to the system, the system can determine whether or not there are variables already pertaining to the user stored on the system 212. The system may also request further primary variables from the user 214. The system may also request tertiary variables 216 from third parties 130. The system may also request access or permission from the user 170 to request tertiary variables from third parties 130. The system may further include secondary variables provided by, for example, the predictive scenario engine 190. The system may then collate, store, parse and analyze the variables 218.

The system may then use a gamified user interface to present an initial scenario, scenario-1 220, the scenario can include for example a first credit score. It is contemplated that there may be various additional steps prior to presenting scenario-1 220 to the user, these may include one or more interfaces or home pages that present different types of scenarios available to the user. It is also contemplated that the system may present various choice steps, decision trees, or 'setup wizards' that aide the user in choosing the type of scenario desired and/or the variables to be used. In an exemplary embodiment, the system may auto select the type of scenario desired and/or the variables to be used according to a set of predefined rules, from identifying trends within the variables, or combinations thereof. It will be appreciated that any number or combination of these steps that lead a user to the first scenario fall within the scope of the present invention.

Once the system presents a first scenario to the user that includes an outcome, the user is then able to modify the outcome of the scenario. For example, the first scenario may present an outcome that is unfavorable, unexpected or undesired by the user. Accordingly, the system can receive user input corresponding to modifying the outcome of the scenario to a second, preferred outcome 224. In this way, a user can slide, adjust or 'plays around' with the target outcome using gamified interface #. The system may then analyze the user's information using various rules based, machine learning, A.I. techniques, or any combination thereof to present a second scenario 226. In an embodiment, the second scenario 226 displays a model of changes to the variables that may be implemented in order to achieve the second, outcome 224 set by the user. In an embodiment, the model can include the number, type, order, and timing of various actions, messages, or the like, necessary to achieve the second outcome 224.

In an embodiment, the system analyzes variables 226 and correlates user information by applying a predetermined profile. Application of a profile to the user includes analyzing the information associated with the user and assigning the user to one or more groupings, e.g. Group A, Group B, or Group C (however, there is not limit on the number of groupings and, additionally, one or more of the groupings may include one or more sub-groupings). Additionally, the predetermined profile is selected from a plurality of profiles based on the user information. For example, the system may have predetermined profiles corresponding to (i) user information indicating a past declaration of bankruptcy, (ii) user information indicating a credit history established within a first time frame (e.g., within the past five years), and (iii) user information indicating a credit history established after a first time threshold (e.g., credit history has been established for at least five years).

The application of the profile results in selection of a mapping to be applied to received user input, wherein the mapping determines a target credit utilization rate of the user's credit based on the user input (e.g., desired credit score or preferred outcome) or based on the delta between the user's current credit score and the user's desired credit score. Following application of the profile (e.g., at least selection of a predetermined map), the system determines a target utilization rate by assessing a utilization rate, or change thereof, that corresponds to the delta between the user's current credit score and the user's desired credit score in accordance with the selected predetermined map. In some embodiments, the predetermined map may be a pairing of utilization rates and deltas. However, in other embodiments, the predetermined map may comprise a machine learning model, wherein the model is previously generated and trained using historical data of a plurality of users (wherein P.I.I. data of each user is anonymized or removed). In such embodiments in which the predetermined map comprises a machine learning model, additional parameters may be utilized in the training including primary, secondary, tertiary variables, location of the users, spending habits of the users (e.g., amounts spent on various time intervals), age of the users, marital status of the users, etc.

Based on the correlation of the delta between the user's current credit score and the user's desired credit score with the selected predetermined map, the system obtains the target utilization rate for the user such that obtaining the target utilization rate would result in a modification of the user's credit score by substantially the delta between the user's current credit score and the user's desired credit score, thus, resulting in the user obtaining the desired credit score.

Based on the target utilization rate, the system generates a credit modification model as defined above. The system then transmits instructions causing rendering of information including detail about the credit modification model (e.g., a listing of the actions to be taken to obtain the target utilization rate and, thus obtain the user's desired credit score). The instructions may also cause rendering of user interface elements, (e.g. actionable elements) that are configured to receive user input, wherein receipt of the user input to a particular user interface element initiates one or more actions of the credit modification model. Additionally, the instructions may also cause rendering of additional user interface elements configured to receive user input to be used in the operations to be performed automatically by the system (e.g., login information corresponding to a bank account thereby enabling the system to automatically establish a link between a credit card account associated with the user and a bank account associated with the user in order to establish an automatic payment plan).

In an embodiment, the system can receive input from a user corresponding to modifying the data types used in the scenario 222, allowing the user to modify the number or types of variables used in the scenario 222. The user may then make further changes to the scenario by repeating steps 222 and 224 in the process. The user may also modify the variables used in the scenario to provide hypothetical variables that may affect the outcome.

The system may present actionable elements with each scenario. Once a preferred scenario is achieved a user may use the actionable elements to implement the scenario in a real-world setting 228, as described herein. For example, a scenario including a credit modification model may include actions and messages that implement changes to a user's financial accounts to achieve a selected credit score. Changes to a user's financial accounts can include the accounts to be changed, credit card balance amounts to be paid, the order with which these balances are paid, the timing with which they are paid, and the like. The actionable elements then implement these changes according to the scenario. By way of non-limiting examples, the actionable elements may connect a user with a third party 230, or the actionable elements may provide instructions from the user to the third parties 230. It is also contemplated that actionable elements 180 may send some or all of the instructions at a time best suited to the implementation. In an exemplary embodiment, the actionable elements may print, save, e-mail instructions, connect a user with other tools, third parties, send instructions to third parties, or combinations thereof, to implement the scenario 232, as described herein.

By actioning the actionable elements the user is indicating that a preferred scenario has been achieved. The system may then store the variables, settings, or related data that define the preferred scenario to a relational database 236 where the data may be stored, parsed and analyzed by a predictive scenario engine 238. The system may then use these secondary variables to further refine or optimize the scenarios presented to the user. The system may also share the secondary variables with third parties 240. The system may also use the secondary variables to provide time appropriate advertising, notifications, or alerts to the user 242. It is also contemplated that primary and tertiary variables may also be used in this way.

FIGS. 3A-3E show exemplary embodiments of screen shots from the system of the present invention. In an exemplary embodiment, the screen shot shows a user interface 300. The user interface 300 may be, by way of a non-limiting example, a Home Screen, Dashboard or user account. In an exemplary embodiment, the user interface 300 may be a dedicated page outside of the home screen or dashboard. In an exemplary embodiment a user 170 may establish an account. When establishing an account, the user may be asked to enter data directly into the system. By way of non-limiting examples, such data may include: Personal data such as name, address, phone numbers, e-mail addresses, occupation, date of birth, social security number, or the like; Demographic data such as gender, age, ethnicity, religion, or the like; Geographic data as present location, or the like. In addition, the user may be asked to allow the system 100 access to third parties that have data stored which is either directly or indirectly pertinent to the user. By way of non-limiting examples, such third party data may include: social security numbers, email accounts, DMV records, bank accounts, credit cards, credit reports, credit scores, social media accounts, or the like. The account may be protected by password, PIN, fingerprint recognition, facial recognition, or the like, and provides access to a personalized Home Screen or Dashboard, for example user interface 300, where pertinent information may be summarized and displayed by the system. The user interface 300 may be customizable based on settings and data provided by the user, and/or based on the data provided by the system. It is contemplated that the user interface 300 may be connected in series or in tandem with one or more alternate user interfaces similar to that of user interface 300 and that any combination of one or more user interfaces 300 is contemplated to fall within the scope of the present invention.

The user interface 300 may provide various customizable information windows 302. These windows may, for example, provide various scenario outcomes. These scenarios may be scenarios chosen by the user, or provided by the system based on predetermined parameters, rules or analysis by the predictive scenario engine 190. The system may modify these predetermined parameters or rules based on trends identified by the system from the variables. The windows may provide various gamified user interfaces 350 where a user may easily modify or adjust the outcomes of various scenarios. The user interface 300 may also provide various actionable elements 380. These actionable elements may be used to connect a user with various third parties.

The interface 300 may also provide temporally appropriate or relevant advertisements or notifications 360. The system may use the primary, secondary, and tertiary variables to determine appropriate third parties that can advertise to the user. As discussed herein, it may be appreciated that the advertisements may also include advertising directed to features found within the system as well as from outside the system, third parties, or the like. The system may also assess appropriate goods or services that a user may be interested in based on the scenarios a user has generated. For example, the system may use previously actioned scenarios to determine possible future events or real-time events that a user may require. Accordingly, the system may provide advertisements for goods or services to the user at a time that is most appropriate. The time that is most appropriate may be immediately, in real-time, at a time in the future that the system deems would be most pertinent to the user, or the like. In this way only the most pertinent advertisements are provided to the user thereby lowering consumer fatigue and increasing the likelihood of a user using the advertised link. It is contemplated that these advertisements may also be presented on other interfaces within the system, at various relevant stages within the process, as well as via various forms of communication outside of the system while still remaining within the scope of the present invention. By way of a non-limiting example, the advertisements may be provided as part of an email, text message, or notification within an application. In an exemplary embodiment, the advertisements may be provided as part of the users social media profile, or as part of a website that the user is visiting, or the like.

In an exemplary embodiment, the system provides notifications in the form of alerts 370. The system may monitor primary, secondary, tertiary variables, or combinations thereof and provide alerts 370 to the user based on a set of predetermined rules, trends derived from variables, or combinations thereof. These alerts 370 may notify the user of any changes detected in the primary, secondary, tertiary variables. The alerts 370 may also provide one or more gamified scenarios based on the changes detected. These gamified scenarios may be similar to those discussed herein. These alerts 370 may, for example, notify a user of any change detected in one or more of the primary, secondary, tertiary variables, before, during, or after the change has taken place. The system may then provide a gamified scenario based on this change where a user may see what effect this change may have. Similar to the gamified interfaces discussed herein, the gamified scenario may show the expected impact of this change. The user may then choose to modify the outcome of the scenario to a preferred scenario. The system will determine what other changes the user should implement in order to achieve the new outcome.

In an exemplary embodiment, the alerts 370 notify a user of any change detected that may affect an outcome of a previous scenario. These alerts 370 may occur either before, during or after the scenario has been implemented in a real-world setting. These alerts may be presented to the user by way of a variety of communication means. By way of non-limiting examples, these communication means may include emails, phone calls, SMS messages, text messages, pop-ups or windows within the interface, pop-ups or windows within the users' web browser or social media site or the like, direct mailing, or the like. In an exemplary embodiment, the system may detect an action by the user by way of primary, secondary, tertiary variables, or combinations thereof. The system then determines by way of predetermined rules, trends derived from primary variables, secondary variables, tertiary variables, or combinations thereof that the action taken by the user may prevent a scenario from achieving a preferred outcome. The system may then provide an alert 370, or similar notification to the user. The alert 370 may for example provide advice regarding whether or not to continue the action. The alert 370 may for example provide the affected scenario and allow the user to modify the scenario. The alert 370 may for example provide a different scenario that now incorporates the previously implemented scenario as well as the new action affecting it so that a user may take steps to determine a new outcome. In an embodiment, alerts 370 may provide rewards or encouragement to the user in order to help achieve the preferred outcome. Alerts 370 may show how much change in the primary, secondary, tertiary variables has already been achieved, and how much is left to change before the preferred outcome is achieved. The rewards or encouragement provided by the system may include medals, trophies, videos, gifts, or similar rewards provided as part of the system. Such rewards may be displayed as part of the user's profile and may serve to motivate continued change in a real world setting in order to achieve the implemented preferred outcome, or continued usage of the system in general. It may be appreciated that other alerts, actions, advice, tools, gamified scenarios, advertisements, notifications or the like may be provided to the user by way to the Alert 370 and fall within the scope of the present invention.

Based on the primary and tertiary variables obtained by the system, the system may then utilize secondary variables to provide various scenarios that are most pertinent to the user. In an exemplary embodiment, a user may select specific pre-determined scenarios provided by the system. The system may also provide customizable scenarios to the user.

Figure 3A:
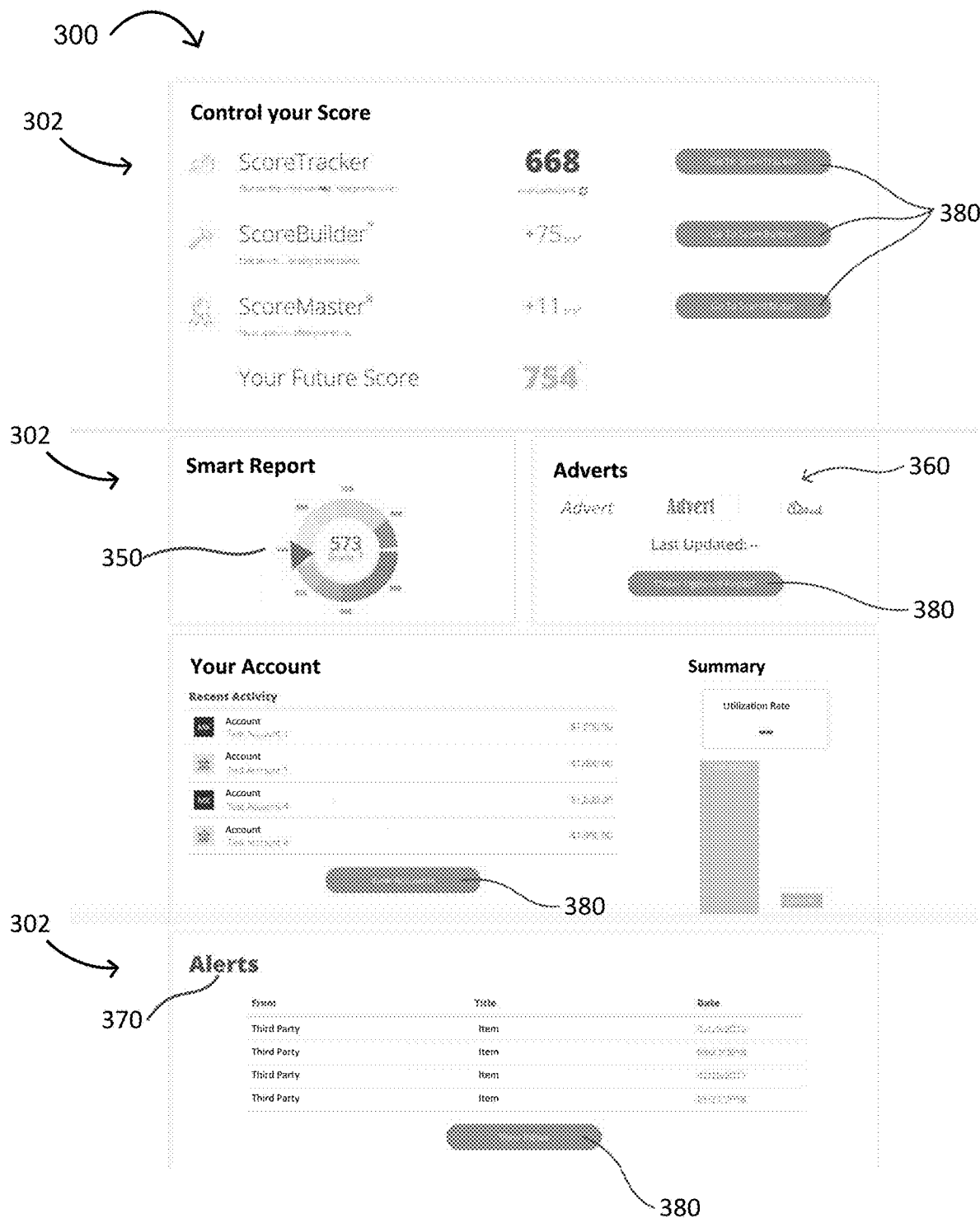
FIG. 3A illustrates an exemplary gamification interface of the system, in accordance with the present disclosure.
Figure 3B:
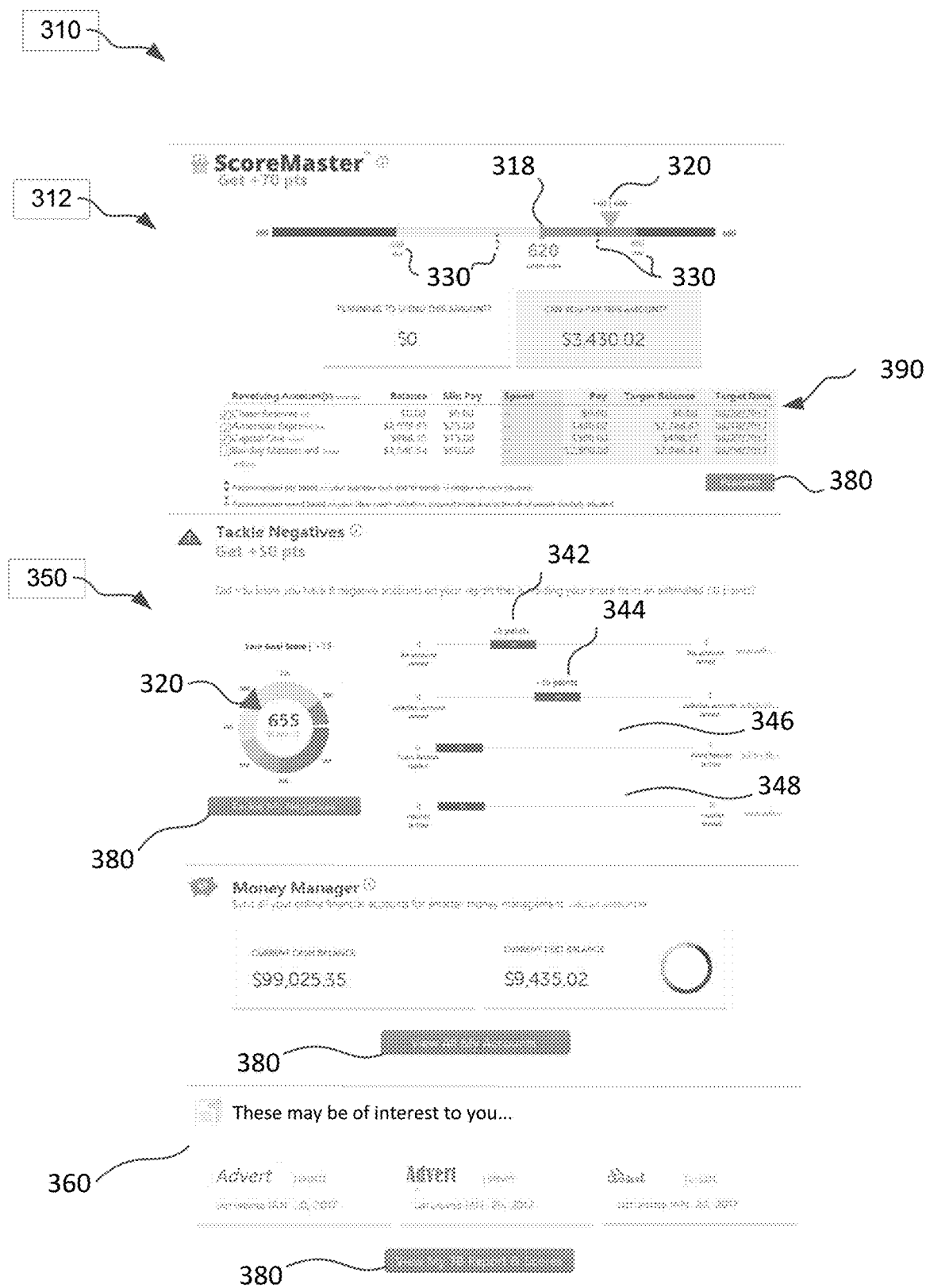
FIGS. 3B-3E illustrate exemplary gamification interfaces of the system, in accordance with the present disclosure.

FIGS. 3B-3E show exemplary embodiments of screen shots from the system of the present invention. The exemplary screen shots show a user interface 310. The user interface 310 may be, by way of a non-limiting example, a Home Screen, Dashboard or user account similar to that of 300, and linked with a user account similar to embodiments described herein. The user interface 310 may include various gamified scenarios 312, 350 that may be presented directly on the home screen. Similar to embodiments described herein, the gamified scenarios 312 may include potential outcomes of the scenario 320 shown as a gamified user interface. As described herein, a user may custom build the scenario, choose from a library of predetermined scenarios that may use predetermined rules, or the system may use primary, secondary, tertiary variables, or a combination thereof to pre-empt the one or more scenarios that would be most pertinent to the user. The system may use trends identified by the system from the primary, secondary, or tertiary variables to modify the rules and better determine the most appropriate scenario The system may use one or more of the primary, secondary, and tertiary variables that are most pertinent to the scenario and determine possible outcomes to the scenario. As shown in FIG. 3B, the potential outcomes 320 of the scenarios 312, 350 are shown as a gamified graphical interfaces such as slide bars or wheels, although other gamified graphical interfaces are contemplated as described herein. In an exemplary embodiment, the gamified graphical interface may include a primary marker 320 denoting a specific outcome, while one or more secondary markers 330 denote alternate possible outcomes, ranges of possible outcomes, recommended outcomes, ranges of recommended outcomes, or the like. It is contemplated that any number of primary or secondary markers 320, 330 may be used to denote various outcomes or ranges.

Figure 3C:
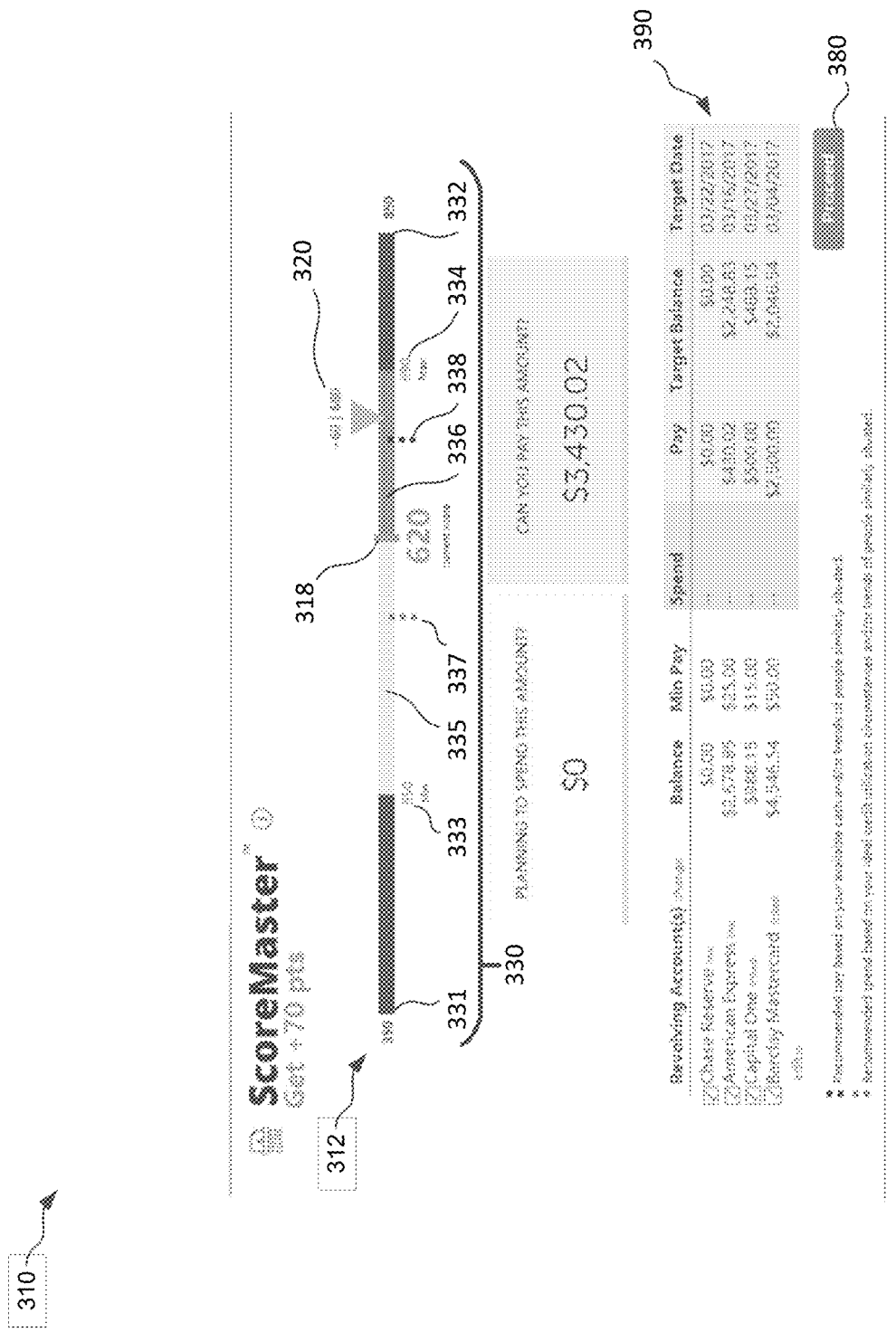

As best seen in FIG. 3C, and by way of a non-limiting example, a first primary marker 318 may denote the current outcome based on the variables initially inputted into a scenario. A second primary marker 320 may denote a preferred or optimal outcome as initially determined by the system using secondary variables. The system may allow the user to move the second primary marker 320 to a preferred outcome.

In an exemplary embodiment, the system provides one or more secondary markers 330. These secondary markers may indicate points or ranges showing minimum and maximum possible outcomes 331, 332, minimum and maximum achievable outcomes based on the variables in the scenario 333, 334, the outcomes most recommended, or most frequently chosen 337, 338, or the like. The secondary markers may be based on, for example, previous behavior of the user, of a group of users, other variables, or the like. The user interface 310 may use various colors, textures or other indicators to denote various ranges 335, 336. In an exemplary embodiment, the secondary markers 330 may denote different ranges by which the preferred outcome 320 may be modified, range of outcomes that are most favorable to the user, previous behavior of the user, or similar users when faced with a similar scenario, such as, for example, a range of outcomes that are most commonly selected by other users in the same demographic, or the like. In this way the scenario 312 may provide guidance to the user. In exemplary embodiments, the user interface 310 may show additional information 390 such as the variables used in the scenario, the degree of change for each variable for achieving the preferred outcome 320, or the like. In exemplary embodiments, the primary and secondary markers 320, 330 may include additional information, such as for example, specific numeric values detailing the outcome, ranges, or other quantitative or qualitative information.

Figure 3D:

In exemplary embodiments, and as best seen in FIG. 3D, a combination of gamified graphical interfaces 350 is used. These may, for example, highlight how certain variables have a greater impact on the preferred outcome than others. For example, the combination gamified interface 350 shows a potential outcome or current situation indicated by primary marker 320. The user may move the primary marker 320 to a preferred outcome and the associated sliders 342-348 may show the relative changes required of the different variables, or groups of variables, used in the scenario to show how the outcome 320 may be most efficiently achieved. For example, the first slider 342 may highlight to a user that changing all three of these particular variables may only achieve half as much improvement towards the desired outcome compared with changing the two variables of the second slider 344. Similarly, changing the one variable of the slider 346 or the two variables of 348 may have no effect on achieving the preferred outcome. Furthermore, for example, having provided a first preferred outcome, the user may not want to modify the particular variables represented by slider 342. Accordingly, the user may choose to further modify the outcome of the first scenario or modify the variables 342. In doing so, the system may provide a second scenario in response to these modifications. In this way the gamified scenarios allow a user to achieve the most efficient preferred outcome.

Figure 3E:
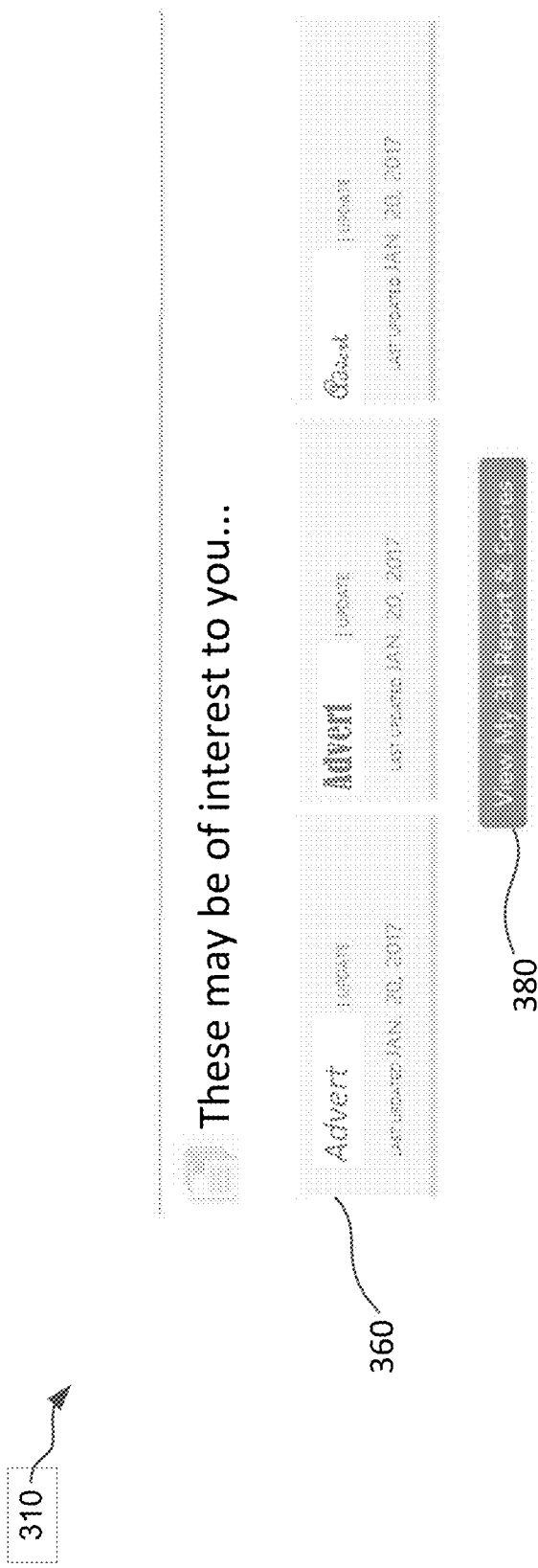

In exemplary embodiments, the scenarios 310, 312, 350 include actionable elements 380, which allow a user to implement the preferred scenario or outcome in a real-world setting as described herein. As best seen in FIG. 3E, the gamified user interface 310 may also include temporally relevant advertisements 360 based on the users current or previously implemented scenarios, primary, secondary, tertiary data, or combinations thereof. The system may use these scenarios or variables to establish which goods or services may be most relevant the user. The system may also determine when these goods or services would be most relevant to the user. In an exemplary embodiment, the system may determine that to implement a preferred scenario certain instructions may need to be implemented immediately, whereas a second set of instructions may need to be implemented once the first set of instructions have taken effect. Accordingly, the system may prevent the advertising of various goods and services that are relevant to the second set of instructions until the first set of instructions have taken effect. In this way the user is prevented from experiencing consumer fatigue and the advertisements are presented when they are most effective. It is contemplated that the advertisements may be provided to the user by a variety of means that fall within the scope of the present invention. Such means may include, but not limited to, emails, phone calls, SMS message, text message, pop-ups or windows within the interface of the system, pop-ups or windows within the users web browser, within social media sites, direct mailing, reactive billboards, or the like.

Figure 4A:
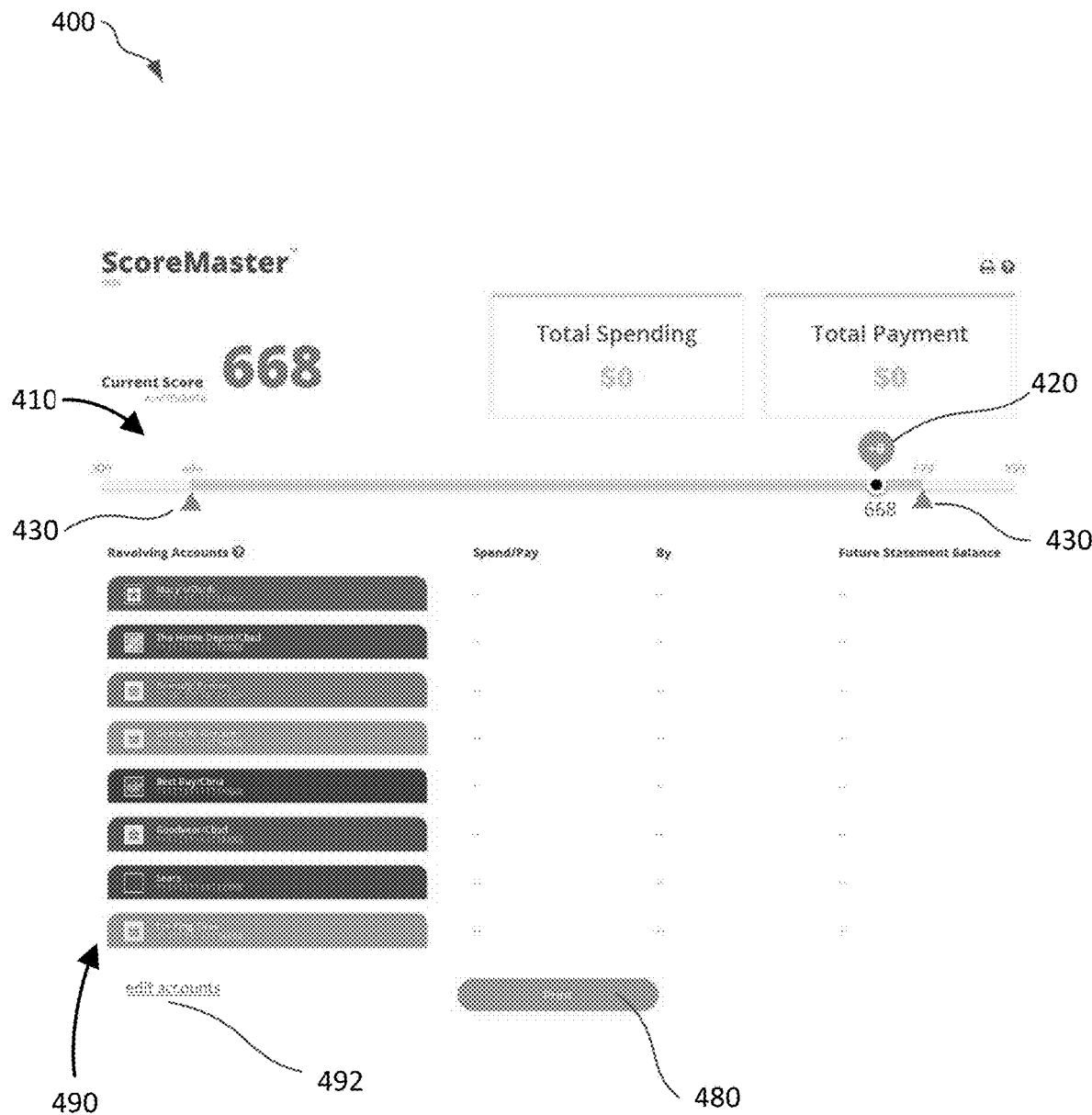
FIG. 4A illustrates an exemplary gamification interface of the system, in accordance with the present disclosure.

FIG. 4A shows an exemplary embodiment of a gamified user interface for a given scenario 400. As discussed herein, a user may custom build the scenario, choose from a library of predetermined scenarios, or the system may use trends, secondary variables, or the like, to pre-empt the one or more scenarios that would be most pertinent to the user. It is contemplated that primary and tertiary variables may also be used. It may also be appreciated that alternate gamified graphical interfaces also fall within the scope of the present invention, including slide wheels, temperature gauges, charts, or the like. In addition the system may use secondary variables to determine more accurate outcomes for the primary and secondary markers 420, 430. It is also contemplated that primary or tertiary variables may also be used.

The system may use one or more of the primary, secondary, and tertiary variables that are most pertinent to the scenario and determine possible outcomes to the scenario. As shown in FIG. 4A, the potential outcome of the scenario 410 is shown as a gamified graphical interface. In an exemplary embodiment, gamified graphical interface of the outcome 410 may be a slide bar with a primary marker 420 denoting a specific outcome, while one or more secondary markers 430 denote alternate possible outcomes, or denote a range of possible outcomes. It is contemplated that any number of secondary markers 430 may be used to denote various ranges. By way of a non-limiting example, a first set of secondary markers 430 may denote a maximum or minimum possible range of outcomes, while a second set of secondary markers 430 may denote a range of outcomes that may have, for example, a negligible impact on a particular variable. It is contemplated that any number of such markers may be configurable within the scenario either by the system or by the user. In an exemplary embodiment these markers may show points or ranges that include suggested or most likely outcomes, recommended outcomes, and may use the primary, secondary, tertiary variables or combinations thereof of the user or other users to determine these points or ranges. These points or ranges may be determined by way of a set of predetermined rules, trends derived from primary, secondary, tertiary variables, combinations thereof, or the like. It may be appreciated that primary and secondary markers 420, 430 may include arrows, triangles, bubbles, or any similar icon, shape, color, color change, or color gradient to indicate the markers or ranges. It may also be appreciated that alternate gamified graphical interfaces also fall within the scope of the present invention, including slide wheels, temperature gauges, charts, or the like. In addition the system may use secondary variables to determine more accurate outcomes for the primary and secondary markers 420, 430. It is also contemplated that primary or tertiary variables may also be used.

The gamified user interface 400 may also show one or more variables 490 that were used in determining the outcome, or the variables that have the most significant effect on the outcome. The user may be able to add or remove specific variables to be used in the scenario, this may be provided directly within the scenario or by way of a link 492 to a sub-screen. It is also contemplated the user may set 'default' preferences on which variables are to be included or ignored from the scenario. For example a user may pre-select certain variables to be included or excluded from one or more types of scenarios. Various combinations of which are contemplated to fall within the scope of the present invention.

In an exemplary embodiment, a user can alter the outcome of the scenario by moving the primary marker 420 to a desired position. In response to the new position, the system may present a second scenario which may show different variables involved in the scenario, changes to the existing variables involved in the scenario, or a combination thereof that may be utilized to achieve the new outcome selected by the user. Based on the second scenario, a user may further adjust the primary marker 420 to select a new outcome, wherein the system may provide a third scenario which may show different variables involved in the scenario, changes the existing variables involved in the scenario, or a combination thereof that may be utilized to achieve the new outcome selected by the user. The user may continue as such until the preferred scenario or outcome, scenario-n has been achieved.

It is contemplated that the scenario may also allow a user to amend the number, type, or value for one or more variables used in the scenario. In response to which the system may present a subsequent scenario with a new outcome based on the amended one or more variables. In an exemplary embodiment, the gamified user interface 400 provides one or more actionable elements 480. Once a preferred scenario is achieved a user may action the actionable element 480 to implement the scenario in a real-world setting.

By way of a non-limiting example, the system may collate, analyze and display various user information such as personal, psychographic, economic and demographic variables data for a user. The system may determine that there are enough variables to provide, for example, a gamified credit score scenario, e.g. a credit modification model, and may present the credit score scenario to the user on the home screen or dashboard 300. It is also contemplated that the scenario may be presented on a dedicated page outside of the homes screen or dashboard 400. In an exemplary embodiment, the scenario may be presented by way of a communication interface outside of the system such as an e-mail, text message, social media profile, or the like. In an exemplary embodiment, the user may choose a credit score scenario from a library of scenarios. If the user chooses the credit score scenario, the system may request further primary data or access to further secondary or tertiary variables before a gamified credit score scenario can be run. The system may then provide a first scenario in the gamified credit score scenario. The first scenario may show a gamified user interface 410 that shows all possible credit scores for a user on an interactive slider or similar graphical interface. The secondary markers 430 may show the maximum and minimum possible credit scores for a user, or may show ranges of outcomes, or may show ranges of outcomes previously achieved by other users in a similar scenario with a similar demographic. It may be appreciated that similar uses for the secondary markers fall within the scope of the present invention. The primary marker 420 in the first scenario may show the current credit score for the user, another primary marker may show the preferred credit score for the user based on the current variables in the system.

The exact positions for the primary and secondary markers may be initially determined based on primary variables entered by the user, or directly from tertiary variables provided by one or more third parties, such as for example various credit reporting agencies. In an exemplary embodiment, the system may leverage secondary variables to determine the typical credit score for a user with similar personal, psychographic, economic and demographic variables. In an exemplary embodiment, or in addition to, the system may use some or all of the primary, secondary and tertiary variables to determine the most accurate credit score for a user. The system may also provide one or more variables 490 that were used to determine the credit score, for example the credit cards, bank accounts, tangible assets, or the like used to determine the scenario. In an exemplary embodiment, the system may provide the variables that have the most significant effect on the credit score. For example, system may display one or more credit cards with a high utilization percentage, a store card with a high APR, a late payment on an auto loan, or the like.

The user may then choose to alter the primary marker 420 to a preferred credit score. It is important to note that the preferred credit score may not be the maximum possible credit score obtainable by a user. Further, the preferred credit score may also be less than the users current credit score. Once a preferred credit score is selected the system may display the changes to the pertinent variables that may be utilized required to achieve the preferred score.

In exemplary embodiments, a user may utilize a down payment on a house, accordingly the user may modify the outcome to decrease the preferred credit score to a level that still remains within a certain loan bracket, as indicated by secondary markers. The system may then show which variables need to be adjusted in order to decrease the credit score to the desired level. In doing so, funds that were previously dedicated to paying down loans to achieve a maximum possible credit score, are now available for a down payment. In exemplary embodiments, a user may also choose to increase the credit score by only a few points in order to qualify for a mortgage, the system may display the actions to be conducted to facilitate such a change, such as pay off a given amount of one or more credit cards, close a particular account, or the like. The system may also factor in that certain actions have a greater effect on a user's credit score, in this way the most efficient way of achieving a desired credit score may be achieved.

It is also contemplated that certain actions may have a greater effect on an outcome than others. Further, the synergistic effects of two or more variables may have a greater impact on the outcome. Accordingly, the system may determine these differences in order to achieve the preferred outcome in the most efficient way possible. The system may determine these differences based on a set of rules, these rules may be predetermined or may be modified based on trends determined from primary, secondary, or tertiary variables, or combinations thereof. For example, a user may also necessitate changes to available cash and may contemplate an acceptable decrease in credit score to facilitate this. In which case a user may move the primary marker to a lower credit score and system may determine and display which variables may be modified to allow such a change. It is further contemplated that once the primary marker has been set to a desired credit score, the user may want to further fine tune the scenario but adjusting specific values for the variables should a given value be too high or low.

In this way a user is able to adjust, manipulate, or modify an outcome to a scenario until the user has achieved the preferred scenario. Accordingly, the various personal, psychographic, economic and demographic variables have been gamified in a meaningful way to the user. Once the preferred scenario has been achieved the user may action the actionable element to implement the changes presented in the credit score scenario. These actionable elements may include printing, saving, sending, emailing a list of instructions for a user to carry out. In an exemplary embodiment, the actionable element may connect the user with one or more third parties, such as the bank accounts or credit cards, in order to implement the payments directly, the actionable element may also connect the user with a 'coaching' program or tutorial or a live sharing of the tool with other third parties. By way of a non-limiting example, the actionable elements may connect a user directly with a banks bill pay system. In an exemplary embodiment, the actionable elements may connect a user with additional tools and provide instructions to these tools to implement the changes at an appropriate time. By way of non-limiting examples, these tools may include a budgeting tool that may be part of the system or tools that may be external to the system, such as for example, MINT.COM®, or the like. It is also contemplated that the actionable elements may connect the user with other tools, either internal or external to the system, that are most pertinent to implementing the specific scenario, depending on the type of scenario. In an exemplary embodiment the actionable element may also connect a user to a tool for producing a Gantt chart that shows the steps involved in implementing a building project. It also is contemplated that the actionable elements may either connect a user with a third party or may send instructions on behalf of the user to the third party for the third party to implement. It is also contemplated that all or part of the implementation instructions may advantageously be disseminated at one or more given time frames in the future. Accordingly when the actionable element is actioned, the system may determine which parts of the scenario need to be actioned and when and will schedule instructions to be disseminated at the appropriate times in order to implement the scenario.

In an exemplary embodiment, once the preferred scenario has been achieved the system determines which advertisements may be temporally most relevant to the user. It is contemplated that temporally appropriate advertisements may not be restricted to after the scenario has been actioned. For example, the system may determine that the user is looking to buy a house, either from the type of scenario being run or by the variables used in a scenario, or combinations thereof. The system may determine that the user is not in a position to buy a house yet, instead the user is in need of a better auto loan to achieve a desired credit score to achieve desired mortgage rate. Accordingly the system may initially provide advertisements for competitive auto loans. Once the scenario and the system is able to see that an auto loan may be applied for, the system may restrict the advertisements from auto loan companies and instead provide advertisements for house listings. In an exemplary embodiment, the user may generate a scenario to set a desired credit score, and the system provides actionable elements to achieve the desired credit score. Once the scenario has been implemented in a real-world setting the user may then carry out one or more subsequent actions that prevent the preferred outcome of the scenario from being fulfilled. The system may provide an advert, pop-up notification, or similar notice either before during or after the one or more subsequent actions informing the user that these actions may prevent the preferred outcome of the scenario from being fulfilled. The advert, pop-up notification, or similar notice may also provide the user with alternate or further actions that either may not prevent the preferred outcome of the scenario from being fulfilled or may offset the subsequent actions effects on the preferred outcome of the scenario. Although these are highly simplified examples, it will be appreciated that any number of third parties, variables, or scenarios, or combinations thereof may be used to provide temporally appropriate advertising to the user. In this way consumer fatigue is reduced since only the most relevant advertisements are presented to a user at a given time, further the effectiveness of advertisements is maximized.

Figure 4B:
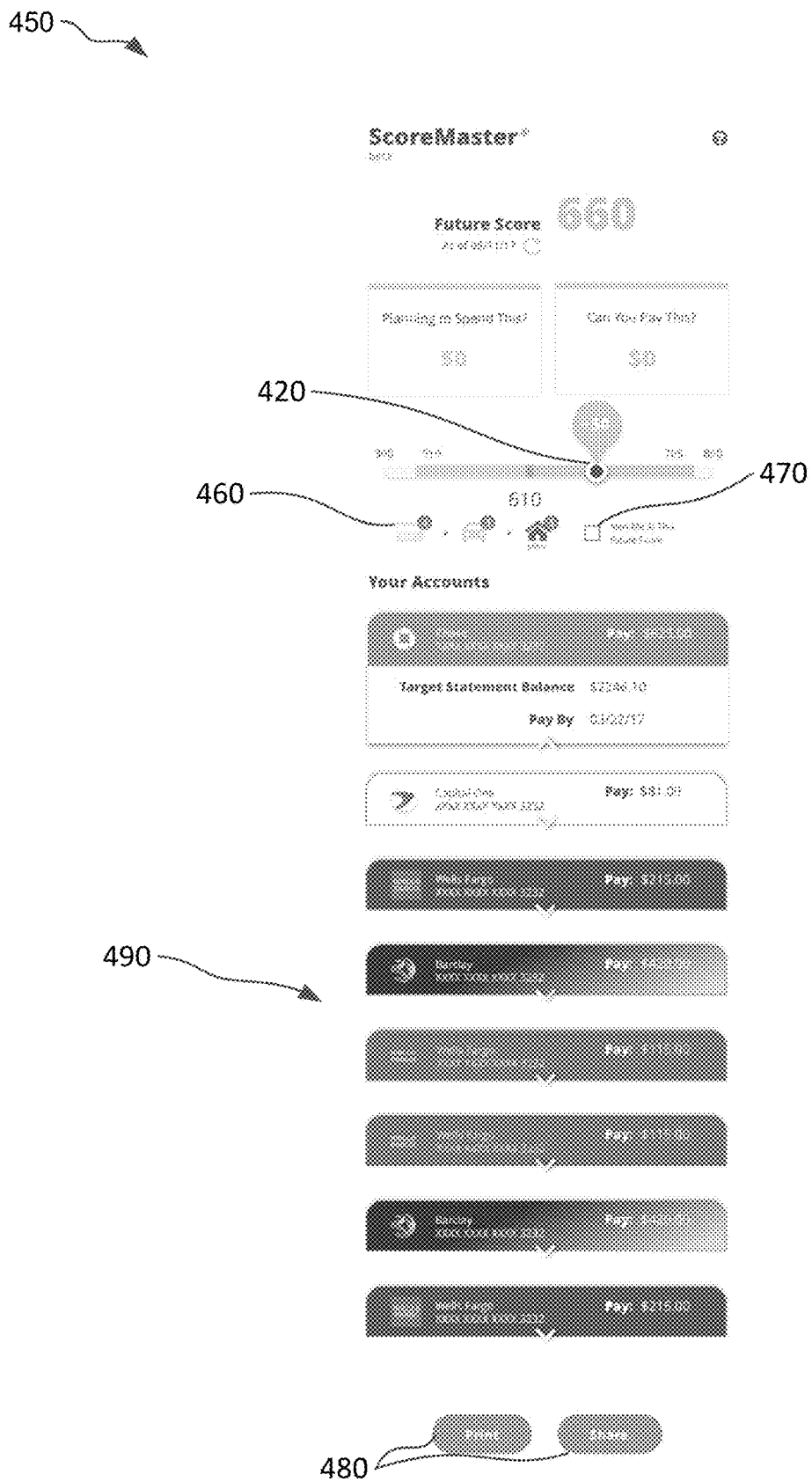
FIG. 4B illustrates an exemplary gamification interface of the system, in accordance with the present disclosure.

In an exemplary embodiment, as shown in FIG. 4B, a gamified user interface for a scenario is provided as a mobile application (hereinafter, "app") interface. A scenario 450 may provide an adjustable preferred outcome 420, as described herein. The system may further provide one or more icons 460 associated with the preferred outcome 420. Each of these icons 460, may be associated with one or more advertisements for goods or services 360, notifications or alerts 370, or actionable elements 380, 480. The icons 460 may connect a user with goods or services associated with one or more third parties, or implement certain actions in a real-world setting. In an embodiment, as the user modifies the preferred outcome 420, the system may dynamically determine which goods or services become available, or no longer become available. Accordingly, the system 100 may display different types of icons 460 with different associated numbers depending on the preferred outcome selected by the user. In an embodiment, having reviewed the potential goods and services available, a user may choose to further modify the preferred outcome 420. Accordingly, as described herein, the system may provide further scenarios including what actions are undertaken to be taken in a real world setting in order to achieve the modified outcomes and therefore achieve the associated goods and services represented by icons 460. Advantageously, these icons 460 further help the user by interpreting how a preferred outcome may relate to various goods and services that may be beneficial to the user. Accordingly, the user be able to determine a scenario that provides a beneficial outcome.

The system may also provide a user with a notification option 470 associated with the icons 460. By selecting the notification option 470, the user may indicate they wish to receive alerts or notifications 360 directed to the preferred outcome and associated goods and services that may be available once the preferred outcome is achieved. For example, once the notification option 470 has been selected, and a scenario has been implemented, the system may alert the user when the preferred outcome 420 is being approached, has been reached, or a combination thereof. The system may also alert the user when certain goods or services become available as a result of approaching or achieving the preferred outcome. The system may also provide alerts 360 directed to various actionable elements which may be implemented at the appropriate time in order to achieve the preferred outcome of the implemented scenario. As described herein, the scenario may also show the variables used in the scenario 490 and the changes associated therewith in order to achieve the preferred outcome 420, together with actionable elements 480 to implement these changes in a real-world setting.

Figure 4C:
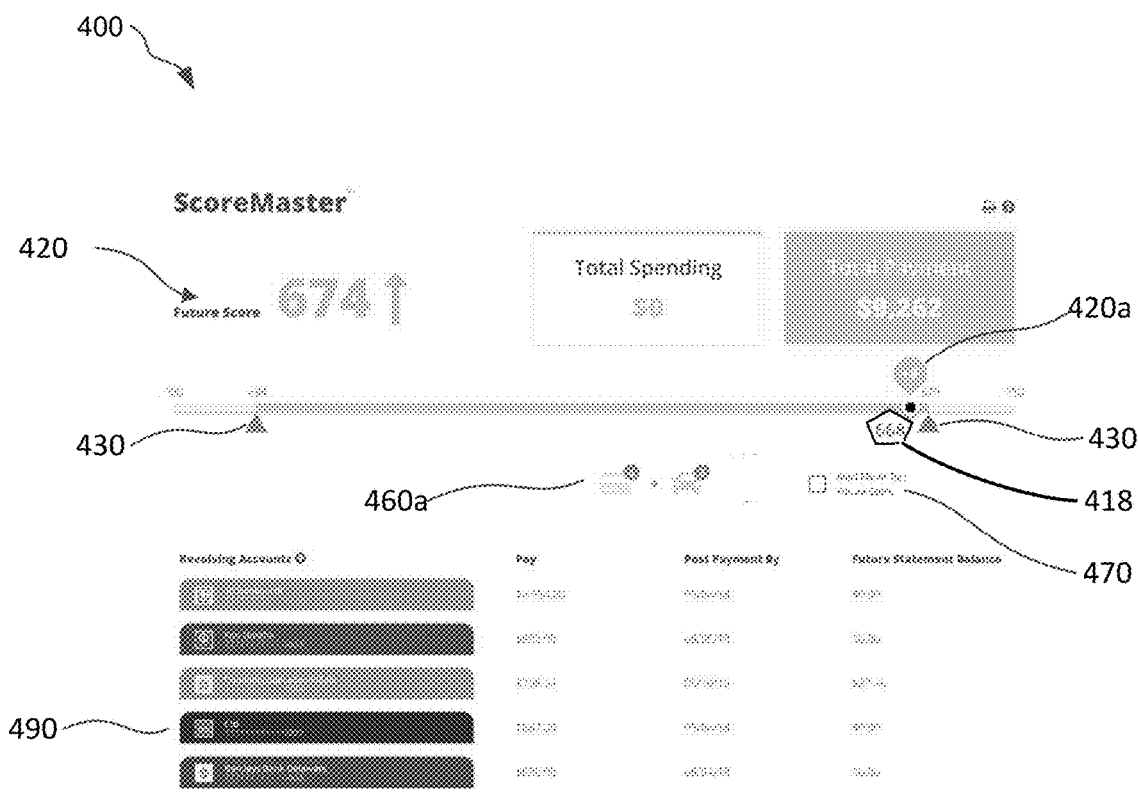
FIGS. 4C-4E illustrate exemplary gamification interfaces of the system, in accordance with the present disclosure.
Figure 4D:
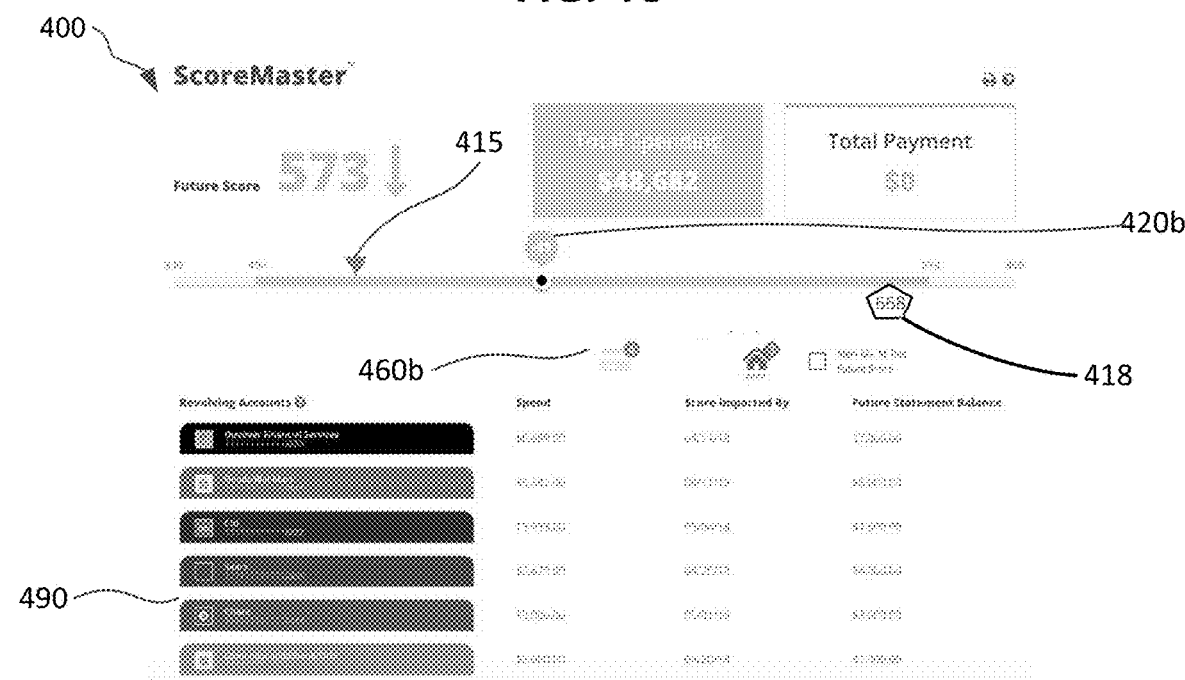

FIGS. 4C-D show embodiments of a gamified user interface 400 for a scenario, showing a current outcome 418 as well as a preferred outcome 420a, 420b. As described herein, the preferred outcomes 420a, 420b may be initially determined by the system from secondary variables and/or may be set and further modified by the user. As a user modifies the preferred outcome (e.g. from 420a of FIG. 4C to 420b of FIG. 4D) different sets of icons 460a, 460b, respectively, may be displayed. The system may determine which goods and services may be available to the user based on primary, secondary, or tertiary variables. The system may determine a given range of outcomes, within which certain goods or services may become available. By selecting any of the icons 460, a user may then access more details about each of these goods and services, either provided by the system, or by providing direct access to a third party. Additional details may be provided, by way of a pop-up display, navigating access to another screen, providing access directly to a third party, or the like. The system may also provide a notification option 470 associated with the preferred outcome 420, as described herein. Further, the system may display the variables 490 and associated changes thereof, which would need to occur in order for the user to achieve the preferred outcome 420.

Figure 4E:
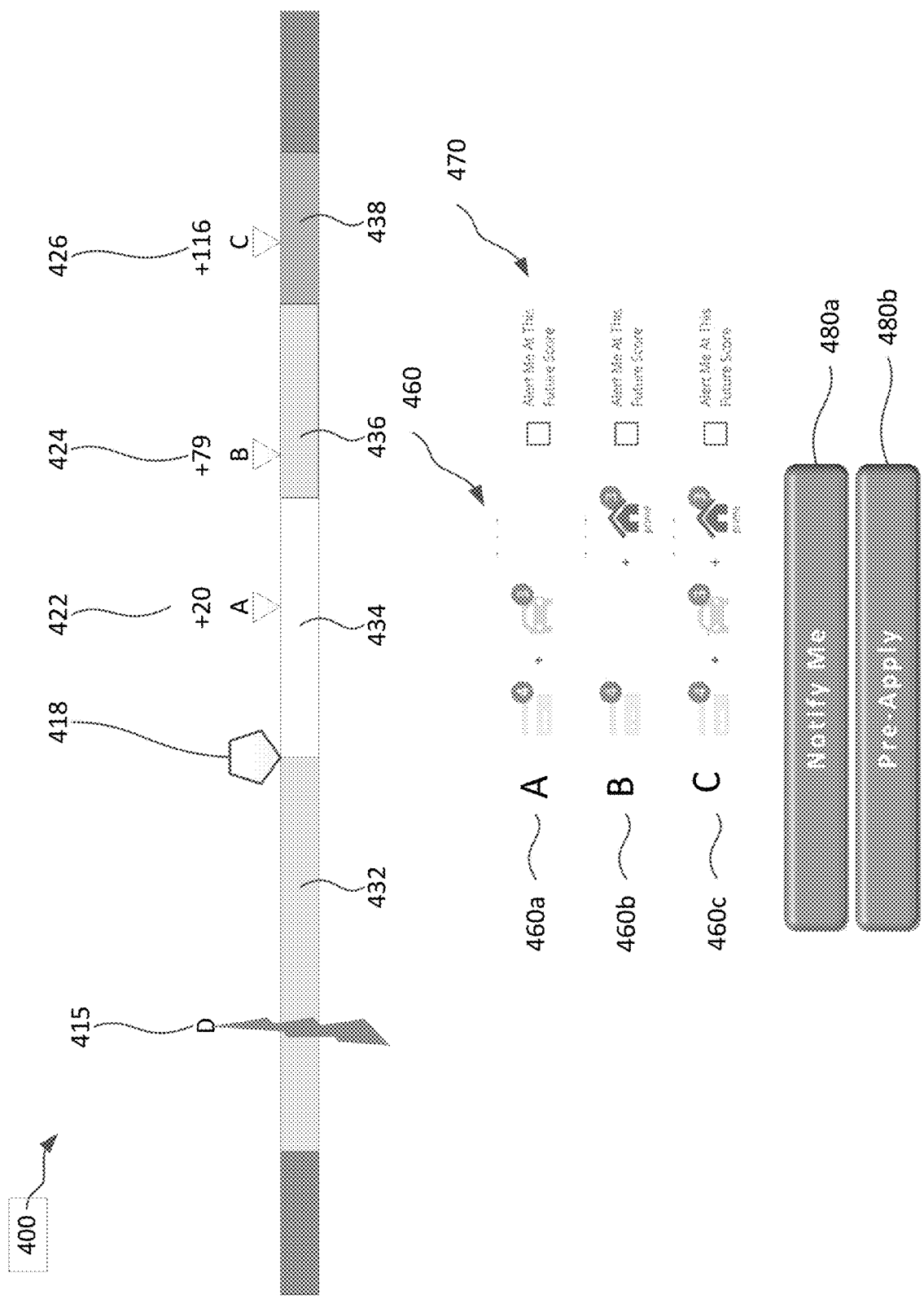

In an embodiment, FIG. 4E shows a gamified user interface 400 with one or more separate primary markers 422, 424, 426 being displayed, and one or more sets of icons 460a-c being associated with the one or more primary markers 422, 424, 426, respectively. The system may provide the current outcome 418 based on the current variables as well as one or more primary markers 422, 424, 426 indicating one or more preferred outcomes. As described herein, these preferred outcomes 422, 424, 426 may be initially determined by the system from secondary variables and/or may each be further modified, independently of one another, by the user. The scenario may further provide one or more sets of icons 460a-c which may be associated with each of the respective outcomes 422, 424, 426. The number and type of icons associated with each outcome may vary and may indicate which goods or services maybe available as a result of achieving each of the outcomes 422, 424, 426.

In an embodiment, each of the different sets of icons 460a-c may be associated with a different 'buckets' or ranges of outcomes, as illustrated by secondary markers, e.g. different shaded bars 432, 434, 436, 438, as determined by the system. For example when one of the primary markers, e.g. marker "A" 422, is placed within a range of possible outcomes indicated by shaded bar 434, icon set 460a may be displayed as associated with marker "A" 422. Similarly, when one of the primary markers, e.g. marker "B" 424, is placed within a range of possible outcomes indicated by shaded bar 436, icon set 460b may be displayed as associated with marker "B" 424. Similarly, when one of the primary markers, e.g. marker "C" 426, is placed within a range of possible outcomes indicated by shaded bar 438, icon set 460c may be displayed as associated with marker "C" 426. It will be appreciated that further sets of icons may be displayed with other ranges, for example range 432, within the gamified user interface 400. Since more than preferred outcomes are indicated, by way of primary markers 422, 424, 426, it will be appreciated that more than one set of icons may be displayed. Further, although the ranges 432, 434, 436, 438 are displayed in the gamified user interface as shaded bars for illustrative purposes, it is contemplated that the system may not display the specific ranges to the user and instead only show the one or more sets of icons associated with the one or more primary markers.

In an embodiment, the system may modify the number of possible outcomes associated with each of the ranges. Stated differently, the system may modify the 'size' of ranges 432, 434, 436, 438. Further, the system may modify the types and numbers of icons, and therefore the associated goods and services, which may be displayed when a given primary marker is within one of the ranges or buckets. These modifications may be determined by the system based on the modifications to the primary markers provided by the user, and/or on primary, secondary, and tertiary variables. Although primary markers 422, 424, 426 are shown as increasing from the current outcome, it is also contemplated that one or more of the primary markers 422, 424, 426 may be shown as decreasing from the current outcome 418, e.g. moved to range 432, as discussed herein.

In an embodiment, a user may use the icons 460 to review the potential goods and services available. As described herein, as a user modifies the preferred outcome 420, or preferred outcomes 422, 424, 426, the system may provide further scenarios detailing what actions are sought in order to achieve the modified outcomes. In addition, the system may also provide icons detailing the different goods and services associated with the modified outcomes. Accordingly, a user may choose to modify one or more of the preferred outcomes 420, 422, 424, 426 until the desired icons 460 representing the desired goods and services become available. In this way the system may interpret how a preferred outcome will relate to various goods or services desired by the user.

In an embodiment, once a user is satisfied with the outcome, the user may choose to implement the scenario by way of actionable elements 480 as described herein. Once a scenario has been implemented in a real world situation, the system may provide temporally appropriate notifications to the user, as the real world situation progresses towards the preferred outcome. For example, the system may provide notifications to a user advising that the user has almost achieved the preferred outcome. The system may offer rewards within the system, for example, medals, points, trophies, encouragement, avatars, or the like. Where scenarios may include multiple preferred outcomes, the system may provide alerts or notifications 370 indicating which outcomes have already been achieved and how close the user is to achieving the next preferred outcome. In this way the system may continue to motivate the user's real world actions to achieve the preferred outcome or outcomes, while the scenario is being implemented.

It is contemplated that once a scenario has been implemented, but before a preferred outcome of the scenario has been achieved, there may be a change in the primary, secondary, or tertiary variables that may be detrimental to achieving the preferred outcome. Such changes may sought further action from the user, either by modifying the variables in the scenario or by modifying the preferred outcome of the scenario. Accordingly, the system may provide alerts or notifications 370, to a user, advising of possible actions that need to be implemented in order to maintain the original preferred outcome, or provide a modified preferred outcome. As described herein, these alerts may be provided as emails, texts, pop-up notifications, or the like.

In reference to FIGS. 4A-E, and continuing the illustrative example of a credit score scenario, the system may provide a gamified credit score scenario showing a current credit score 418, and a preferred credit score 420 as initially determined by the system. Associated with the preferred credit score 420 may be a set of icons 460. A user may then modify the outcome 420 to alternate preferred outcomes (e.g. 420*a* in FIG. 4C or 420*b* in FIG. 4D.) It is important to note that the preferred outcome 420 may be modified to be lower than the current credit score 418. As the user modifies the preferred outcome 420, the system may provide alternate scenarios including alternate variables 490, or combinations thereof. Further, the system may provide alternate combinations of icons (e.g. 460*a* in FIG. 4C or 460*b* in FIG. 4D) that represent alternate goods and services that may be available as a result of the modified preferred outcome. For example, as shown in FIG. 4D, a user may be able to modify the scenario to show a drop in credit score 420*b*. Even though the credit score has decreased, the system may show that a desired credit card offer or mortgage is still available 460*b*. Accordingly, a user may be able to determine how much of a drop in credit score may be sustained while still being able to achieve certain goods or services.

The system may further provide one or more safety markers 415. Although safety marker 415 is shown as a secondary marker in FIGS. 4D-E, it is contemplated that the safety marker 415 may also be an alert or notification 370, as described herein. Safety marker 415 may indicate to a user that should the preferred outcome 420 be modified past this point, then this may trigger changes in the variables that may be detrimental to the user. By way of an illustrative example, a user may generate a scenario to indicate whether or not they may be able to buy a car and how much down payment they are able to provide. However, if such actions may jeopardize a user's potential to buy a house, i.e. may jeopardize the success of another scenario that may already be implemented, such actions may be undesirable. Accordingly, a user may be able to use the scenario to determine how much decrease in credit score may be sustained during the process of applying for buying a car without impacting the user's implemented scenario directed to buying a house.

In an embodiment, the safety marker 415 may not initially be displayed in the scenario. Instead, the safety marker 415 may be an alert 370 that is displayed when the primary marker 420 passes a threshold, as represented by marker 415. For example, decreasing the preferred credit score 420 past the safety marker 415 may result in triggering a reaction from one or more of the third parties that results in decreasing the available credit limit to the user. The safety marker 415 may be determined by tertiary variables such as instructions directly from a third party. Alternatively, the safety marker 415 may be determined by secondary variables based on information from similar scenarios from other users of the system, or combinations thereof. In this way, the system may provide a 'safe guard' to the user to prevent selecting an outcome that may directly or indirectly affect the user, or other scenarios or outcomes in a detrimental way.

While the above examples are directed to credit scores, it will be appreciated that the system may provide other scenarios encountered by a user directed to other aspects of a user's life. For example, the system may help children or young adults to understand about savings and to motivate them towards certain savings goals. These secondary icons may direct the user towards demographically appropriate products. Equally the system may provide scenarios for more complex situations where metrics of progress may be less quantifiable, for example, the success of a charity, or the progress of a research group. In such cases quantifiable variables may be limited therefore the system may rely on secondary variables from similar scenarios to determine the impact of certain decisions or actions may have on the long-term goals of the organization. The system would then be able to illustrate these impacts in an easily understood and intuitive interface.

Figure 5:
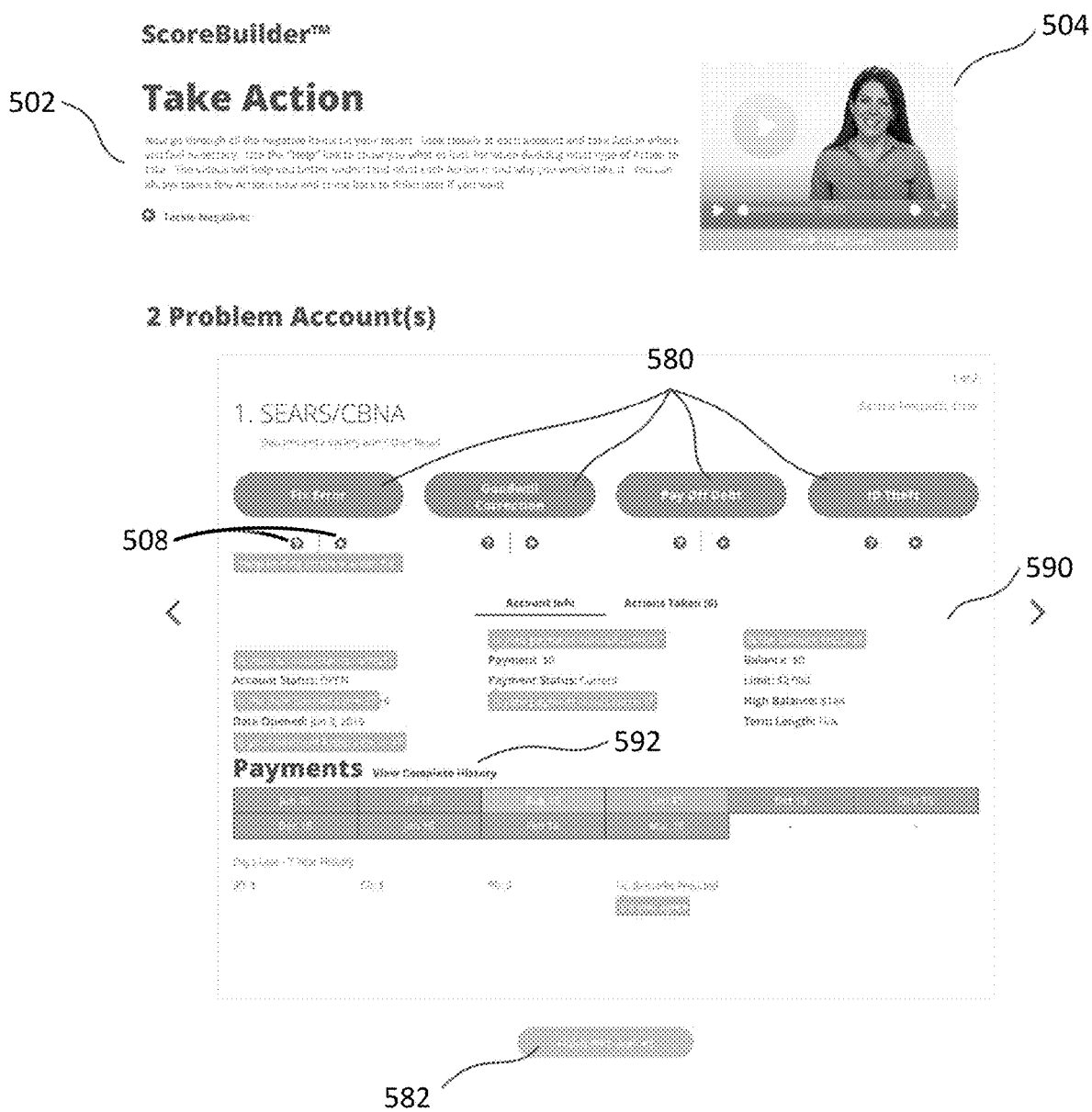
FIG. 5 illustrates an exemplary gamification interface of the system with actionable elements, in accordance with the present disclosure.

FIG. 5 shows an exemplary embodiment of a gamified user interface for a given scenario 500. It is contemplated that not all variables in a scenario may be quantitative and that scenarios may be based around qualitative, grouped or binary variables. Accordingly the system may provide a gamified user interface 500 which provides a set of options, groups or binary variables or outcomes. It is also contemplated that some scenarios may utilize both quantitative and qualitative variables and that aspects of the embodiments described herein may be combined. In exemplary embodiments one or more scenario user interfaces 300, 310, 312, 400, 410, 450, 500 may be used separately or in combination, for example once a preferred outcome has been set in a first user interface, for example user interface 350 or 400, the system may determine that certain qualitative, grouped or binary variables may be used to achieve the preferred outcome, accordingly a user may navigate to a second user interface, such as user interface 500 to implement these changes. In either case, the system may present a gamified user interface where a user may adjust, modify, or manipulate with different actions or combinations of actions that allow a user to achieve the preferred scenario.

The gamified user interface for a given scenario 500 may include instructions, 502, links to help advice or wizards 508, instructional videos 504, or a combination thereof. The scenario user interface 500 may also present one or more actionable elements 580 which relate to one or more qualitative, grouped or binary variables that may await action from the user in order to achieve a preferred outcome. The system may order the actionable elements based on impact on the outcome, temporal significance, or the like. The actionable elements may present the user with a binary decision. Non-limiting examples include, "Yes" or "No"; "Take Action" or "Ignore", or the like. The actionable elements may present the user with a grouped decision that include two or more options relating to the variable. Non-limiting examples include, "Low", "Medium", or "High"; "Take Action", "Ignore", or "Remind Me Later"; "Disagree", "Somewhat disagree", "Indifferent", or "Somewhat agree", "Agree", or the like. Each of the actionable elements may include one or more links to help advice 508, wizards, training videos, or the like. These may further advise the user on why the actionable element is presented, possible outcomes for actioning, or not actioning, the actionable element.

The scenario user interface 500 may also present additional information 590 about the variable or variables used in the scenario. The additional information 590 may include pertinent information about the variable to help a user identify which variable is being actioned, the current status of the variable, information regarding the classification or type of variable, past or future events that may have occurred that are pertinent to the variable, or the like. The additional information 590 may also include links 592. These links 592 may, for example, connect the user to one or more third parties where a user may obtain further information about the variable. These links 592 may also provide the user with additional interfaces, these interfaces may be, by way of non-limiting examples, additional gamified interfaces, calendars, internal or external tools, or the like. The additional information 590 may also include an indication of how much the particular variable or groups of variables affect the outcome.

The scenario user interface 500 may also present one or more actionable elements 582. These actionable elements 582 may allow a user to action various aspects of the scenario user interface 500. Non-limiting examples of possible actions include, returning to a previous scenario user interface, saving the current scenario user interface, actioning the current scenario, as discussed herein, to implement the scenario in a real-world setting, printing, saving, sending, or emailing instructions on how to implement the scenario in a real-world setting, connecting the user with one or more third parties, or providing instructions to one or more third parties, in order to implement the preferred scenario, or the like.

By way of a non-limiting example, the system may present a scenario user interface, such as scenario user interface 500, that allows a user to protect against identify theft. The system may use demographic, psychographic, economic variables from primary, secondary, and/or tertiary variable sources to determine if there has been an abnormal behavior that may signify to the user that identity theft may have occurred. The scenario user interface 500 may then highlight these "abnormal" variables and present one or more actionable elements 580 with which a user may further explore the abnormal variable to establish if the action was carried out by the user or not. The actionable elements 580 may also connect the user with various third parties in order to rectify the abnormal variable. For example, actionable elements 580 may connect the user with a social media site, if an account has been opened in the user's name. The system may also use secondary variables to provide various actionable elements 580 that are based on other user's actions. For example, the system may determine that most user's change the password to the their social media account after a given number of months, the scenario user interface 500 may then provide an actionable element 580 that connects the user with a social media account where the password has not been changed in more than the given number of months.

By way of a non-limiting example, the system may present a scenario where the most efficient way to achieve a preferred credit score may be to tackle various qualitative, grouped or binary variables that affect a user's credit score. The system may present a scenario user interface, such as scenario user interface 500. The scenario user interface 500 may present one or more qualitative variables that require one or more actions in order to achieve the user's preferred outcome. A user may select or deselect the one or more actionable elements 580 across different variables. The effect of these actions may be reflected in the displayed additional information 590. As previously noted, the synergistic effects of one or more variables may have a greater impact, either positively or negatively, on the outcome that the sum of the individual effects of the variables. In a real-world setting a user may be unaware of these synergistic effects since the variables may be provided by different third parties and decisions one each of the variable may be made independently of each other. However, an advantage of the present disclosure is that a user may adjust, observe, or manipulate with the different actions in a scenario to establish a preferred outcome. As also discussed herein, the system will highlight, promote, or suggest the actionable elements that will allow a user to achieve a preferred outcome most efficiently. Once the combination of actions has been chosen by a user by way of the actionable elements 580, a user may then use one or more of the actionable elements 582 in order to implement the scenario in a real-world setting. It is also contemplated that should a user prefer to return to the scenario at a later date the actionable elements 582 may allow a user to save the current scenario.

In an exemplary embodiment the system may use secondary variables to determine or suggest a combination of actions for a user. For example, based on similar scenarios encountered by other users of the system, the preferred outcomes of other users, and the real-world effects of the implemented scenario, the system may present certain types of variables included in the scenario, the types of actions available to a user for each of the variables, suggest combinations of variables or actions for each variable, or combinations thereof. Such secondary variables may further enhance the accuracy of the scenario presented with that of real-world outcomes. Further, such secondary variables allow a user to see what other users in similar situations have done, the outcomes the other users preferred, and the accuracy of the scenario when implemented in a real-world setting, all while maintaining the privacy of the other users in the system.

In an exemplary embodiment, the actionable elements 580, help or advice 502 508, and additional information 590, may be further supplemented with secondary variables. For example, where a similar scenario may have been encounter by other users of the system, the predictive scenario engine 190 may provide additional options that other users took in order to achieve a similar outcome. It is also contemplated that the help or advice 502, 508 provided may be further supplemented by other user's opinions, advice, tips, suggestions, or the like. For example, certain actionable elements or combinations of actionable elements may include user ratings based on the satisfaction of the user with the real-world outcome compared with the proposed outcome. It is also contemplated that users of the system may rate the help or advice 502, 508 provided by other users.

In an exemplary embodiment, it is contemplated that a user interface 500 may not utilize a gamified outcome and instead provide a scenario that provides actionable elements. For example, the system may use primary, secondary, tertiary variables or combinations thereof to provide a scenario, similar to those described herein. As best seen in FIG. 5, due to the types of variables involved in the scenario, a gamified outcome may not be required. Instead the scenario may only provide actionable elements that allow a user to implement actions, instructions, or the like, directly in a real-world setting directly. This may be due to the scenario variables only requiring a binary decision as to whether to implement the outcome of the scenario or not.

By way of a non-limiting example, the system may review primary, secondary, tertiary variables and determine by way of a set of predetermined rules or trends derived by the system from primary, secondary, tertiary variables, or combinations thereof, a scenario detailing a creditor, the scenario shows the creditor has recorded a late payment on a utility bill that is negatively affecting the user. The system may have determined a trend that other users often dispute the creditor in similar scenarios and disputing the creditor has resulted in the more positive outcome for the user. Accordingly, instead of providing a gamified outcome, the system may instead provide an actionable element. This actionable element may connect the user with a tool, third party, or the like, to dispute the late payment. In this way, the user may choose whether or not to implement the scenario or not.

Although these are highly simplified examples, it will be appreciated that any number of variables, scenarios, actionable elements, combinations thereof, or the like, may be used to provide a user interface and a scenario to the user that may not require a gamified outcome. Further, technical advantages of these scenarios include promoting better credit health for a user. A more timely resolution of errors in a user's credit report. A more timely disputation and resolution of negative entries in a user's credit report, e.g. missed or late payments, or entries associated with the wrong user, or the like. This provides a more accurate reflection of the user's credit worthiness. This reduces a user's risk level to lenders, reduces interest rates that would otherwise be required to offset the risk, and frees up more disposable income for the user, which improves the local economy. Moreover, the calculation of credit scores is proprietary leaving a user guessing as to what actions they can take and what effect this may have on their credit score. By contrast, embodiments described herein uses previous actions and outcomes of the user and other users of the system to remove this guesswork and provide an accurate picture of what affects the user's credit score and what actions can be taken to achieve an designated outcome.

Computing Environment

The present invention also relates to apparatus for performing the operations or processes herein. The apparatus may be specifically constructed for certain purposes, or it may comprise a general purpose computer. The general purpose computer may be coupled with various input/output (I/O) devices and selectively activated or reconfigured by a computer program stored in the computer. Such a computer program or software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage. Transmission medium may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device. Portions of any modules or components described herein may be implemented in lines of code in software, configured logic gates in software, or a combination of both, and the portions implemented in software are tangibly stored on a computer readable storage medium.

The algorithms and displays presented herein are not inherently related to any particular computer, mobile device, equipment, display, or similar apparatus. Various general purpose systems may be used with programs in accordance with the teachings herein, or it may prove convenient to construct more specialized apparatus to perform certain process blocks. The structure for a variety of these systems will appear from the description below. In the following description of exemplary embodiments, reference is made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof.

Computing System

Figure 6:
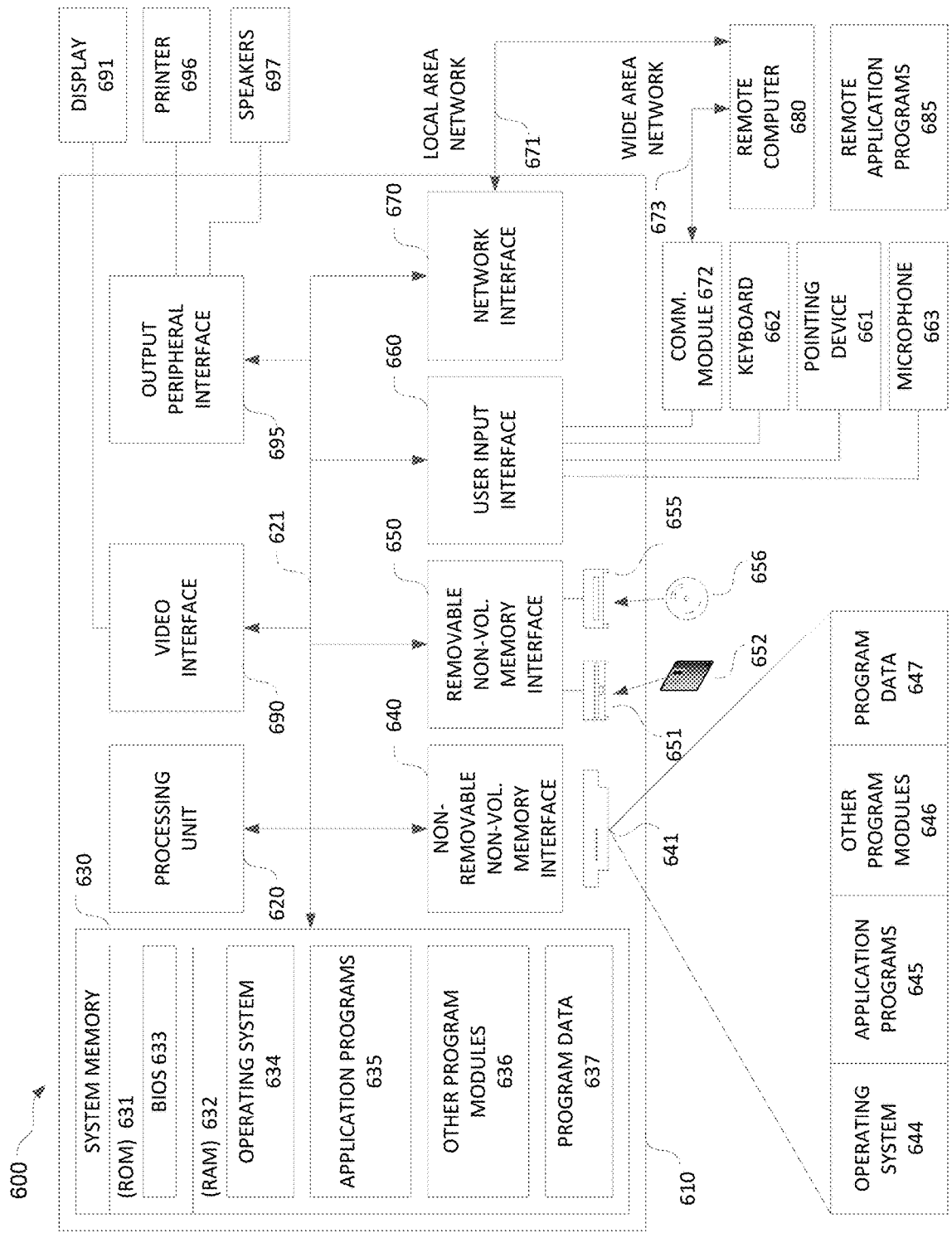
FIG. 6 illustrates an exemplary computing device that may be used, in accordance with the present disclosure.

FIG. 6 illustrates a block diagram of an example computing system environment 600 that may use an embodiment of one or more of the systems or processes discussed herein, in accordance with some example embodiments. The computing system environment 600 is only one example of a suitable computing environment, such as a client computing device or similar device, and is not intended to suggest any limitation as to the scope of use or functionality of the design. Neither should the computing system environment 600 be interpreted as having any dependency or requirement relating to any one or combination of components illustrated in the exemplary computing system environment 600. Embodiments of the invention may be implemented on any type of computer, device, apparatus, or even machine that make use of the computing system environment 600.

The design is operational with numerous other general purpose or special purpose computing system environments or configurations. Examples of well-known computing systems, environments, and/or configurations that may be suitable for use with the design include, but are not limited to, personal computers, server computers, embedded computer systems, system-on-chip (SOC), single-board computer system (SBC) (such as, for example, a computer-on-module (COM) or system-on-module (SOM)), virtual reality devices or headsets, hand-held devices, laptop devices, head or body mounted devices, multiprocessor systems, microprocessor-based systems, set top boxes, programmable consumer electronics, network PCs, minicomputers, kiosk computer, terminal computer, mainframe computer, mesh of computer systems, distributed computing environments spanning multiple systems or locations, that include any of the above systems or devices, automotive and informational appliances, or the like.

The design may be described in the general context of computing device executable instructions, such as program modules, being executed by a computer. Generally, the program modules include routines, programs, objects, components, data structures, etc., that perform particular tasks or implement particular abstract data types. Those skilled in the art can implement the description and/or figures herein as computer-executable instructions, which can be embodied on any form of computing machine readable media discussed herein.

The design may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary computing system environment 600 includes a general-purpose computing device in the form of a computing device 610. Components of computing device 610 may include, but are not limited to, a processing unit 620 having one or more processing cores, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing device 610 typically includes a variety of computing machine readable media. Computing machine readable media can be any available media that can be accessed by computing device 610 and includes both volatile and nonvolatile media, removable and non-removable media. By way of example, and not limitation, computing machine readable mediums uses include storage of information, such as computer readable instructions, data structures, program modules or other data. Computer storage mediums include, but are not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 610. Communication media typically embodies computer readable instructions, data structures, program modules, or other transport mechanism and includes any information delivery media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computing device 610, such as during start-up, is typically stored in ROM 631. RAM 632 typically contains data and/or program modules that are immediately accessible to and/or presently being operated on by processing unit 620. By way of a non-limiting example, FIG. 6 illustrates operating system 634, application programs 635, other program modules 636, and program data 637.

The computing device 610 may also include other removable/non-removable volatile/nonvolatile, transitory or non-transitory computer storage medium. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed herein and illustrated in FIG. 6, provide storage of computer readable instructions, data structures, program modules and other data for the computing device 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user may enter or receive information, execute commands or configuration changes, or the like with the computing device 610 through the video interface 690, output peripheral interface 695, or user input interface 660. The video interface 690, output peripheral interface 695, or user input interface 660 may be coupled with the computing device 610 via a system bus 621. The video interface 690, output peripheral interface 695, or user input interface 660 may be coupled with various input/output (I/O) devices with which a user may enter or receive information, execute commands, or the like. Such I/O devices may include by way of non-limiting examples, display 691, keyboard 662, microphone 663, pointing device 661, or printer 696. The pointing device 661 may include, by way of a non-limiting example, such as a mouse, trackball or touch pad. In some embodiments, the I/O devices may include a motion sensor or similar device, which allows the user to provide gesture or motion inputs to the computing device 610. In exemplary embodiments, the display 691 may include a displays with a wide field of view, stereoscopic displays, virtual reality googles, augmented reality glasses, televisions, smartphones, tablets, or the like.

In some embodiments the computing device 610 may be coupled with other I/O devices (not shown), these devices may include joysticks, game pads, satellite dish, scanner, virtual reality device, augmented reality device, body mounted device, kinetic devices that monitor the micro or macro movements of a person or provide tactile outputs to a user, accelerometers, gyroscopes, distance sensors, motion sensors, location sensors, global positioning systems (GPS), or the like. These and other I/O devices, may be connected to the processing unit 620 through, for example the user input interface 660, output peripheral interface 695, or the video interface 690, which are coupled to the system bus 621, but they may be connected directly or indirectly by way of other interface and bus structures. Such interface and bus structures may include parallel port, game port or a universal serial bus (USB). It is further contemplated that the I/O devices and/or the video interface 690, output peripheral interface 695, or user input interface 660 may operate autonomously or as extensions to other systems which then communicate with the computing device 610 remotely, either via wired or wireless communication means.

The computing device 610 may operate in a networked environment using logical connections to one or more remote computers, such as a remote computer 680. The remote computer 680 may be a personal computer, a handheld device, virtual reality system, a server, a router, a network PC, a peer device or other common network node, and typically includes many or all of the elements described above relative to the computing device 610. The logical connections depicted in FIG. 6 include a local area network (LAN) 671 and a wide area network (WAN) 673, but may also include other networks. Such networking environments are commonplace in offices, enterprise-wide computer networks, intranets, extranets, and the Internet. A browser, device, or system application may be resident on the computing device and stored in the memory.

When used in a LAN networking environment, the computing device 610 is connected to the LAN 671 through a network interface or adapter 670. When used in a WAN networking environment, the computing device 610 typically includes a communication module 672 or other means for establishing communications over the WAN 673, such as the Internet. The communication module 672 may be a modem used for wired, wireless communication or both. The communication module 672 may be internal or external, may be connected to the system bus 621 via the user-input interface 660, or other appropriate mechanism. In a networked environment, program modules depicted relative to the computing device 610, or portions thereof, may be stored in the remote memory storage device. By way of example, and not limitation, FIG. 6 illustrates remote application programs 685 as residing on remote computer 680. It will be appreciated that the network connections shown are exemplary and other means of establishing a communications link between the computers may be used. It should be noted that the present design can be carried out on a computing system such as that described with respect to FIG. 6. However, the present design can be carried out on a server, a computer devoted to message handling, or on a distributed system in which different portions of the present design are carried out on different parts of the distributed computing system.

Another device that may be coupled to bus 621 is a power supply such as a Direct Current ("DC") power supply and/or Alternating Current ("AC") adapter circuit. The DC power supply may be a battery, a fuel cell, or similar DC power source that needs to be recharged on a periodic basis. It will be appreciated that other forms of power supply may still be contemplated to be within the spirit and scope of the present disclosure. For wireless communication, the communication module 672 may employ a Wireless Application Protocol to establish a wireless communication channel. The communication module 672 may implement a wireless networking standard such as Institute of Electrical and Electronics Engineers (IEEE) 802.11 standard, IEEE std. 802.11-1999, published by IEEE in 1999. Other wireless communication processes that may also be used and may include Bluetooth, gigabit, Wi-Fi, Radio Frequency, infrared, or the like. It will be appreciated that other forms of wired and wireless communications may still be contemplated to be within the spirit and scope of the present disclosure.

Examples of mobile computing devices may be a laptop computer, a cell phone, 'smart' phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

In exemplary embodiments a computing system environment 600 may entail memory and display functions without a processing function. For example, a third party may provide information to a user, which is relayed to a device for display only with no data manipulation.

Network Environment

Figure 7:
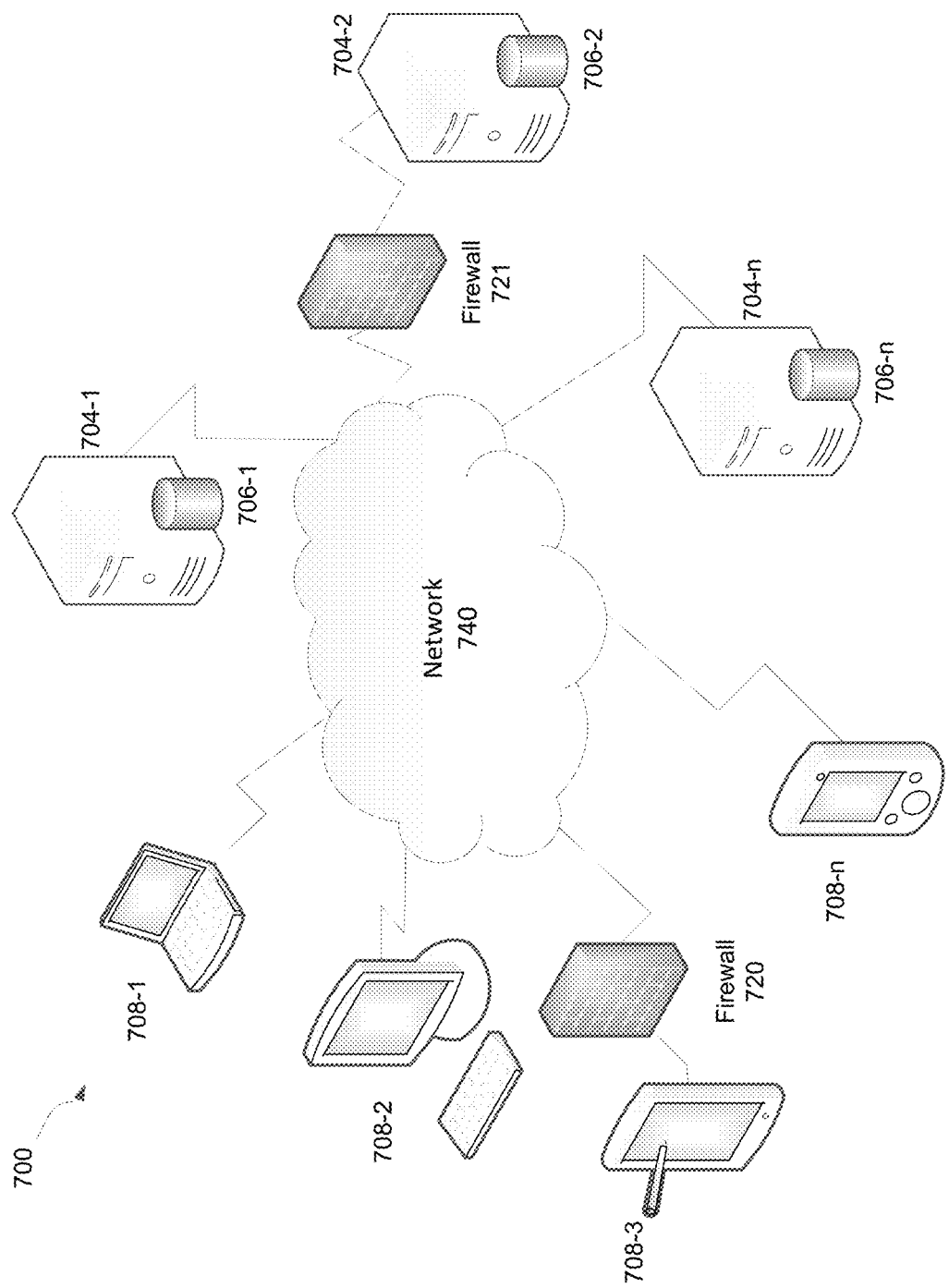
FIG. 7 illustrates an exemplary network that may be used, in accordance with the present disclosure.

FIG. 7 illustrates an exemplary network in which the techniques described herein may be applied, in accordance with some example embodiments. The network environment 700 has a network 740 that connects server computing systems 704-1 through 704-n, and at least one or more client computing systems 708-1 through 708-n. As shown, there may be many server computing systems 704-1 through 704-n and many client computing systems 708-1 through 708-n connected to each other via a network 740, which may be, by way of a non-limiting example, the Internet. Note, that in some embodiments the network 740 might be or include one or more of: an optical network, the Internet, a Local Area Network (LAN), Wide Area Network (WAN), satellite link, fiber network, cable network, or a combination thereof, or the like. It is to be further appreciated that the use of the terms client computing system and server computing system is for clarity in specifying who initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 708-1 and the server computing system 704-1 can both initiate and respond to communications, their communication may be viewed as peer-to-peer. Likewise, communications between the client computing systems 704-1, 704-2 and the server computing systems 708-1, 708-2 may be viewed as peer-to-peer if each such communicating device is capable of initiation and response to communication. One or more of the server computing systems 704-1 to 704-n may be associated with a database such as, for example, the databases 706-1 to 706-n. A firewall such as, for example, the firewall 720 between a client computing system 708-3 and the network 740, may be used to protect data integrity. Another firewall example is the firewall 721 positioned between the server 704-2 and the network 740. Although not shown, other devices (e.g., proxy servers and the like) may also be connected to the network 740.

FIG. 7 also illustrates a block diagram of an embodiment of a server computing system to provide information, such as a system parameter, etc. A user via a client computing system 708-3 may interact with the server computing system 704-1, and then supply input to the query/fields and/or service presented by a virtual reality system interface of the application. The virtual reality system parameter may be served by a server computing system 704-1 in any language using any wireless communication protocol, by way of a non-limiting example Wireless Access Protocol (WAP), to any enabled client computing system 708-3 or any equivalent thereof. For example, the client computing system 708-3 is shown as a tablet computer, however 708-3 may be a laptop, a netbook, smart phone, or the like. It is also contemplated that the system parameter may also be served from another system 708-1 through 708-n, such as a laptop or mobile device, or it may be initiated from the client computing system itself. The computing system 708-3 may host a browser to interact with the server computing system 704-1. Each application, widget, plug-in, etc. has a code scripted to perform the functions that the software component is coded to carry out such as presenting fields and icons to take details of desired information. The applications may be hosted on the server computing system 704-1 and served to the client computing system 708-3. The applications then present the information that allows the user to interact with the system.

Any application and other scripted code components may be stored on a computing machine readable medium which, when executed on the server causes the server to perform those functions. In an embodiment, the software used to facilitate the functions and processes described herein can be embodied onto a computing machine readable medium such as computer readable medium. As discussed above a computing machine readable medium includes any mechanism that provides (e.g., stores) information in a form readable by a machine (e.g., a computer). For example, a computing machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or processes stored on the computing machine readable medium may be used in the process of creating the apparatuses and/or processes described herein.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, SQL, Java, or other variants of such or similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combinations thereof.

It should be noted that the configuration of the diagram illustrated in FIG. 7 is for illustrative purposes only, and the actual configurations may vary. There might be different configurations of servers, firewalls, clients, and devices. For example, the devices may include virtual reality equipment, tablet computers, vehicle 'infotainment' systems, TV devices, and the like.

It will be appreciated, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

In an exemplary embodiment, the system 100 can provide an interface, website, mobile application ("App"), or the like, located on a user's device such as a computer 122 or smart phone 126. The user can access the system 100 via the interface. The interface can await verification of the user's identity prior to allowing the user access to the interface. The verification of the user's identity can include requiring a username and password combination, security questions, biometric input such as facial recognition, finger print recognition, combinations thereof, or the like. Once the system has verified the identity of the user, the user can access and create scenarios generated by the system as described herein. When scenarios are generated, the variables and parameters that define these scenarios can be anonymized and sent to the system to be stored, (e.g. on Data Store 151), and analyzed, (e.g. by Predictive Scenario Engine 190). As used herein, anonymizing the data can include stripping the data of any personally identifiable information (P.I.I.) that may be used to identify the individual user. These anonymized data from the user can be stored and analyzed along with similar data from other users of the system to generate secondary data. These secondary data can be analyzed by the system to identify trends, predict optimal outcomes, improve the accuracy of the outcomes, improve the accuracy of the changes to the variables in order to achieve a given outcome, combinations thereof, or the like. Advantageously, the interface can retain any sensitive P.I.I. on the user's device while collating, storing and analyzing secondary data for the users of the system at a separate location. This increases the security for the individual user, while providing secondary data of other users of the system improve the scenarios, analyses, and the like, provided by the system 100, e.g. predictive scenario engine 190.

In an exemplary embodiment, the system can present a scenario to a user for the purpose of increasing the credit score for a user who does not have the available funds. The system can review at least one of the primary, secondary, or tertiary data for the user, and can determine that obtaining a loan to pay down the existing debt would result in a net increase in credit score for the user and/or a net decrease in monthly payments. The system can provide an actionable element labeled "Don't Have This Money Now," or "Need This Money Now" with which a user can implement the scenario. In an embodiment, a user may have the funds available and the system can still provide the "Need This Money Now" actionable element so that a user can preserve the available funds as liquid assets.

The system can review data about the user's situation including financial data, socio-demographic data, or the like. The system can also review secondary data regarding other users of the system who have experienced similar situations, as well as the actions they have taken to successfully increase their credit score and/or decrease their monthly payments. The system also reviews data about the user from third parties, as well as review products and services provided by third parties that are available to the user. The services and products from third parties may include, personal loans, commercial loans, secured or unsecured loans, mortgages, auto loans, cash advances, equity lines of credit ("ELOC"), rent-to-own, lease-purchase agreements, or the like.

The system can review and analyze these data, products and services, and present a gamified scenario to the user showing a range of potential outcomes. The scenario can include actionable elements that provide instructions to implement these outcomes in a real world setting. The system can determine these range of potential outcomes based on a set of predetermined rules, probabilities, neural network techniques, machine learning, Artificial Intelligence (A.I.), or the like. For example, the system can review the users current situation, previous scenarios, and third party products to determine that the user may use a personal loan product from a third party to pay down the users current rolling debt in order to reduce the users monthly payments and/or increase the users overall credit score. The system can determine which accounts can be included in the scenario and determine an advantageous personal loan product or range of products provided by a third party for reducing the monthly payments, and optimizing the credit score for the user. As used herein, an advantageous third party product can include a product that provides a reduced monthly payment, or a credit score that is closer to a preferred credit score as defined by a gamified scenario.

The system will then present a gamified scenario to the user which illustrates the outcomes that can be achieved, such as preferred monthly payments, preferred credit score, or ranges thereof. The user can then adjust the outcome to a preferred outcome. The system can then analyze the scenario with the preferred outcome and adjust the scenario in order to achieve the preferred outcome. For example, the system may adjust the types of accounts included, the amounts to be paid off in each account, or the types of third party products used. Once the user has achieved their preferred outcome, the user can then implement the scenario using the actionable elements. These actionable elements will send instructions to the third parties to open the loan accounts and directly pay the rolling debt accounts featured in the scenario.

In an embodiment, the system may autonomously implement actions to achieve a preferred outcome without further input from the user. For example, the system may present a gamified scenario requesting consent from the user to generically increase credit score, or to maintain a given credit score. This consent may include an "opt-in" check box presented by itself or included as part of another gamified scenario. The system may then autonomously determine that the user's credit score may be optimized by applying for a loan to pay off an account, or group of accounts, thereby reducing overall monthly payments and achieving the predetermined credit score, or an increase thereof. The system can autonomously implement these actions at the appropriate time, without requesting any further input from the user.

In an embodiment, the system may leverage implemented scenarios and/or primary data, (e.g. financial transactional history) to secure more favorable products or services from third parties. For example, a user's current credit score may be insufficient for a particular loan. i.e. if a user were to apply for a given loan from a given loan company, using their current credit score, the user would be refused the loan on the basis that, from the perspective of the loan company the loan is too risky. However, the system can request the loan, on behalf of the user based on pre-established arrangements with third parties, using future actions due to be executed by implemented scenarios, and/or leveraging historical transactional data, or similar trends, for the user. In an embodiment, the system can provide an auction platform for third parties to provide bids for different loans. The system can autonomously determine an advantageous loan bid for the user, or the system can provide details of the loan bids to the user for the user to select the winning bid. This can motivate the third parties to compete to provide improved loan terms for the user.

For example, the system can apply for a loan on behalf of the user. As part of the application, the system may disclose certain details of the scenario, which has been implemented. The system can disclose the intended use of the loan, which is to lower the user's credit score by way of various actions subsequent to the loan being approved. Exemplary actions can be to use the loan to directly pay down certain accounts. The system may also disclose an intended repayment schedule. Accordingly, the third party loan company can then approve a loan and/or provide more favorable interest rates on the basis that the loan is to be used to improve a user's credit score, and other information provided by the system. Since the intended use of the loan and intended repayments have already been scheduled by the system, the risk level of the user to the loan company is reduced, and the loan company can approve the loan based on the user's future expected credit score. As such, the system can leverage the holistic situation for a user to secure more favorable services and products than would otherwise be offered directly to the user based on credit score alone. As discussed herein, this can be executed by the system autonomously once the user has provided their consent. The system can also present the scenario to the user and await consent before proceeding at various predetermined stages.

In an embodiment, the system can provide access to the "Need This Money Now" scenario, for a user, to a third party such as a mortgage lender. The third party mortgage lender can also further modify the preferred outcome, as discussed herein, to a credit score that may be useful to qualify for a mortgage. The system can provide a secure online messaging service, chatroom or similar communication platform with which to communicate and negotiate the credit score and other terms of the loan. Once the user and the third party mortgage lender have settled on a scenario, the user can implement the scenario where instructions on what accounts to pay, how much to pay and when to pay are sent, or will be sent, at an advantageous time. The third party mortgage lender can then approve the loan based on the user's future credit score, knowing that the system has implemented actions utilized to achieve the improved credit score and thus reduces the risk to the mortgage lender. Further, the third party mortgage lender can also show the user that by making an additional payment to lower the user's existing debt, by for example an additional $2,000, such a payment can result in a further increase in credit score which in turn can provide greater savings over the life of the mortgage, for example by reducing the mortgage payment by $330 per year. In this way, the system advantageously provides a tool for a user to secure improved terms for a loan product that would otherwise be unavailable due to the innate lag in credit score reporting relative to user's actions or future actions. Moreover, the system motivates a user to further improve their credit score by illustrating the whole process of how short term payments can result in greater savings in the long-term. As used herein an advantageous time can include a particular time frame, such as a minute, hour, day, month, year, billing cycle, or the like, that is preferred over a different time frame, when achieving a preferred outcome. For example, paying an account during a time frame that is before the start of a new billing cycle maybe more advantageous due to there being less interest accrued.

In an exemplary embodiment, the system can review primary, secondary, or tertiary data to determine that a user may apply for an increase in their credit limit for an account, or group of accounts. The system will determine the amount that a user may apply for, as well as an advantageous time to apply for the increase, to ensure the highest probability of being awarded the increase in credit limit. The system can also determine how the change in credit limit would affect the user's credit score. For example, the system can review data about the user's current situation including financial data, socio-demographic data, or the like. The system can also review secondary data regarding other users of the system who have experienced similar situations, as well as the actions they have taken to successfully increase their credit limit and/or credit score. The system can also review data about the user from third parties, as well as review products and services provided by third parties that are available to the user.

The system can then review and analyze these data and present a gamified scenario showing a range of potential outcomes to increase the user's credit limit. The scenario can include the accounts used, the amount of credit limit that can be applied for, and an advantageous time to apply for these increases in credit limit, or the like. The scenario can include actionable elements that provide instructions to implement these outcomes in a real world setting. The system can determine these scenarios based on a set of predetermined rules, probabilities, neural network techniques, machine learning, Artificial Intelligence (AI), or the like.

The user can then adjust the outcome to a preferred outcome of credit limit extension for one or more accounts. The system can then review and analyze these changes to adjust the scenario so as to achieve the preferred outcome. Once the user has achieved their preferred outcome, the user can then use the actionable elements to implement the scenario in a real world setting. These actionable elements will send instructions to the third parties, at the appropriate time, requesting the extension of credit limit for the one or more accounts.

In an embodiment, the system may autonomously implement actions to achieve an increase in credit limit without further input from the user. For example, the system may present a gamified scenario requesting consent from the user to generically increase credit limit, or to maintain a given credit limit, on one or more accounts. This consent may include an "opt-in" check box, "activate boost" option, "enable boost" selection, a choose "Max A.I.™" option, or the like, associated with an account or group of accounts, presented by itself or included as part of another gamified scenario. The system may then determine that the credit limit for these accounts can be increased and autonomously implement actions at the appropriate time, to request a credit limit increase without requesting any further input from the user. In an embodiment, the "Boost" feature can also be termed "Max A.I.™"

In an embodiment, the system may semi-autonomously implement actions to achieve an increase in credit limit for the user. For example, the system may request an "opt in" consent from the user, determine that the credit limit for an account or group of accounts can be increased, as discussed herein. The system can then provide temporally appropriate instructions, prompts, or actionable elements to the user. The user must then provide some input to the system such as an acknowledgement that the instructions are carries out, or an approval for the system to proceed, or the like before the system will continue implementing the scenario. In this way, the system can request additional, or continued consent from the user to continue with the scenario and provides the user with a degree of control over the implementation of the scenario.

In an embodiment, the system will determine the synergistic effects or holistic effects of modifying the accounts on the overall credit limit for the user and/or the overall credit score for the user. For example, a scenario may request consent to optimize the credit limit for an account, or group of accounts. The system will then determine if a single large increase in credit limit on a single account may achieve the preferred overall credit limit. However, the system may also determine that such a large request will necessitate a "hard enquiry" which may be detrimental to the user's overall credit score. Alternatively, the system can review the holistic situation and determine that requesting lower credit limit increases across multiple existing accounts, or opening new accounts, or the like, can achieve the same preferred outcomes with only soft enquiries and with the least negative effects on the users credit score. Exemplary "large requests" or "higher credit limit increases" could be in the range of about a 40% increase in credit limit, or more. Exemplary "small requests" or "lower credit limit increases" could be in the range of about 20% increase in credit limit.

In an embodiment, the system will incorporate any negative effects the actions may have, to determine if the overall effect of these actions will achieve the preferred effect on the user's credit limit and/or credit score. It will be appreciated that similar interactions between the accounts used, amounts of credit limit requested, and the third party products employed will be analyzed by the system to determine the overall net effect on credit limit for the user, and/or the effect on credit score for the user.

In an embodiment, the system may review an account held by the user and determine that it would be beneficial to request an increase in credit limit, as described herein. The system would determine the optimal amount to request, and optimal time to submit the request in order to achieve the preferred outcome of credit limit and therefore credit score. For example, the system can determine whether to request the maximum possible amount of credit limit, or can request a given amount or a given percentage increase in credit limit. The system may predict these parameters based on secondary data, or may submit the request to the third party holding the account, to confirm whether the request will be accepted. Prior to implementing the request, the system can then submit similar requests to one or more third parties, for the one or more third parties to provide an improved offer through an alternative product. The system can include information about competing offers with the request, this can help the third parties decide if they can offer an improved product. Further, providing this additional information can also promote competitiveness between the third parties to achieve the best product for the user.

In an embodiment, the system may establish an auction platform where third parties submit bids to the system to provide improved offers for the user. Advantageously, this will motivate the third parties to compete to provide improved offers for the user. For example, the system can provide third parties access to user's data to review the user's existing accounts and provide improved offers such as a greater increase in credit limit, rewards (e.g. air miles, cash back, loyalty points), improved APR rates, balance transfer offers, combinations thereof, or the like. The system then determines if an alternate product would be more beneficial to the user, and if so the system moves the account to a different third party or product. The system can autonomously implement these changes in order to achieve the preferred outcome. In an embodiment, the system may request further input from the user. The system may present the information about the change in accounts or third parties, and how this achieves the user's preferred outcome of credit limit or credit score, and request consent from the user to proceed. These requests for consent may occur at one or more stages of the process.

In the examples presented herein, a single exemplary account and product has been used for simplicity. However, it will be appreciated that the system may aggregate the effects of changes across multiple accounts and across multiple third party products in order to achieve the preferred outcome. For example, the system may request a credit limit increase on two different credit card accounts. However, when submitting the same request to the online auction, the system determined that splitting the account between multiple products from a different third party may achieve a greater overall increase in credit limit for a user. Alternatively, the system may determine combining the accounts into a single product may prove more beneficial than simply requesting an increase on credit limit for the existing two accounts. These and other combinations are considered to fall within the scope of the present invention.

In an embodiment, the system can review changes in the products offered by third parties and determine which users would be eligible for these revised products. For example, a third party may launch a new product, or revise an existing product. The third party(s) may actively notify the system of these changes, or the system may review the third party products and determine any changes that have occurred. Based on these changes, the system can then provide access to the third party, to particular groups of users that would be eligible, or be best suited to these revised products, as determined by the system. The access provided by the system may include providing adverts regarding these products or services to the user. The system may determine when the optimal time would be to present the adverts. The access provided by the system may include the system autonomously changing the users account to the new or revised account. The access provided by the system may include requesting further consent to autonomously change the users account to the new or revised account.

For example, a user may have a credit card account with a particular third party such as a bank. The bank may revise the credit limit for the credit card account, or may launch a new credit card with an increased credit limit. The bank may actively notify the system of these changes, or the system may review the credit cards offered by the bank and determine the changes. The system may then determine which users would benefit from these changes. The system may then provide adverts to these users directed to these new or revised products. Alternatively, the system may autonomously change the user's accounts to these new or revised accounts. Alternatively the system may request further consent from the user before autonomously changing the user's accounts to these new or improved accounts. For simplicity, only a single third party has been used in this example. However, it will be appreciated that products between more than one third parties may be reviewed by the system and presented to the users.

In an embodiment, the system can review the transaction history for the user, or similar primary data, to determine usage trends. The system can then determine the third party products or services that would most beneficial to these trends. For example, the system may review the transaction history for a user and determine a trend in purchase type, such as gas or groceries. The system may determine that using a particular product for these purchases, such as a store card or gas card, may be more beneficial to the user since regular usage of these cards garners increased benefits, credit limit, cash back rewards, or the like. Based on the usage trend, the system may able to request a greater credit limit for a store card than from a current generic credit card. Accordingly, the system can autonomously implement actions, or request consent to implement actions, as described herein, to secure an optimized credit limit or credit score for the user. Accordingly, the system is able to leverage the holistic situation for a user to achieve the preferred outcome for the user.

Figure 8A:
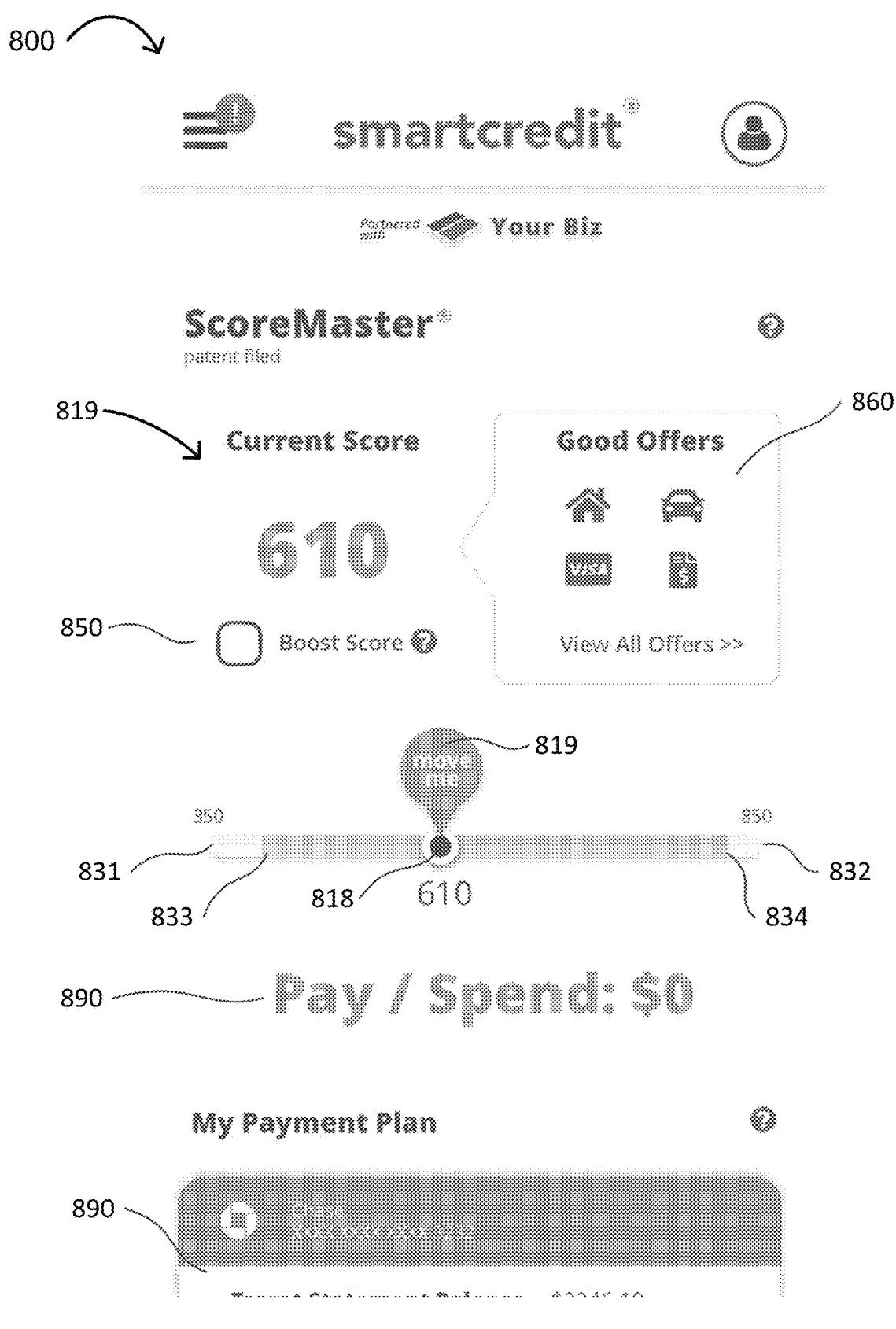
FIGS. 8A-8E illustrate exemplary gamification interfaces of the system, in accordance with the present disclosure.
Figure 8B:
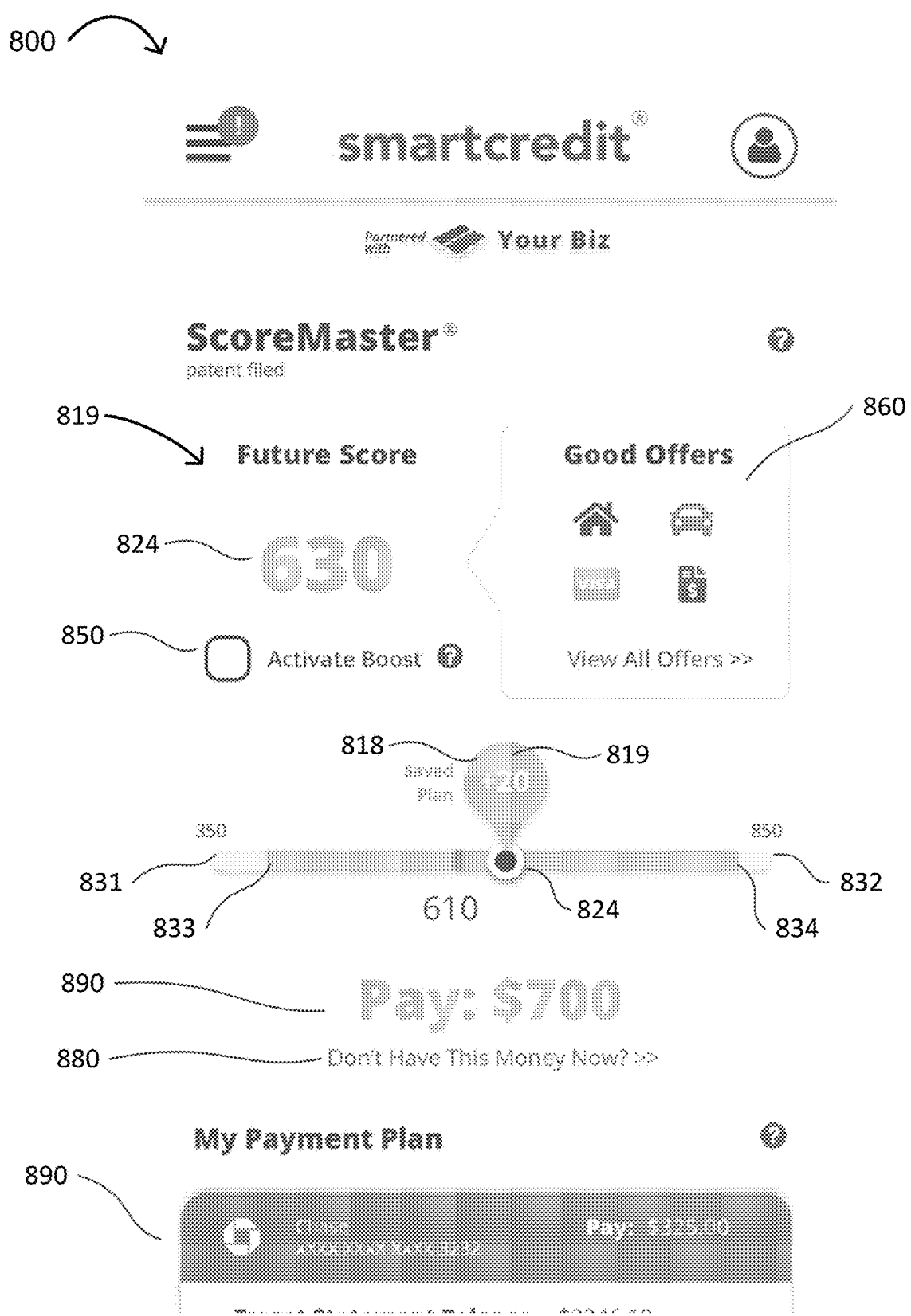
Figure 8C:
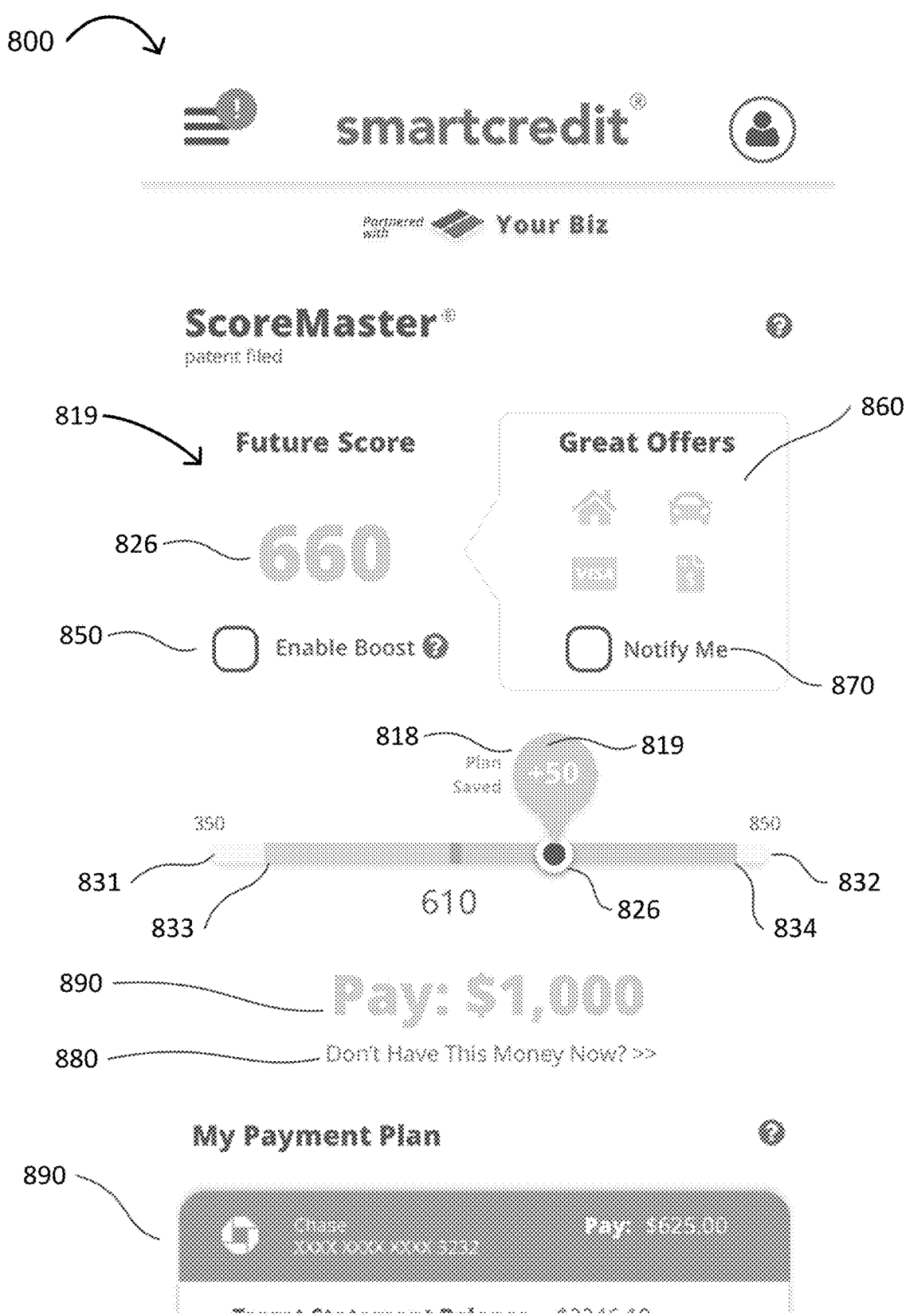
Figure 8D:
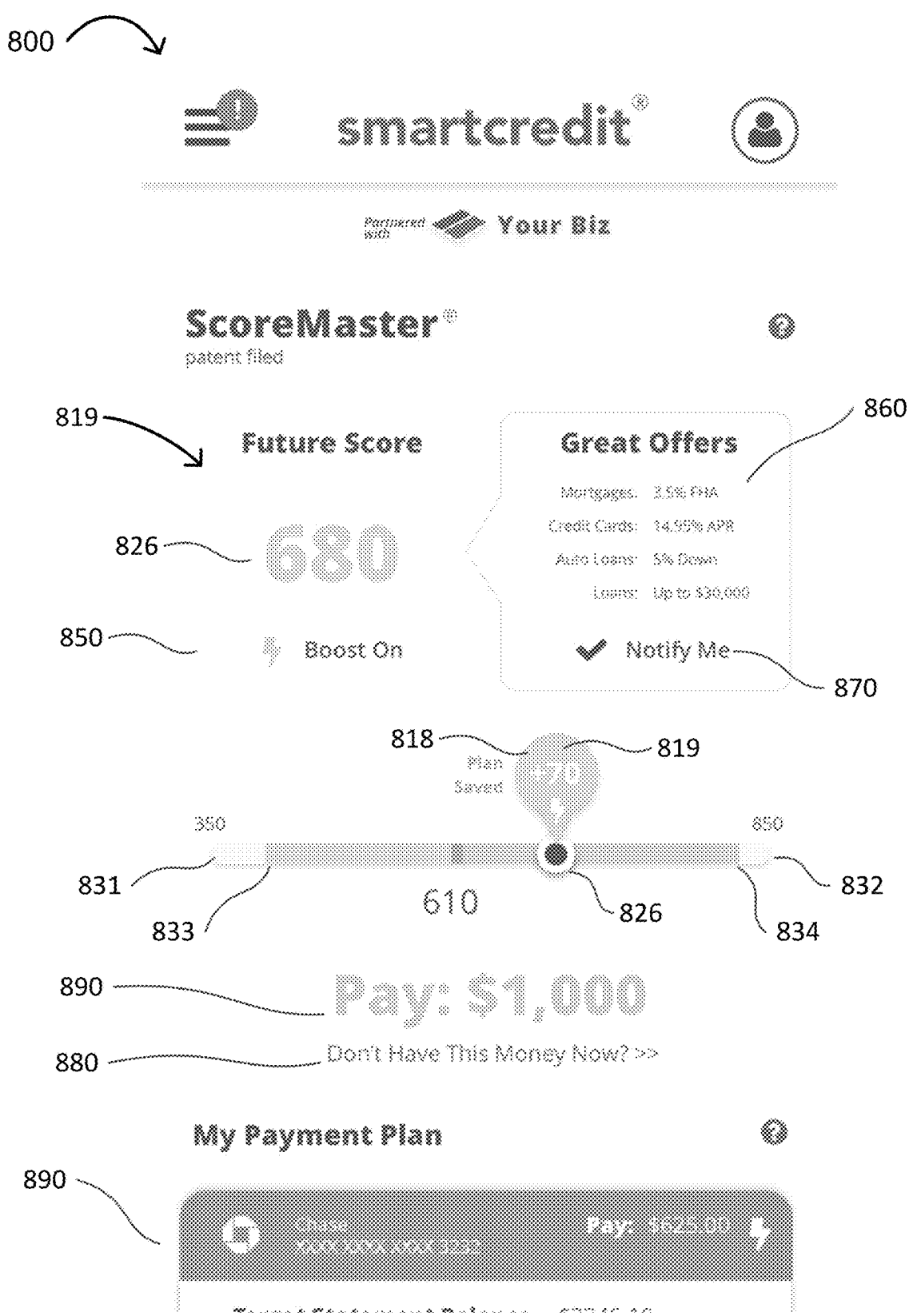
Figure 8E:
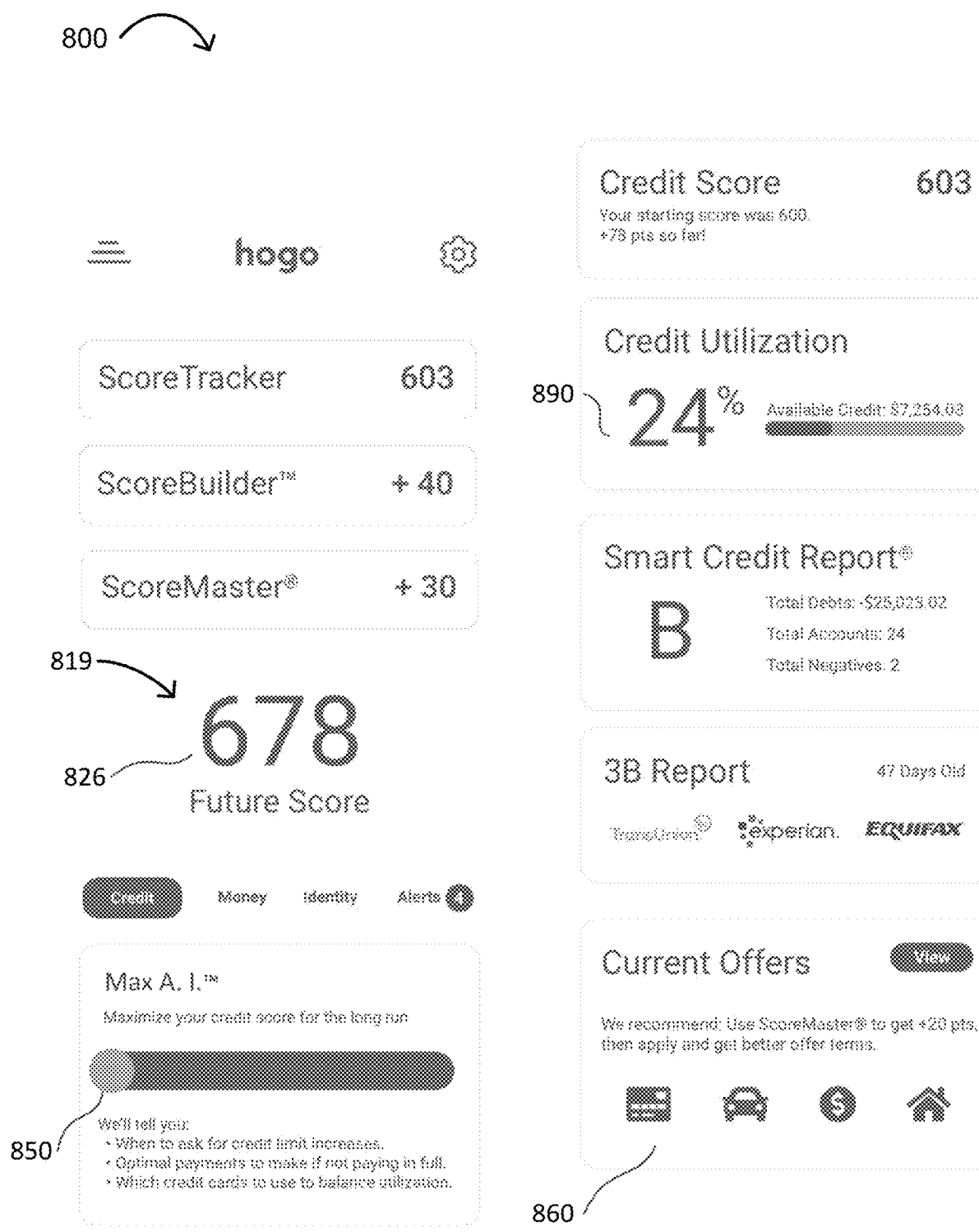

FIGS. 8A-8E show exemplary embodiments of a gamified user interface 800 for a credit score scenario provided by the system 100, as shown on a mobile device, and include the "Boost," "Max A.I.™," and "Need Money Now" features, as described herein. The gamified user interface 800 includes primary marker(s) 818, secondary markers 831, 832, 833, 834, icon or "micro-ad" sets 860, and additional information about the scenario 890. The primary marker 860, and secondary markers 831-834 can include additional information, for example, specific numeric values detailing the outcome, ranges, or other quantitative or qualitative information showing the users current credit score, possible range of scores, maximum and minimum scores, and the like. This additional information 819 can be associated with the primary marker 818 by proximity, by a similar color or a similar visual indicator to show an association with the position of the primary marker 818. The additional information 819 can also include messages or instructions for the user inviting them move the primary marker and explore possible outcomes. The scenario can include one or more icons or "micro-ads" 860 associated with the preferred outcome 820. As used herein, icons or micro-ads 460, 860 are iconology indicative of goods and services that can be available to a user. These can be stylized images to convey to the user the type of product or service provided, the third party providing the product or service, an amount of product or service, or similar details represented in the micro-ad. Each of these micro-ads 860, may be associated with one or more advertisements for goods or services, notifications or alerts, or actionable elements. The micro-ads 460 can connect a user with goods or services associated with one or more third parties, or implement certain actions in a real-world setting. These micro-ads can change in appearance to indicate changes in offers that are associated with changes in preferred outcomes 820. The scenario 800 can also include an "opt in" check box 850 for a user to provide consent to the system to autonomously increase the user's credit score. It will be appreciated that check box 850 can also be a slide switch, for example slide switch 850 as shown in FIG. 8E.

Comparing FIGS. 8A-8D, a user can move the primary marker 818 to a preferred outcome, for example outcome 824 or 826 of FIGS. 8B and 8C respectively. Once the user finished moving the primary marker 818, the system 100 can automatically save current scenario. The system can use proprietary algorithms and trends derived from primary, secondary and tertiary variables to determine the actions the user has to implement to achieve the preferred outcome. The additional information 890 shows that these actions are to pay a given amount, with further additional information 890 detailing exactly which accounts to pay and how much. Micro-ads 860 can also change appearance to highlight which goods and services are available to a user now, or will become available to the user when a preferred outcome is achieved. The user can follow links to explore more details about these offers, or to apply for this goods and services contingent on the preferred outcome being achieved. For example, FIG. 8B shows micro-ads 860 have changed color from the micro-ads 860 shown in FIG. 8A, which can indicate that improved offers are available to a user under a first preferred outcome 824. By comparison, FIG. 8C which shows a second preferred outcome 826, shows micro-ads 860 that are greyed out to indicate that these products and services are not yet available, and could be available contingent on certain actions. For example, these may not be available until the second preferred outcome 826 is achieved. The micro-ads 860 can include a "Notify Me" check box 870. The check box 870 can allow a user to provide consent to the system to notify the user when these particular offers become available. The system can also provide notifications on progress towards achieving the preferred outcome or rewards, medals, or affirmations when the changes in the variables indicate a user is making progress towards achieving the preferred outcome. As shown in FIG. 8D, the check box 870 has been activated. In an embodiment, the "Notify Me" check-box can also be provided as an actionable element 480*a* as shown in FIG.

4E. The "Notify Me" actionable element 480a can be activated by the user when a preferred scenario is achieved. The system will then notify the user, when a particular outcome 422, 424, 426 has been, or is about to be achieved in a real-world setting and the associated products and services indicated by icons or micro-ads 460a, 460b, 460c become or will become available, as described herein.

In an embodiment the system can provide a "Pre-Apply" actionable element 480b. A user can activate this to provide instructions ahead of time to apply for the goods or services when they become available. For example, a user can move a primary marker to a position as shown by primary marker "C" 426. At this position, a user can have sufficient credit score to apply for a mortgage as shown by the house micro-ad in icon set "C" 460c. A user can then action the "Pre-Apply" actionable element to provide consent, instructions, or the like, to be implemented when the preferred outcome "C" 426 is achieved. The system may provide forms to be filled out by the user ahead of time. The system can then submit these forms on behalf of the user when the preferred outcome "C" is achieved, or at a similarly advantageous time frame, without any further input from the user.

In an embodiment the "Pre-Apply" actionable element 480b can include a time limit feature, whereby if, by the expiration of a given time frame, the instructions have not been implemented, the system may utilize further input from the user before implementing the instructions. For example, a user can modify the primary marker "C" 426 and action the "Pre-Apply" actionable element 480b, thereby providing consent, instructions or completed forms, as described above. If the user's credit score fails to achieve the preferred credit score before a given time frame has expired the system can notify the user that the previous consent, instructions or completed forms have expired and that further consent, instructions or completed forms may be needed for resubmission.

Advantageously, a user can increase or decrease their preferred credit score to a preferred amount and the system will show what actions need to be carried out to achieve this credit score. Moreover, the system will also show what goods and services become available when the preferred credit score is achieved. As described herein, the system can determine that a user may not have enough available funds to carry out the actions, or payments, to achieve the preferred outcome. In this case, the system can provide an actionable element 880 that provides access to a user to the "Need Money Now" feature. By actioning the "Need Money Now" actionable element the system can autonomously implement the steps for applying for a loan to pay down accounts to achieve the preferred outcome, as discussed herein. In an embodiment the system can instruct the loan provider to directly pay the users accounts. In an embodiment, the system can autonomously secure the loan and receive the funds. The system can then use the funds pay down the user's accounts. The system can also solicit further consent from the user at one or more steps in the process. In an embodiment, by actioning the "Need Money Now" actionable element, the system can provide the user access to a third party loan provider where the user can then apply for a loan to pay the accounts and achieve the preferred outcome. In an embodiment, by actioning the "Need Money Now" actionable element, the system can provide an auction platform for different third parties to provide bids for different loan products. The system can then autonomously select an advantageous bid using predetermined algorithms, rules, or trends derived from secondary data. Alternatively, the system can present the bids and key information to the user to select which third party product to use. Advantageously, this will motivate the third parties to compete to provide improved loan products for the user.

As described herein, the scenario can also provide an "opt in" check box to a credit score "Boost" feature 850. Once activated, the system can provide visual indications in the gamified user interface in the form of color changes, instructions, or micro-ads, as shown in FIG. 8D. By activating the "Boost" icon, the system can determine which accounts to apply for a credit limit increase. Such actions can further improve a user's credit score. The system can use secondary data trends to provide an accurate estimation of the additional credit score increase that can be achieved by activating the "Boost" feature.

In an embodiment, the system can provide an additional primary marker or enhanced, "Boosted," marker which distinguishes between the changes that result from the user modifying the primary marker and the changes that are achieved by the system applying the "Boost" algorithms. For example, the user may choose to move the primary marker 818 to a second preferred outcome 826 as shown in FIG. 8C, the user can then apply the "Enable Boost" opt in check box 850 and the system determines that a further 20 points can be achieved. Accordingly, the system provides an additional superimposed marker, or similar visual indicator showing the additional points achieved by activating the Boost algorithm.

Figure 9:
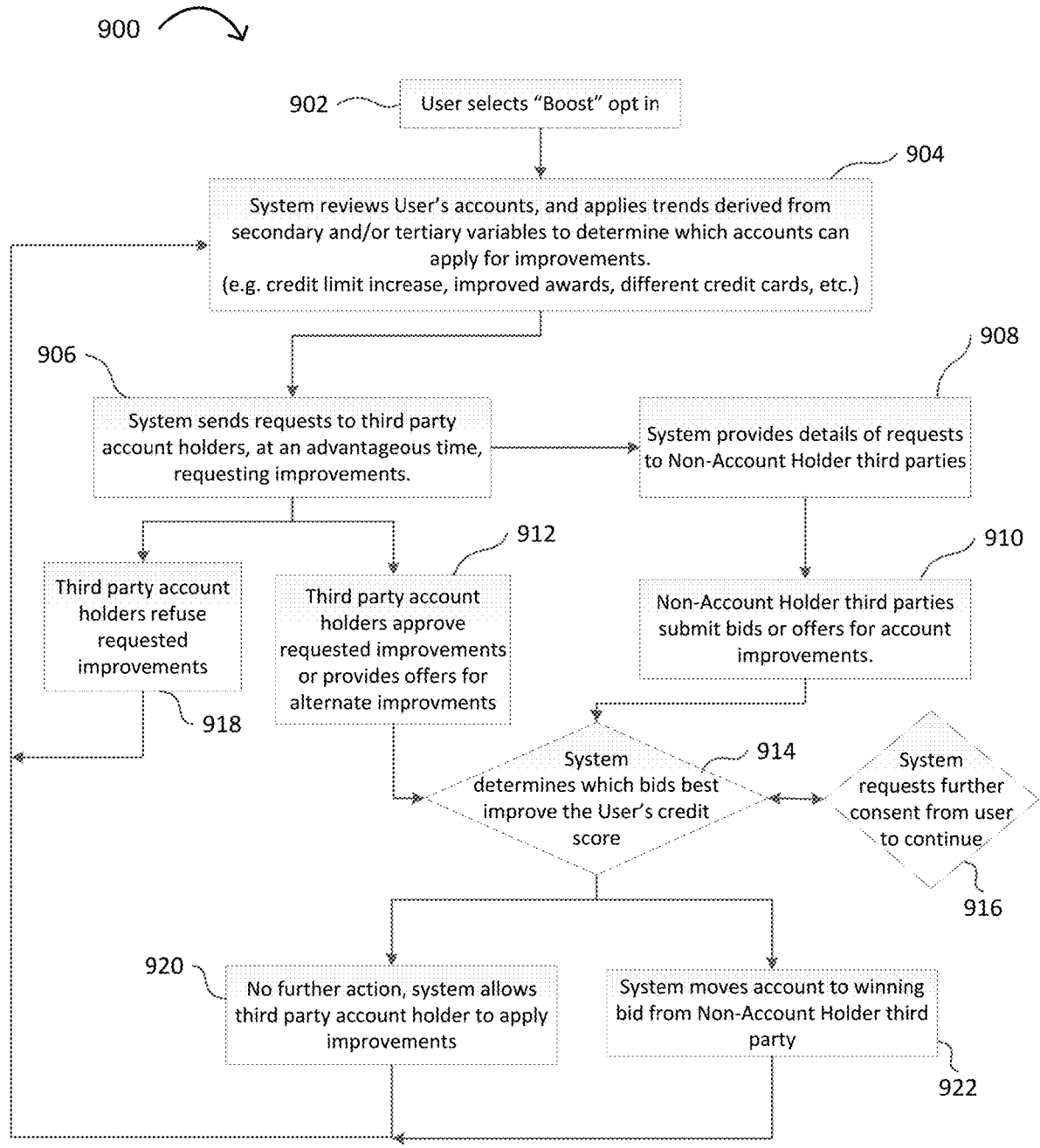
FIGS. 9-10 illustrates exemplary flowcharts of the processes, in accordance with the present disclosure.

FIG. 9 shows an exemplary process implemented by the system when the "Boost" opt in check box is actioned. When a user selects the "Boost" opt in check box 902, the system reviews primary data (e.g. user's accounts), secondary data (e.g. trends derived from other user's implemented scenarios), and tertiary data (e.g. third party products) 904. The system determines which accounts can apply for improvements such as increased credit limit, improved rewards schedule, or the like. The system can determine which accounts are eligible based on the time since the account was lasted reviewed by the system, changes in products offered by the third party account holder, instructions from the user, or comparative secondary data from similar users or similar accounts. The system then sends requests, to the third parties that hold the accounts, at a predetermined advantageous time, to request the improvements 906. The system can also send details of the requests to other third parties that do not have accounts with the user, termed Non-Account Holder third parties 908. On the basis of these system requests, the Non-Account Holder third parties can submit bids to the system to provide alternate improvements, for example a greater increase in credit limit, additional rewards or benefits (e.g. air miles, cash back, loyalty points, etc.), improved APR rates, balance transfer offers, combinations thereof, or the like.

If the third party account holders approve the requested improvements 912, and the Non-Account Holder third parties submit bids for account improvements 910, the system can determine which bids best serve the user, for example improving the user's credit score 914. In an embodiment the system can establish an auction platform for Non-Account Holder third parties to submit and modify bids in response to competing bids. The system may further seek additional input from the user 916, such as additional consent to continue or for the user to carry out instructions. The third party account holders may also refuse the requested improvements 918. The system can then determine whether to keep the user's accounts with the existing Account Holder third parties, or whether to move one or more accounts to a winning bid from a Non-Account Holder third party 922. The process 900 can then repeat to step 904.

Figure 10:
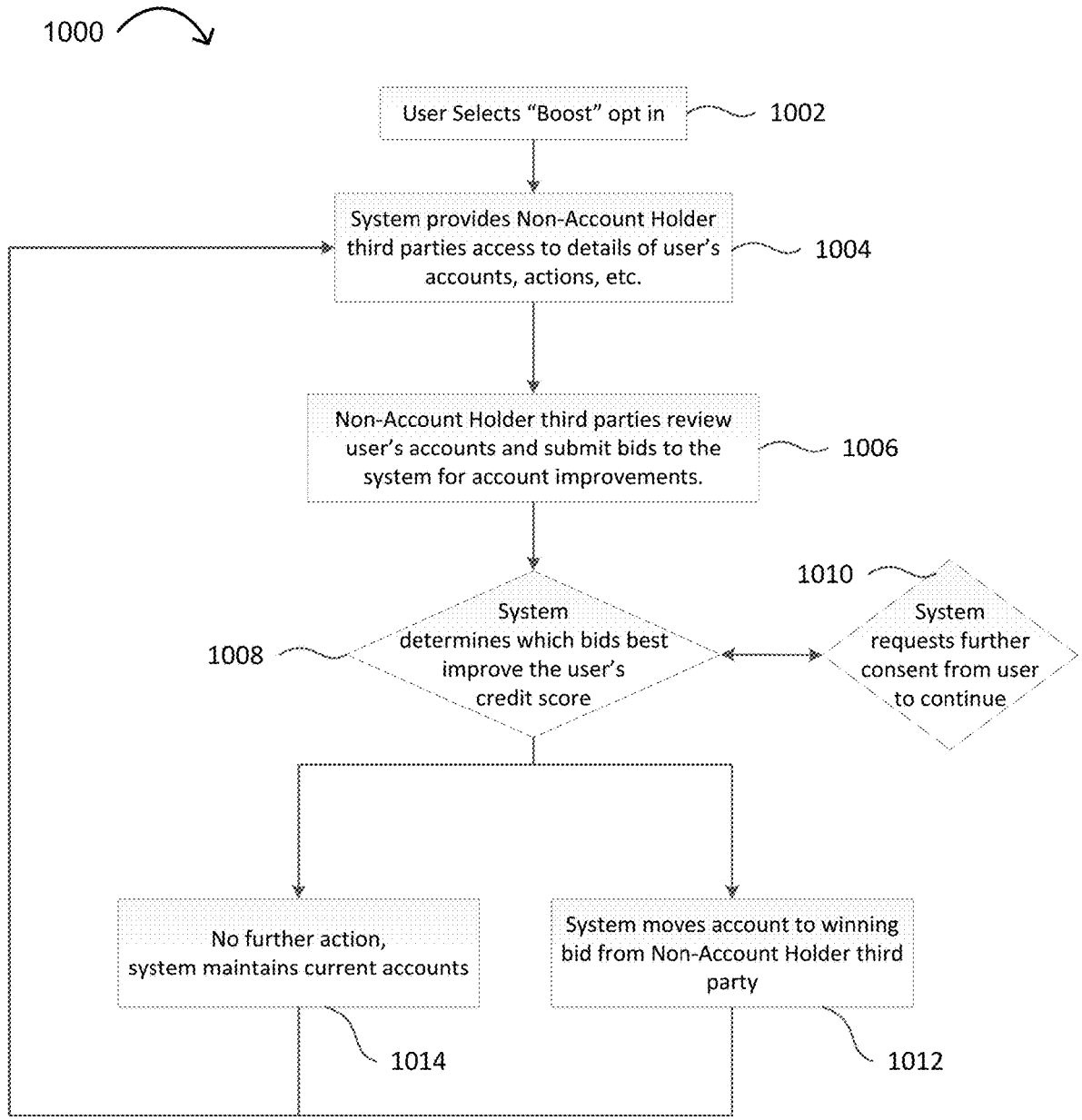

FIG. 10 shows an exemplary process implemented by the system when the "Boost" opt in check box is actioned. In an embodiment, once the user selects the Boost opt in check box 1002, the system can provide Non-Account Holder third parties access to the user's details, accounts, actions, and the like 1004. Instead of the system actively requesting bids against requests sent to Account Holder third parties, the Non-Account Holder third parties can initiate a bid by reviewing the user's data and submitting bids against the users existing accounts separately from, or in addition to, the system actively requesting bids. The system can then review the bids submitted by the Non-Account Holder third parties and determine if the bid will be beneficial to the user, for example by improving the user's credit score 1008. The system can determine if these bids are beneficial to the user based on a set of predetermined rules, algorithms, probabilities, trends, neural network techniques, machine learning, Artificial Intelligence (A.I.), or the like. The system may also request further consent from the user to proceed, either prior to, or after, determining if the bid is successful 1010. If the system determines that the bid will be beneficial to the user, the system can provide instructions to both the Account Holder third party and the Non-Account Holder third party to transfer the account across to the Non-Account Holder third party 1012. The process can then repeat back to step 1004. If the system determines that the bid is unsuccessful then the system maintains the current accounts 1014 and the process can repeat back to step 1004. In an embodiment, the system can also notify the user regarding the improved bid in the form of a temporally appropriate notification or advertisement and include instructions on how to proceed.

In an increasingly crowded consumer marketplace, the volume of choice for products and services, together with the channels by which these are advertised, frequently leads to consumer fatigue. Users are often bombarded with offers from third parties to open yet further accounts (e.g. credit card offers) or buy in to yet further products, without fully appreciating the positive or negative effects this will have on the users objectives. Similarly, third parties are blind to the needs of the consumer, resulting in a blanket marketing approach, exacerbating consumer fatigue. Advantageously, in the examples provided herein, the system is able to nurture the accounts already held by the user, and establish connections with third parties to determine the best combination of products that would best serve the user.

The present systems and methods are directed to providing a universal payment system to direct a user's transactions. The system can retrieve credit score and account information and determine a transaction model which details which accounts to use, in which order, and how much to allocate to each account, termed "balance utilization" or "credit utilization," in order to maintain a credit usage level that benefits the user's credit score. Further, the system can autonomously extend the credit limit to one or more accounts, or open new accounts in order to maintain a predetermined credit usage level and maintain or improve the user's credit score. The system can generate a new model in response to temporal, action, or location based triggers.

The system can provide details of the transaction model to the user by way of an interactive notification, or gamified interface. These notifications can provide pertinent details about the transaction model to the user to direct the user's transaction behavior. Further the system can request further input from the user, for example, requesting permission to pay down an existing account, permission to extend credit limit on one or more accounts, permission to open new accounts, or permission to autonomously perform such actions in future, or the like.

The system can include a Universal Payment Device. The system can provide the most recent transaction model, or pertinent details thereof, to the device. The user can the use the Universal Payment Device for a transaction and the Universal Payment Device applies the transaction to the model to determine how to direct the transaction between the users accounts so as to maintain or improve the user's credit score. In this way the system at least minimizes the impact of the transaction on the users credit score, or even improves the user's credit score by distributing the transaction according to the transaction model. The Universal Payment Device can be a standalone device or coupled with a networked device, such as a smart phone, wearable device, tablet, laptop, or similar device.

Figure 11:
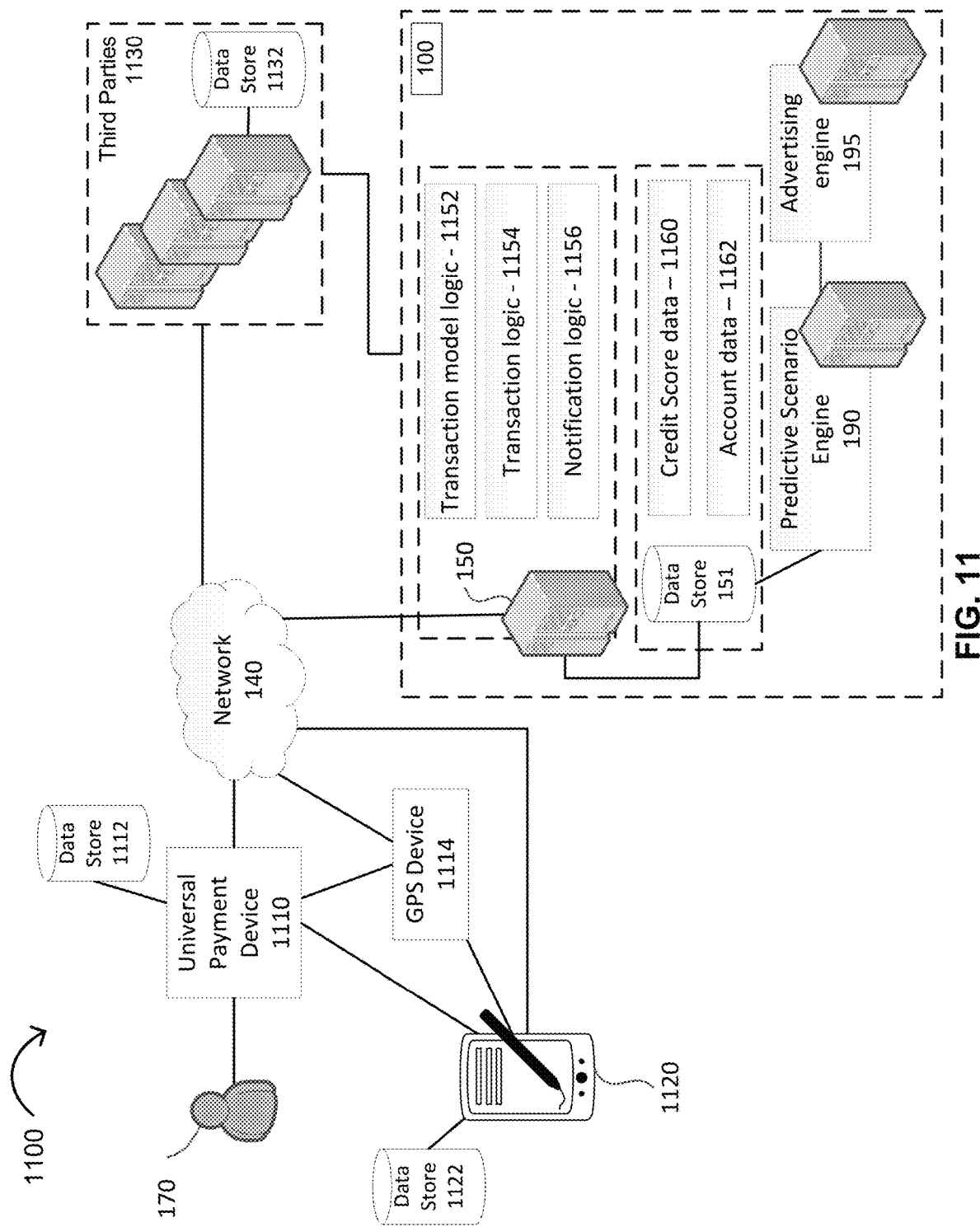
FIG. 11 illustrates an exemplary system including a server and a networked device which include transaction model logic, transaction logic, and notification logic, and data structures including user account information and credit score information.

Referring to FIG. 11, an exemplary diagram of a Universal Payment System 1100 is shown. The system can be coupled with a scenario gamification system 100 shown in FIG. 1 by way of network 140 and server 150. Further details of the scenario gamification system 100 are described in U.S. 2018/0308317 which is hereby incorporated by reference in its entirety. The Universal Payment System 1100 includes a Universal Payment Device 1110 and one or more computing devices, such as server 150 and networked device 1120. With respect to physical architecture, each of the computing devices 150, 1110 and 1120 includes one or more processors and memory, further details of which are shown in FIG. 6 and described in U.S. 2018/0308317 which is incorporated by reference in its entirety. The physical architecture of Universal Payment Device 1110 will be discussed in more detail herein. These computing devices 150, 1110 and 1120 may be communicatively coupled together, either directly or indirectly, by means of one or more networks 140. Exemplary network(s) 140, as will be appreciated by those skilled in the art, may be a public network (e.g., internet), a private network (e.g., local area network "LAN", wireless LAN "WLAN", intranet, etc.) or a combination of public and/or private networks.

The server 150 may include transaction model logic 1152, transaction logic 1154, and a notification logic 1156 as will be described in more detail herein. The server 150 may also include memory (local data storage 151) which may include one or more relational databases. In an embodiment, one or more of transaction model logic 1152, transaction logic 1154, and notification logic 1156 may be located remotely on a Universal Payment Device 1110, or networked device 1120. In an embodiment, one or more of the relational databases may be stored remotely, or mirrored on, the local storage 1112 of a Universal Payment Device 1110, or the local storage 1122 of a networked device 1120, or combinations thereof, located with the user 170 subscribing to the Universal Payment System 1100.

The one or more relational databases stored on local storage 151 of either the server 150 or networked device 1120 may include primary, secondary, and/or tertiary data about the user 170. For example, such data can include but not limited to, credit score information 1160, and account information 1162. Credit score information 1160 can include the user's numerical credit score, the user's credit rating, i.e. "fair," "good," "exceptional," etc. Account information 1162 can include the number of lines of credit (accounts), the credit limit for each account, the credit usage for each account, or the like. These data 1160, 1162 can either be provided directly by the user (primary data), derived by the system 100 from information about the user 170 or other users of the system (secondary data), or provided by third parties 1130 (tertiary data) from third party data stores 1132. Exemplary third parties can include banks or other financial institutions, data warehouse brokers, credit scoring agencies, or the like. Further examples of information that can be used are included in U.S. 2018/0308317 which is incorporated by reference in its entirety.

As further shown in FIG. 11, and as will be discussed in more detail herein, the server 150, or the networked device 1120, includes transaction model logic 1152 configured to perform functions to determine a transaction model. The transaction logic 1154, includes logic configured to autonomously apply transaction data to the transaction model to determine how to apply the transaction to the user's accounts to benefit the user's credit score. The notification logic 1156, includes logic configured to present notifications that include details of the transaction model to the user 170 and to request further input from the user 170. The notifications can include gamified interfaces to present details of the transaction model to understand the amount of credit usage that is available to the user, which actions can further increase the user's credit usage, which accounts can be paid down, how much to apply to pay to each account, and what impact this would have on the users credit score. Further the notifications can request further input from the user, for example, requesting permission to extend credit limit on one or more accounts, open new accounts, or permission to autonomously perform such actions in future, or the like.

Figure 12A:
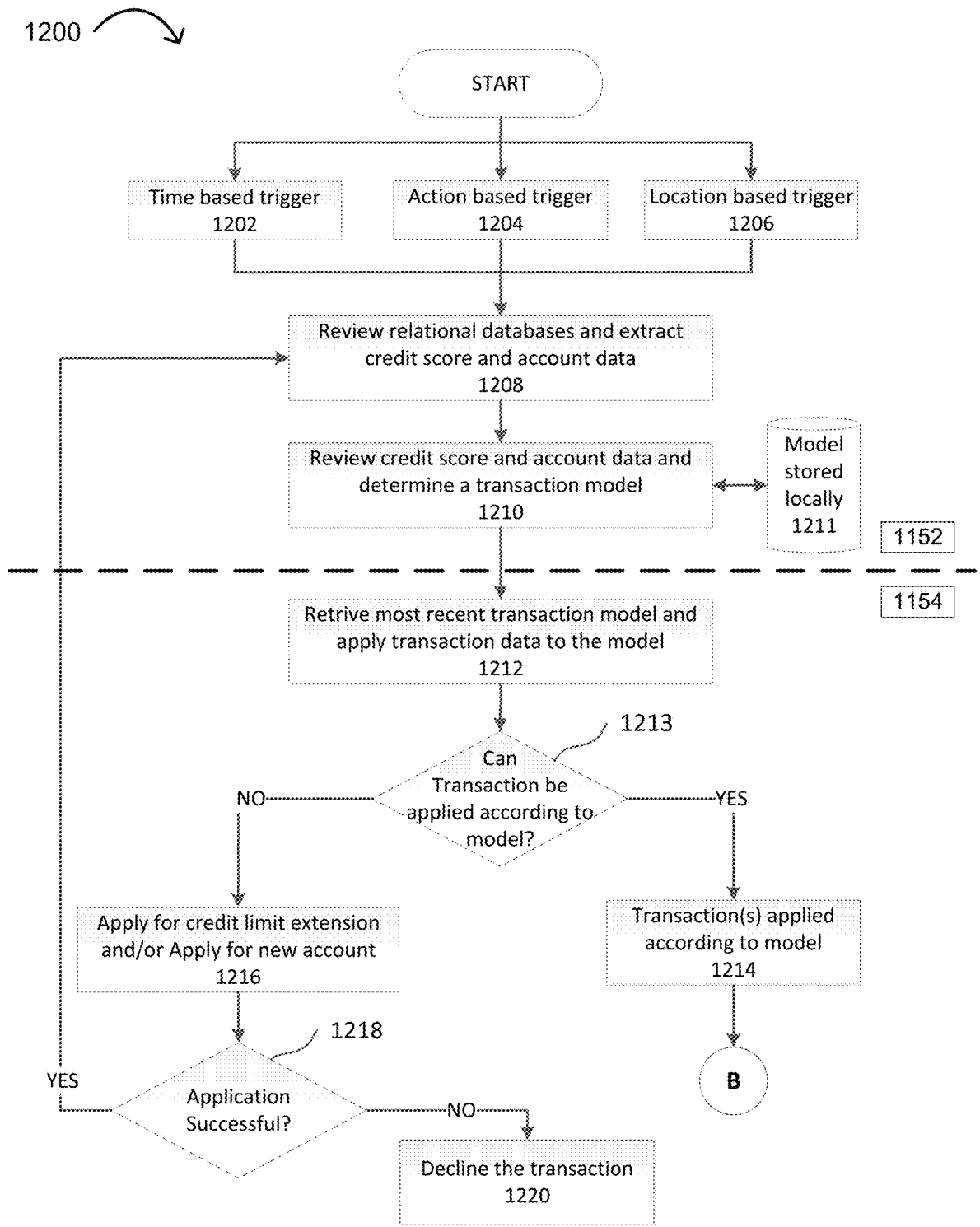
FIGS. 12A-12B is an exemplary flow-diagram of a transaction model process carried out by the transaction model logic and the transaction logic of FIG. 11.
Figure 12B:
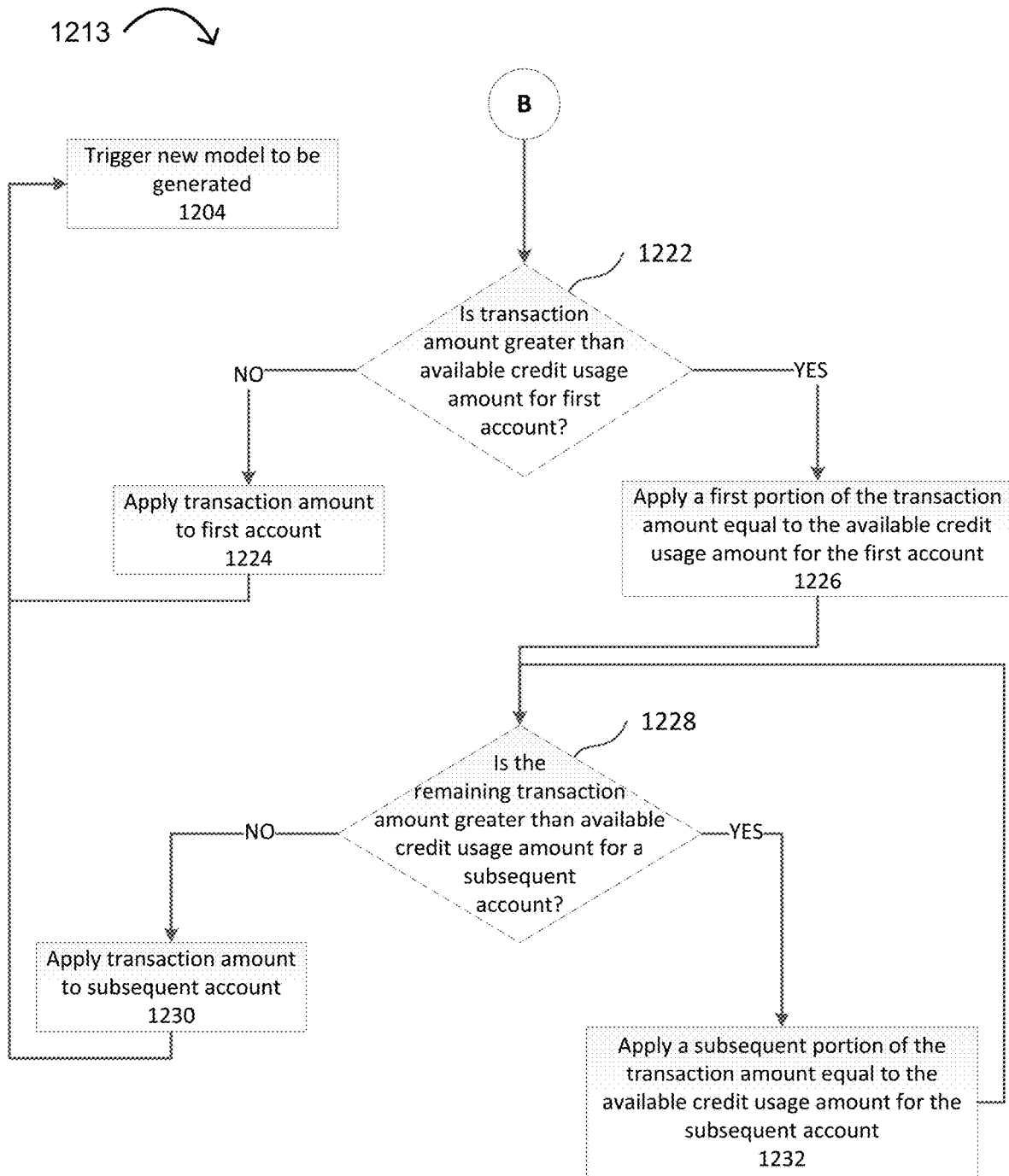

Referring to FIG. 12A-12C, an exemplary transaction model and transaction model determination process 1200 executed by the transaction model logic 1152 and transaction logic 1154 of FIG. 11 is shown. The transaction model determination process 1200 is initiated by a triggering event, which may be a time-driven trigger 1202, an action-driven trigger 1204, location-drive trigger 1206 or combinations thereof. By way of non-limiting examples, time-driven triggers 1202 can include a predetermined time frame such as a certain time of day, noon, midnight, before or after the workday, after a given amount of time has elapsed, or at a similar time or time interval. The system 1100 can also receive time-based triggers based on trends derived by the system 100. For example, the predictive scenario engine 190 can determine a trend of users spending behavior to determine that a user typically purchases an item during a given time frame. The system 1100 can use this trend to trigger the transaction model determination process 1200 at a time that is at or before this time frame.

Action-driven triggers 1204 may include automated triggers, manual triggers, or autonomous triggers. Automated triggers may include, but not limited or restricted to, the initiation of a transaction, placing an item in an online shopping basket, a change in credit score for the user, a change in interest rates, a change in credit usage, or in credit limit for one or more of the user's accounts, viewing a particular advert, or the like. Manual triggers may include, but not limited or restricted to, the initiation of the process by a human operator, or the like. Autonomous triggers may include, but not limited or restricted to, triggers determined by the system itself from trends derived from secondary data. For example, the system 1100 can predict expenditures based on trends in secondary data by the predictive scenario engine 190.

Location based triggers 1206 can include the proximity of the user to a particular location. For example, the system can retrieve geo-location data of the user from a GPS device 1114. The GPS device 1114 can be coupled with the system 1100 by way of network 140, or by way Universal Payment Device 1110, or networked device 1120. When a user enters a particular store, or is proximate to a particular location, user's proximity to this location can trigger the transaction model determination process 1200.

After the model determination process 1200 has been triggered, the transaction model logic 1152 of FIG. 11 reviews data from the relational databases, and extracts credit score and account information for the user 1208. The account information can include the: number accounts, the credit usage, credit limit, as described herein. The transaction model logic 1152 then reviews the data and generates a transaction model for the user 1210. The transaction model logic 1152 may use various rules based, proprietary algorithms, weightings and/or coefficients, machine learning techniques, neural networks, statistical learning, artificial intelligence (A.I.), or combinations thereof to generate the transaction model, although similar techniques may also be used and fall within the scope of the present invention.

The transaction model can include various features. An exemplary transaction model 1250 is shown in FIG. 12C. These transaction model features can include which of the user's accounts to include in the model 1254, what order to use the accounts 1252, the credit limit available for each account 1256, the current credit usage 1258, i.e. "balance utilization" or "credit utilization," the amount of credit usage to apply to each account 1260, what amount of the transaction(s) to allocate to each of the accounts in order to benefit the user 1262. The benefits to the user can include reducing a negative impact of the transaction(s) on the users credit score, maintaining a user's credit score, improving the user's credit score, increasing the amount of cash back rewards, loyalty points, air miles, coupons, or similar rewards offered by the different accounts. The transaction model logic 1152 can then store the transaction model locally 1211, for example on data storage 151 or data storage 1122.

The transaction logic 1154 can then retrieve the most recent transaction model 1212, that is stored locally 1211, and determine if the a transaction, or groups of transactions(s) can be applied to the model 1213. In an embodiment, the transaction model is derived and stored by the transaction model logic 1152 before a transaction is made. When a transaction is made, the transaction logic 1154 retrieves the most recent transaction model and applies the transaction data to the model 1212. In an embodiment, the transaction is an action trigger 1204 that initiates the generation of a new transaction model by the transaction model logic 1152 that the transaction logic 1154 then applies the transaction to.

The system 1100 can then apply the transaction to the model 1214. As shown in FIG. 12B, the system determines if the transaction amount is greater or less than the available credit usage amount for the first account 1222. If the transaction amount is less than the available credit usage amount for the first account, the transaction is applied to the first account 1224 which triggers the system to generate a new transaction model 1204. If the transaction amount is greater than the available credit usage amount for the first account, the system applies a first portion of the transaction amount to the first account, wherein the first portion of the transaction amount is equal to or less than the amount of available credit usage for the first account 1226. The system then determines if the remaining amount of the transaction is greater or less than the available credit usage amount for a second or subsequent account 1228. If the remaining amount of the transaction is less than the available credit usage amount for the subsequent account the remaining amount of the transaction is applied to this subsequent account 1230, which triggers the system to generate a new transaction model 1204.

If the remaining amount of the transaction is greater than the available credit usage amount for the subsequent account a subsequent portion of the transaction is applied to the subsequent account 1232 and the system repeats through to operation 1228 until the entire amount of the transaction is allocated between the accounts within the transaction model. It is important to note that the amounts applied to each account do not exceed the available credit usage amount as determined by the transaction model. This amount is different from the credit limit for the account. Accordingly the credit usage amounts for the user's accounts are maintained at a level that benefits the users credit score, and/or provides additional benefits to the user. The credit usage amount can vary between different accounts. Further the exact amount of credit usage for each account can be determined from trends derived from secondary data of other users of the system.

Referring back to FIG. 12A, if the transaction cannot be applied, the transaction model logic 1154 can apply for a credit limit extension on one or more of the accounts so as to provide sufficient credit usage for the transaction 1216. The transaction model logic 1154 can also apply for additional lines of credit for the user so as to provide sufficient credit usage for the transaction 1216. If any of the applications for an increase in credit limit or new account, or combinations thereof, are approved 1218, the process repeats to operation 1208 and re-reviews the credit score and account data to revise the model accordingly. This process can repeat through 1218, 1208 until no further credit limit extensions or accounts are possible. For example, either no further credit limit extensions or accounts are approved by third parties 1130, or applying for further credit limit extensions or accounts would have a greater negative effect on the user's net credit score or credit rating that not applying for a new account. In which case, the transaction is declined 1220.

Each transaction model that is derived can be stored locally 1211 and accessed by the system 100, e.g. predictive scenario engine 190, advertising engine 195, or the like, to determine trends. These trends can be used to further improve future transaction models by increasing the accuracy of changes to credit score, improving the allocation of benefits to the user, or the like.

In an embodiment, the notification logic 1156 can further retrieve the most recent transaction model, stored locally 1211, and present features of the model to the user, and/or request further input from the user 170. For example, the notification logic 1156 can generate a notification to present features of the transaction model such as which accounts to use, and in which order, how much to apply to each account, and the like. The notification logic 1156 can also retrieve typical transaction information for the user based on historical trends from secondary data and apply these to the model to illustrate how different transactions can impact the user's credit score. The notification logic 1156 can further request additional input from the user such as permission to apply for increased credit limit on one or more of the accounts, and/or request to apply for additional accounts. The notification logic 1156 can further illustrate the impact of these actions on the users credit score, and/or the additional benefits that will be accessible as a result of applying for increased credit limit/opening new accounts.

Figure 13A:
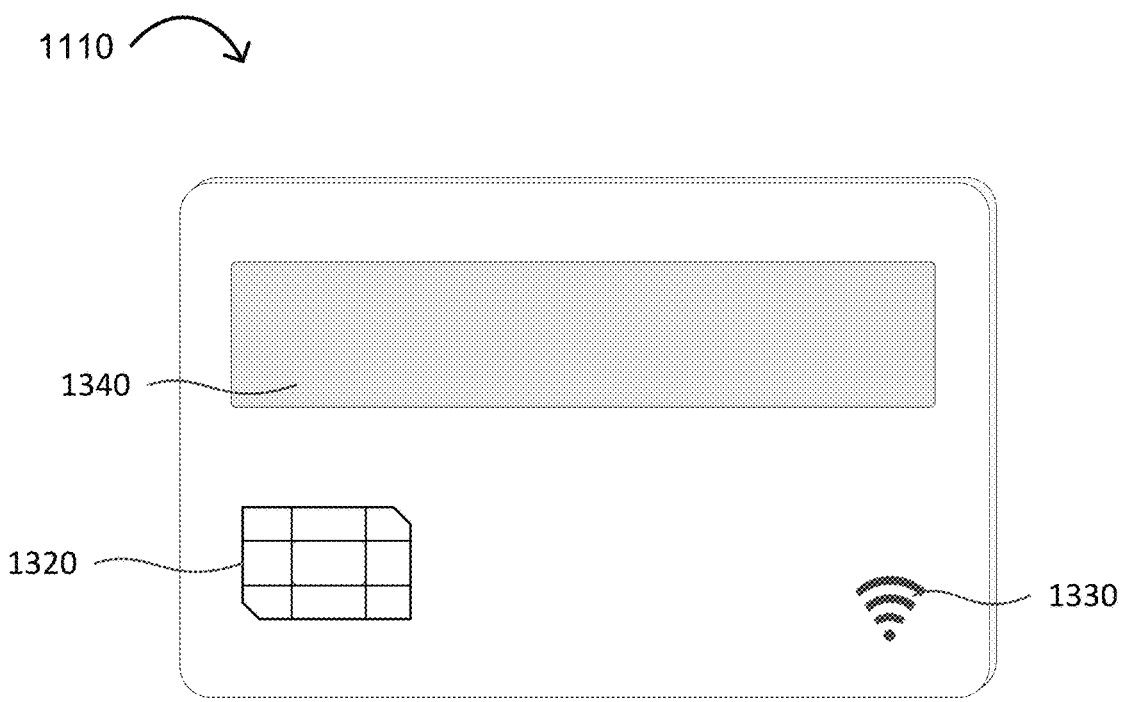
FIGS. 13A-13B is an exemplary universal payment device in accordance with the present disclosure.
Figure 13B:
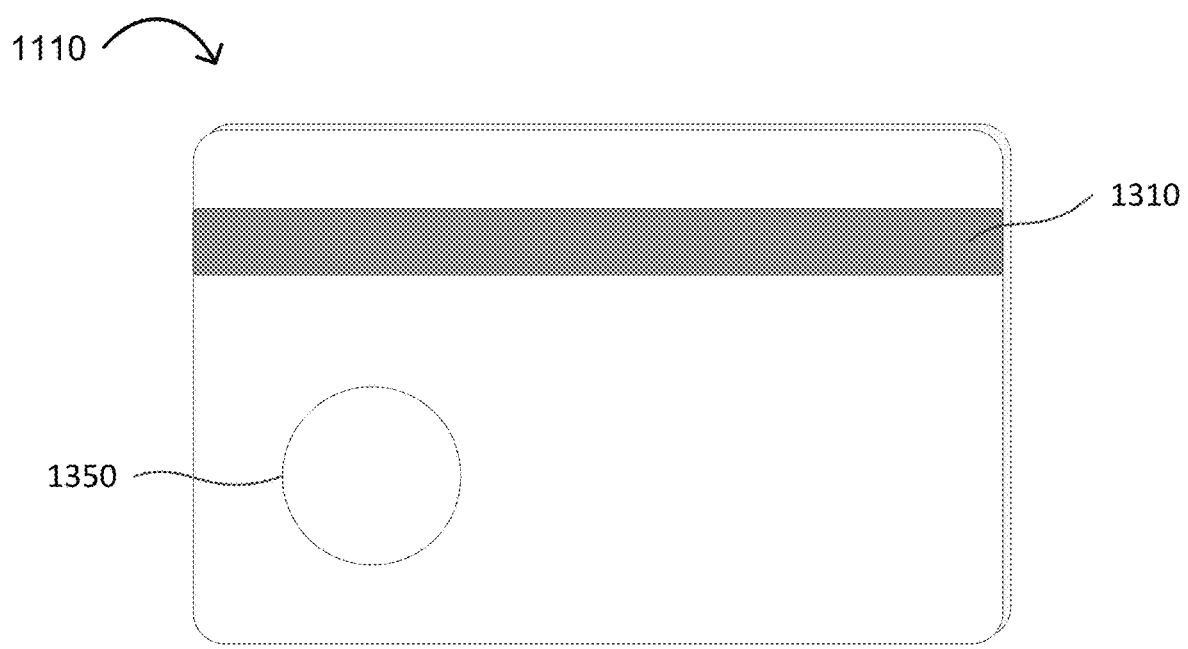

In an embodiment the Universal Payment System 1100 can include a Universal Payment Device (UPD) 1110. FIGS. 13A and 13B show a front and back side view of the UPD 1110 according to an embodiment. The Universal Payment Device 1110 can be a credit card-shaped device that includes a magnetic strip 1310, an EMV chip 1320, wireless communications module 1330, a display 1340, a power source 1350, processors (not shown), and storage media (not shown). As used herein the wireless communication module can include WiFi, Bluetooth®, Near Field Communications (NFC), or similar wireless communication modes.

The UPD 1110 can operate and function similar to a regular credit card when interacting with a merchant. The magnetic strip, wireless communication module, and EMV chip can communicate with the merchant transaction devices to provide payment details for a transaction. The display can also provide sixteen-digit numbers, expiry dates, and similar information to a merchant. The UPD 1110 can communicate with the system to retrieve the most recent transaction model. In an embodiment, the UPD 1110 can store the transaction model locally on data store 1112. When the UPD 1110 is used for a transaction, the UPD 1110 applies the transaction to the model to determine which accounts are to be used, and how much are to be applied to each. In an embodiment, the UPD 1110 can provide billing credentials, e.g. a sixteen digit number and expiry date, which are unique to the UPD to which the merchant can bill to. The system 1100 can then apply the transaction to one or more of the user's accounts according to the most recent transaction model.

In an embodiment, the notification logic 1156 extracts and provides pertinent details of the most recent transaction model to the UPD 1110 to be used in the next transaction. For example, the notification logic 1156 can provide details of which accounts are to be used, the amounts to be applied to each account, the order with which they are to be used, combinations thereof, or the like. Accordingly, when the UPD 1110 is used for a transaction, the UPD provides details of the first account to be used according to the transaction model. When the amount of credit usage for the first account has been reached, as determined by the transaction model, the UPD 1110 provides details of a second account. The second account can then be used until the amount of credit usage on the second account is reached, as determined by the transaction model. This process is repeated until all of the user's accounts included in the model have reached their predetermined credit usage level. Further, the UPD 1110 can autonomously apply for credit limit extensions or request to open a new account to provide additional credit usage without negatively impacting the user's credit score. The UPD 1110 can request permission from the user to carry out these actions at the point of sale or before the transaction is applied. In an embodiment the user can provide permission to autonomously implement these actions when a transaction is made or before.

In an embodiment, the UPD 1110 can be coupled with a networked device 1120, e.g. a smart phone, tablet, or similar device. The UPD 1110 can then communicate with the system 1100 via the networked device 1120. In an embodiment, the UPD 1110 can be coupled with a digital wallet or payment application ("app"), for example, APPLE PAY™, ANDROID PAY™ GOOGLE PAY™, SAMSUNG PAY™, or the like. The UPD 1110 can be used via the digital wallet similar to that of a regular credit card. The UPD 1110 can then provide details of the account(s) to be used for the transaction, according to the transaction model, or provide the unique payment credentials for the UPD 1110 and redistribute the transaction between different accounts according to the transaction model.

Advantageously, the system provides notifications to the user with regards how to distribute potential spending amounts so as to improve credit utilization in order to improve a user's credit score. The user can view and interact with the notification, which can be presented in the form of a gamified user interface to understand the amount of credit usage that is available to the user, and which actions can further increase the user's credit usage, and what impact this would have on the users credit score. Further, the system can autonomously redistribute transaction amount(s) between different credit amounts so as to maintain a user's credit usage at levels that improve the user's credit score. Further still, if a transaction is too large to put on a single account due to limited credit limit, the system can distribute the transaction between different accounts. The system can also autonomously request credit limit increases and/or open additional accounts on behalf of the user to enable a transaction, while minimizing the impact on the users credit score. Accordingly, in the examples provided herein, the system is able to leverage the accounts already held by the user further improve a user's credit score In an embodiment, the system 100 can share access to a gamified interface or scenario, for a user 170, with a third party such as sharing access to a mortgage scenario with a mortgage lender, as discussed herein. The user provides consent to share the data with the third party. Both the user 170 and the mortgage lender can modify the scenarios 160, 162, until a preferred scenario 164 is achieved. For example, the user and/or mortgage lender can modify a primary marker to a preferred credit score. The system 100 then indicates improved mortgage products, e.g. by way of micro-ads 860, now available to the user based on the preferred credit score. Improved mortgage products can include reduced interest rates, reduced monthly payments, reduced down payment, reduced closing costs, combinations thereof, or the like, that result in saving for the user. Further the system 100 can indicate any actions necessary to achieve the preferred credit score. Such actions can include paying down one or more accounts, balance transfers to new accounts, opening new accounts, taking out a loan to pay down existing accounts, combinations thereof, or the like, as discussed herein. Once the preferred scenario is agreed on, the user can authorize the system to implement these actions to achieve the preferred credit score, using the actionable elements, as described herein.

Figure 14A:
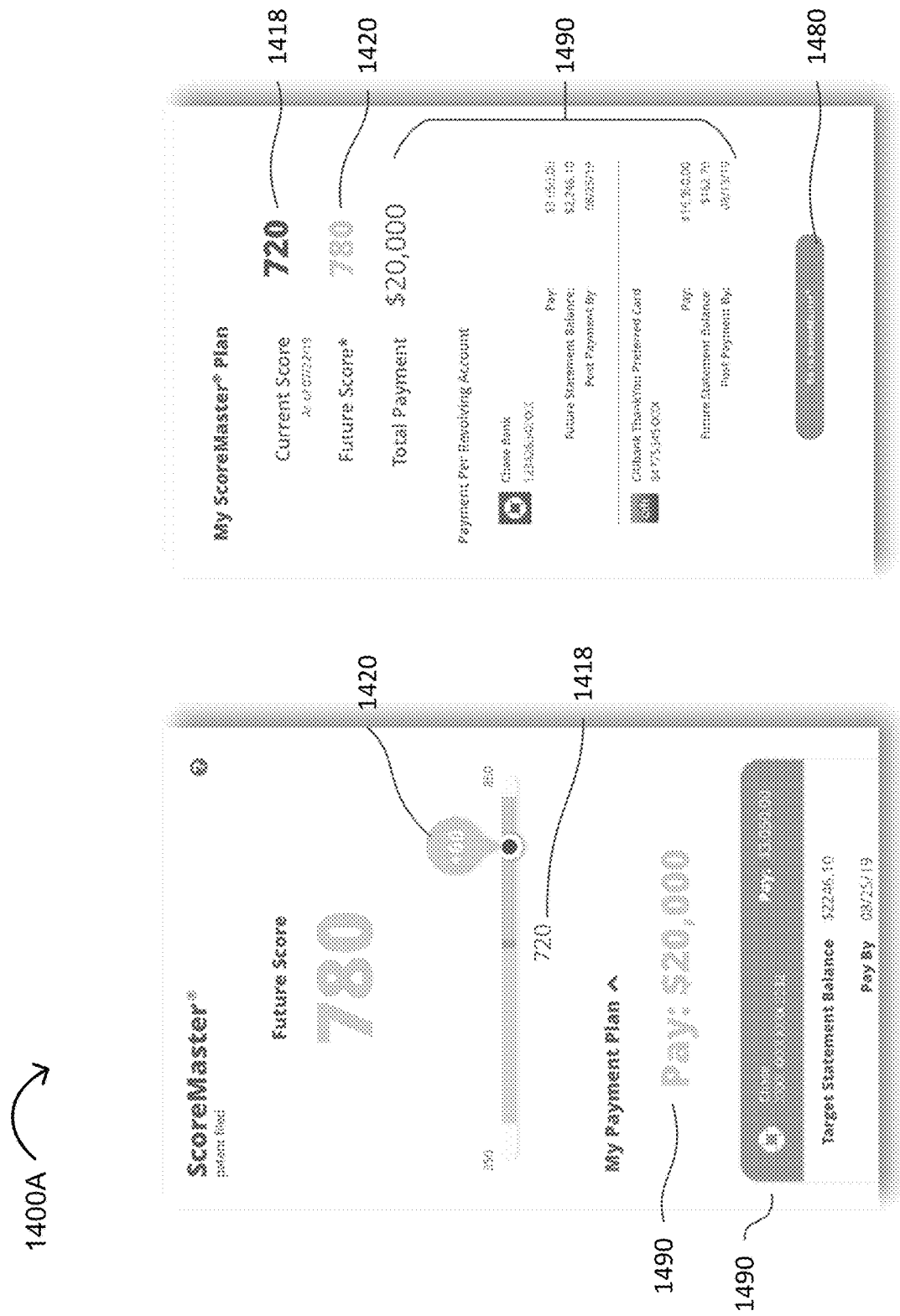
FIG. 14A-14B illustrates an exemplary gamification interface of the system, in accordance with the present disclosure.
Figure 14B:
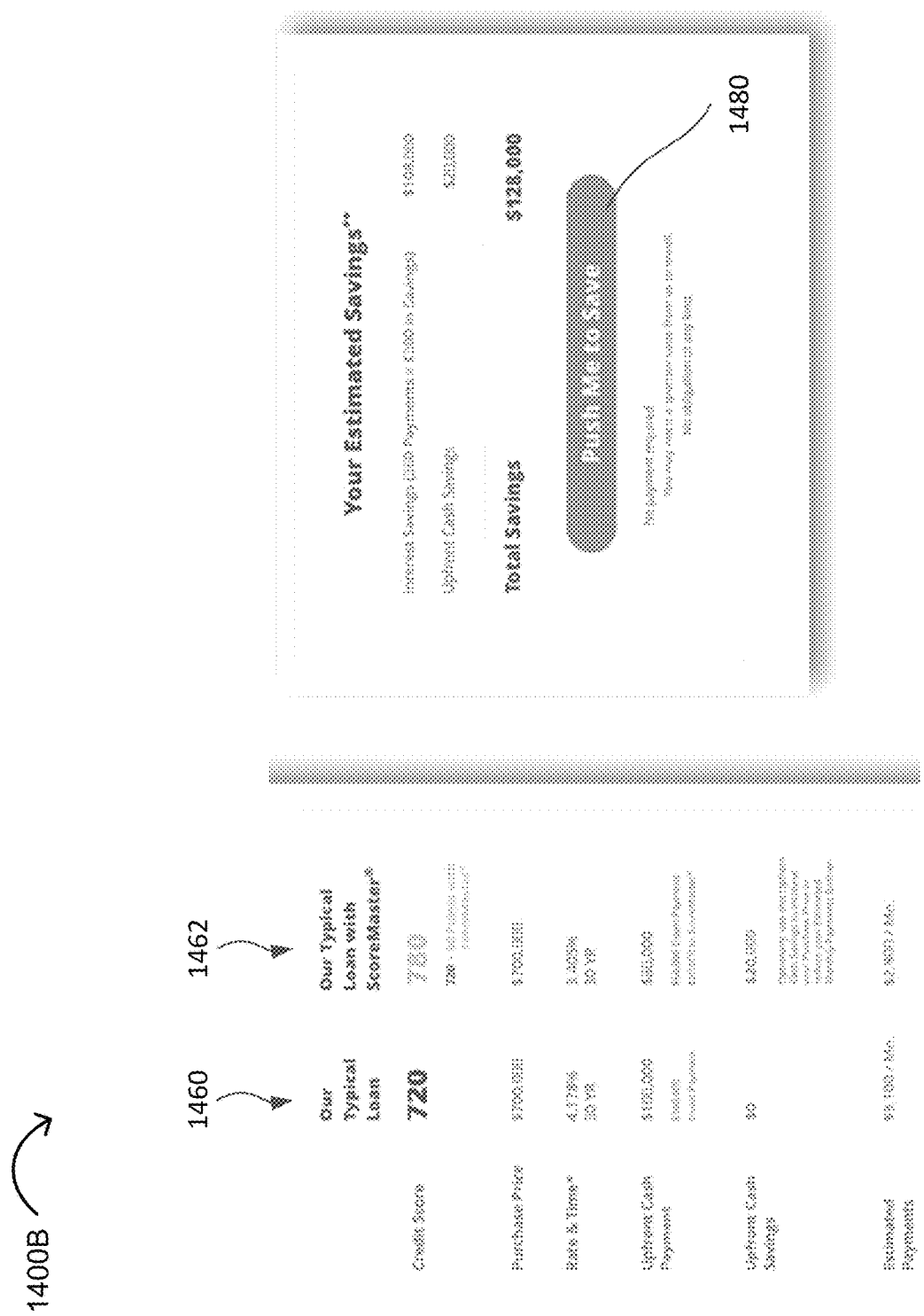

FIGS. 14A-14B show an exemplary screenshots of the gamified interface and scenario for a mortgage scenario implemented by the system 100. FIG. 14A shows a gamified interface 1400A, as described herein, and FIG. 14B shows a comparison 1400B of the different mortgage products available to the user 170. It will be appreciated that the screenshots 1400A and 1400B can be provided simultaneously on the same interface or customizable window, or separately in different interfaces or customizable windows, as described herein. The interface includes a first primary marker 1418 indicating a current credit score, and a second primary marker 1420 indicating a preferred outcome, of a preferred credit score. The interface further includes additional information 1490 indicating the change in the variables, i.e. user accounts to achieve the preferred outcome 1420 and actionable elements 1480 to implement the scenario in a real-world setting. FIG. 14B shows a first mortgage product 1460 associated with a first primary marker 1418 which is based on the users current credit score, e.g. a credit score of 720. The second mortgage product 1462 is associated with the second primary marker 1420, and a preferred credit score, e.g. a credit score of 780.

Advantageously, the system 100 shows how the change in variables shown at 1490 (e.g. the users accounts), that achieve the preferred outcome of the preferred credit score, results in savings for the user over the course of the mortgage. As described herein, the system 100 can provide instructions of the amount(s) to pay, to the account(s) to which to pay, and also the dates by which the amounts must be paid. For example, the payments can be timed to be 6 to 8 days prior to a creditor reporting cycle. This prevents the user from moving funds out of their accounts too early, but not too late to register with the most recent reporting cycle. Accordingly, the system 100 reduces consumer lending risk and increases the quality of loan products by lowering the debt-to-income ("DTI") ratio and increasing credit scores. In an embodiment, the DTI ratio is lowered and credit scores are increased within 15 to 30 days of implementing the scenario in a real world setting. Although it will be appreciated that changes in credit score in greater or fewer number of days is also contemplated. Advantageously, the preferred scenario that is implemented, eliminates confusion between the user and the mortgage lender, and provides a clear course of action for the user, which promotes loyalty between user and the mortgage lender. Information, alerts and notifications are provided to user, third parties, mortgage lender, or combinations thereof, to verify implementation of the scenario.

Implementation of the scenario can include providing instructions to the user to carry out the payments, the amounts to pay, the accounts to be paid, and the dates to be paid on to achieve the preferred credit score. In an embodiment, the user provides consent to allow the system 100 to autonomously, or semi-autonomously, implement the scenario, as described herein. Further, the system 100 can provide instructions and/or mortgage comparisons in the form of a "Pre-Qual" letter.

Advantageously, the post-funded borrower has a lower and more stable DTI ratio, as well as a higher and more stable credit score. For example, the user is more likely to utilize cash savings on home improvements, rather than increasing rolling debt for these same expenditures. This reduces the loan risk, reducing loan defaulting rates, and increases the loan rating. Further, this can substantially increase the yield when selling the loan and provide a shorter loan holding period. Further, the system 100 educates the user to become a better manager of their money and credit score with ongoing education, protection and awareness provided, as described herein (e.g. FIG. 5).

Advantageously, for Bond Buyers, the system 100 provides more data for greater risk assessment, a better portfolio of loans, more stable yields to investors because borrowers are less likely to refinance, and collateralized mortgage obligation ("CMO"), real estate mortgage investment conduit ("REMIC"), and derivatives are more attractive.

In an embodiment, the "Max A.I.™" or "Boost" feature further helps to keep the user's credit and money lifestyle growing and stable over the long-term. The "Max A.I.™" feature uses Artificial Intelligence, machine learning, or the like to give the user personalized recommendations. The system 100 provides questions to the user through a gamified user interface. Exemplary questions can include socio-demographic questions, preferences, aspirations, goal-oriented questions, non-goal oriented questions, and the like, combinations thereof, or the like to determine a user's current long-term thinking, analysis of the user's payment and spending patterns, a user's actions based on the recommendations provided by the system, a user's feedback or actions taken based on the recommendations provided by the system, or combinations thereof. The answers to the questions are used to develop trends in secondary data for other users of the system, or trends in primary data directed to the user, as described herein. The questions can be provided to the user based on action or temporal based triggers. For example, questions can be provided in response to actions from the user, or at set time intervals such as 1 month, 6 month, 12 months, 24 months, or the like.

In an embodiment, the system 100 uses the answers to the "Max A.I.™" questions provided, together with primary, secondary, and tertiary variables, as described herein, or combinations thereof, to provide recommendations to the user as to which actions to carry out. For example, the system 100 can determine a recent spike in rolling debt and determine from the answers of the questions provided that the cause of the spike in rolling debt is due to a one off expenditure. The system 100 then provides suggestions to pay a percentage of one or more accounts, transfer balances to different accounts, take out a loan to pay off accounts, or the like, to offset the impact of the one of expenditure and maintain the overall credit score goals for the user. After a given time has elapsed the system can review the actions taken by the user since the previous set of questions to determine if the recommendations have been followed. The system then determines a new set of questions to present to the user based off of the previous actions of the user and answers provided.

In an embodiment, the system 100 uses the answers to the "Max A.I.™" questions provided, together with primary, secondary, and tertiary variables, as described herein, or combinations thereof, to determine if the user can be categorized into groups. (See, for example, Step 226 of FIG. 2). Group A includes users that are credit distressed, having for example, low credit score, high percentage credit utilization, high rolling debt, combinations thereof, or the like. Group C includes users that are preparing for a large purchase, such as a car, a house, or large project loan, and intend to achieve a maximum possible credit score in order to secure most favorable terms on the loan. Group B includes users that are credit stable, and are neither credit distressed such as Group A, nor intending to achieve maximum possible credit scores such as Group B. Group B users are not intending to move house or change cars and are tolerant of some drop in credit score in return for investment in assets, with the intention of improving credit scores at a later date. An individual user can move between Groups A, B, and C during the course of their lifetime with each type of user group having different intentions for their spending behavior. Accordingly, the system 100, e.g. predictive scenario engine 190, can modify the scenarios, trends, and the like, based on the group classification assigned to the user to match suitable scenarios and outcomes to the user.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples or features are provided; however, embodiments include those variations obvious to a person skilled in the art, such as combining features together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

While the invention has been described in terms of particular variations and illustrative figures, those of ordinary skill in the art will recognize that the invention is not limited to the variations or figures described. The features described with respect to one embodiment or variation may be used in other embodiments or variations. Processes described separately may be combined. In addition, where processes and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

The invention claimed is:

1. A method, performed by one or more processors, for presenting gamified scenarios, comprising:
   generating a first gamified user interface configured to:
      i) depict a first credit score and information associated with a user, and
      ii) receive an input corresponding to selecting a second credit score;
   responsive to receiving the input, conducting analytics on the first credit score, the second credit score, and the information associated with the first user, thereby generating a credit modification model for modifying the information associated with the first user using a trained machine learning model, wherein the credit modification model includes a set of defined actions to be taken that, when taken, result in altering the first credit score to the second credit score;
   wherein conducting analytics thereby generating the credit modification model includes providing the first credit score, the second credit score, and the information associated with the first user as inputs to the trained machine learning model that is trained, in part using secondary variables, to determine (i) key variables from the information associated with the first user pertinent to obtaining the second credit score, (ii) the set of defined actions, and (iii) based in part on the key variables, a refined scenario where the first credit score has been modified to the second credit score, wherein the secondary variables are based on previous scenario changes of one or more other users, different than the first user, or of the first user, or identified data trends of the previous scenario changes;
   wherein the secondary variables include data from, or generated by, one or more other users, different than the first user, or from previous user interfaces generated by the one or more other users, and the secondary variables include anonymized data and are stripped of any personally identifiable information;
   generating a second gamified user interface depicting the second credit score, and displaying (i) the refined scenario including the second credit score and modifications to the information associated with the first user, and (ii) a first actionable display element, wherein activation of the first actionable display element indicates first user authorization of performance of the set of defined actions; and responsive to detecting a selection of the first actionable display element, providing at least part of the set of defined actions, generated by the credit modification model, to a third party with the first user authorization to perform the at least part of the set of defined actions, wherein performance thereof causes modification of the information associated with the first user.

2. The method of claim 1, wherein the set of defined actions generated by the credit modification model further includes an order of operations to be performed, or a timing of operations to be performed, to modify the first credit score to the second credit score.

3. The method of claim 1, wherein the first credit score is a current credit score for the first user.

4. The method of claim 1, wherein the second credit score is higher than the first credit score.

5. The method of claim 1, wherein the second credit score is lower than the first credit score.

6. The method of claim 1, wherein responsive to detecting the selection of the first actionable display element, the method further includes transmission of a message to a financial institution resulting in initiation of an application for a loan, wherein terms of the loan include determining a risk level of the first user based on the second credit score, wherein subsequent to the first credit score being modified to the second credit score the loan is funded and prompts payment to an account of the first user.

7. The method of claim 1, wherein the set of defined actions generated by the credit modification model includes transmitting one or more messages to the third party to provide consent, instructions, or forms that are required to initiate a loan application and wherein terms of the loan include determining a risk level of the first user based on the second credit score.

8. A system comprising:
one or more first logic modules stored within a first non-transitory storage medium, the one or more first logic modules, when executed by one or more first processors, perform operations including:
generating a first user interface configured to depict a first credit score and information associated with a first user, and configured to receive an input corresponding to selection of a second credit score; and
communicating of the first credit score, the information associated with the first user, and the second credit score as packets of data over a network; and
one or more second logic modules stored within a second non-transitory storage medium, the one or more second logic modules when executed by one or more second processors, perform operations including;
extracting content from the packets, wherein content includes one of the first credit score, the information associated with the user, or the second credit score, conducting analytics on the first credit score, the information associated with the first user, and the second credit score thereby generating a credit modification model for modifying the information associated with the first user using a trained machine learning model, wherein the credit modification model includes a set of defined actions to be performed that, when performed result in altering to the first credit score to the second credit score;

wherein conducting analytics thereby generating the credit modification model includes providing the first credit score, the second credit score and the information associated with the first user as inputs to the trained machine learning model that is trained, in part using secondary variables, to determine (i) key variables from the information associated with the first user pertinent to obtaining the second credit score, (ii) the set of defined actions, and (iii) based in part on the key variables, a refined scenario where the first credit score has been modified to the second credit score, wherein the secondary variables are based on previous scenario changes of one or more other users, different than the first user, or of the first user, or identified data trends of the previous scenario changes;

wherein the secondary variables include data from, or generated by, one or more other users, different than the first user, or from previous user interfaces generated by the one or more other users, and the secondary variables includes anonymized data and are stripped of any personally identifiable information; and wherein the one or more first logic modules performs further operations including:
generating a second user interface depicting the second credit score and displaying a proposed change to the information associated with the first user; and
responsive to detecting a selection of an actionable display element rendered as part of the second user interface, transmitting the one or more messages one or more destinations to execute the set of defined actions of the credit modification model and change the information associated with the first user to modify the first credit score to the second credit score, the set of defined actions including changing a credit limit for an account of the first user.

9. The system of claim 8, wherein the first user interface includes a digitally rendered modifiable image.

10. The system of claim 8, wherein the information associated with the first user includes personally identifiable information or financial data.

11. The system of claim 8, wherein conducting analytics further includes:
i) correlation of the information associated with the first user by profiling and mapping to determine a target overall debt utilization rate for the first user; and
ii) determination of operations of the credit modification model to modify a credit score associated with the first user from the first credit score to the second credit score based on the target overall debt utilization rate for the first user.

12. The system of claim 8, wherein transmitting the one or more messages to one or more destinations to execute the set of defined actions of the credit modification model further includes sending a first message to a first destination and a second message to a second destination, and responsive to an input from one of the first destination or the second destination, transferring a financial account of the first user from the first destination to the second destination.

13. The system of claim 8, wherein transmitting the one or more messages to one or more destinations to execute the set of defined actions of the credit modification model further includes establishing an online auction platform for one or more financial institutions and responsive to an input from a first financial institution of the one or more financial institutions, transferring a financial account of the first user to the first financial institution.

14. A method, performed by one or more processors, for boosting a first user's credit score, comprising;
   generating a first user interface configured to:
   i) depict a first credit score and information associated with the first user, and
   ii) receive an input corresponding to selecting a second credit score;
   responsive to receiving the input, conducting analytics on the first credit score, the second credit score, and the information associated with the first user, thereby generating a credit modification model for modifying the information associated with the first user using a trained machine learning model, wherein the credit modification model includes a set of defined actions to be taken that, when taken, result in altering the first credit score to the second credit score;
   wherein conducting analytics thereby generating the credit modification model includes providing the first credit score, the second credit score, and the information associated with the first user as inputs to the trained machine learning model that is trained, in part using secondary variables, to determine (i) key variables from the information associated with the first user pertinent to obtaining the second credit score, (ii) the set of defined actions, and (iii) based in part on the key variables, a refined scenario where the first credit score has been modified to the second credit score, wherein the secondary variables are based on previous scenario changes of one or more other users, different than the first user, or of the first user, or identified data trends of the previous scenario changes;
   wherein the secondary variables include data from, or generated by, one or more other users, different than the first user, or from previous user interfaces generated by the one or more other users, and the secondary variables include anonymized data and are stripped of any personally identifiable information;
   generating a second user interface depicting the second credit score and displaying the refined scenario including the second credit score and modifications to the information associated with the user;
   responsive to detecting a selection of an actionable display element rendered as part of the second gamified user interface, transmitting a first message to a first destination to execute the set of defined actions of the credit modification model and modify the information associated with the first user resulting in changing the first credit score to the second credit score, the set of defined actions of the credit modification model including changing a credit limit for an account of the first user.

15. The method of claim 14, wherein the set of defined actions of the credit modification model further include one or more of:
   i) selecting one or more accounts of the first user that are eligible for a credit limit increase;
   ii) selecting an amount of credit limit to apply for; and
   iii) selecting a time to apply for the credit limit increase.

\* \* \* \* \*